(12) United States Patent
Daly et al.

(10) Patent No.: US 9,523,040 B2
(45) Date of Patent: Dec. 20, 2016

(54) CATALYSTS

(71) Applicant: Velocys Technologies Limited, Oxfordshire (GB)

(72) Inventors: Frank Daly, Waldoboro, ME (US); Laura Richard, Abingdon (GB); Sreekala Rugmini, Didcot (GB)

(73) Assignee: Velocys Technologies Limited, Abingdon, Oxfordshire (GB)

( * ) Notice: Subject to any disclaimer, the term of this patent is extended or adjusted under 35 U.S.C. 154(b) by 0 days.

(21) Appl. No.: 15/197,926

(22) Filed: Jun. 30, 2016

(65) Prior Publication Data

US 2016/0304789 A1    Oct. 20, 2016

Related U.S. Application Data

(62) Division of application No. 13/984,104, filed as application No. PCT/GB2012/000125 on Feb. 7, 2012, now Pat. No. 9,381,501.

(30) Foreign Application Priority Data

Feb. 7, 2011  (GB) .................................. 1102101.1
Jan. 30, 2012  (GB) .................................. 1201619.2

(51) Int. Cl.
| C07C 27/00 | (2006.01) |
| C07C 27/06 | (2006.01) |
| B01J 21/00 | (2006.01) |
| B01J 21/04 | (2006.01) |
| B01J 23/00 | (2006.01) |
| B01J 23/02 | (2006.01) |
| C10G 2/00 | (2006.01) |
| B01J 23/75 | (2006.01) |
| B01J 21/08 | (2006.01) |
| B01J 35/02 | (2006.01) |

(52) U.S. Cl.
CPC ................ *C10G 2/332* (2013.01); *B01J 21/08* (2013.01); *B01J 23/75* (2013.01); *B01J 35/023* (2013.01)

(58) Field of Classification Search
CPC ........... B01J 21/063; B01J 21/08; B01J 23/75; B01J 23/8913; C10G 2/332; C07C 2523/75; C07C 2521/08
USPC .................. 518/715; 502/242, 260, 350, 439
See application file for complete search history.

(56) References Cited

U.S. PATENT DOCUMENTS

| 3,702,291 A | 11/1972 | Jacquin et al. |
| 4,171,289 A | 10/1979 | Wheelock |
| 5,397,806 A | 3/1995 | Soled et al. |

(Continued)

FOREIGN PATENT DOCUMENTS

| CN | 101346181 | 1/2009 |
| CN | 102294242 | 12/2011 |

(Continued)

OTHER PUBLICATIONS

Great Britain Search Report, Application No. GB1102101.1, dated Jun. 3, 2011.

(Continued)

*Primary Examiner* — Cam N. Nguyen
(74) *Attorney, Agent, or Firm* — Renner, Otto, Boisselle & Sklar, LLP

(57) ABSTRACT

The present disclosure relates to improvements in the design of Fischer-Tropsch catalysts comprising a support and cobalt on the support.

10 Claims, 31 Drawing Sheets

(56) References Cited

U.S. PATENT DOCUMENTS

| | | | |
|---|---|---|---|
| 6,727,289 B2* | 4/2004 | Ionkina | B01J 23/74 518/715 |
| 6,759,439 B2* | 7/2004 | Chao | B01J 23/8896 518/715 |
| 6,759,440 B2* | 7/2004 | Geerlings | B01J 23/889 518/715 |
| 6,825,237 B2* | 11/2004 | Schweitzer | C10G 2/342 518/700 |
| 6,846,848 B2* | 1/2005 | Wittenbrink | B01J 8/228 518/700 |
| 6,962,947 B2* | 11/2005 | Wright | B01J 23/8896 502/20 |
| 6,977,273 B2* | 12/2005 | Roy-Auberger | B01J 21/12 502/263 |
| 7,071,239 B2* | 7/2006 | Ortego, Jr. | B01J 21/005 518/700 |
| 7,084,180 B2 | 8/2006 | Wang et al. | |
| 7,105,706 B2* | 9/2006 | Dirkzwager | C07C 41/03 510/524 |
| 7,183,329 B2* | 2/2007 | Green | C10G 2/332 252/373 |
| 7,241,815 B2* | 7/2007 | Roy-Auberger | C10G 2/333 518/700 |
| 7,417,073 B2* | 8/2008 | Mauldin | B01J 23/75 208/107 |
| 7,510,994 B2 | 3/2009 | Ikeda et al. | |
| 7,511,080 B2* | 3/2009 | Green | C10G 2/332 252/373 |
| 7,541,310 B2 | 6/2009 | Espinoza et al. | |
| 7,566,678 B2* | 7/2009 | Font Freide | B01J 23/462 502/158 |
| 7,585,899 B2* | 9/2009 | Wang | B01J 8/0285 518/700 |
| 8,053,481 B2* | 11/2011 | Ayasse | B01J 23/8896 518/700 |
| 8,178,589 B2* | 5/2012 | Fujimoto | B01J 21/08 518/715 |
| 8,188,153 B2* | 5/2012 | Wang | B01J 19/0093 422/221 |
| 8,382,881 B2 | 2/2013 | Bhasin et al. | |
| 8,487,011 B2* | 7/2013 | Fjare | B01J 23/75 518/700 |
| 8,524,788 B2* | 9/2013 | Fujimoto | B01J 21/08 518/715 |
| 8,722,570 B2* | 5/2014 | Mauldin | B01J 21/005 502/326 |
| 9,023,900 B2* | 5/2015 | Wang | B01J 23/75 502/325 |
| 2005/0026776 A1 | 2/2005 | Yamada et al. | |
| 2005/0119116 A1 | 6/2005 | Espinoza et al. | |
| 2009/0293359 A1 | 12/2009 | Simmons et al. | |
| 2009/0305881 A1 | 12/2009 | Sietsma et al. | |
| 2010/0024874 A1 | 2/2010 | Varaprasad | |
| 2011/0028575 A1 | 2/2011 | Van De Loosdrecht | |

FOREIGN PATENT DOCUMENTS

| | | |
|---|---|---|
| CN | 101934227 | 10/2012 |
| CN | 102247896 | 2/2013 |
| EP | 1 239 019 A1 | 9/2002 |
| EP | 1 359 237 A1 | 11/2003 |
| JP | 5-184921 | 7/1993 |
| JP | 2004016975 | 1/2004 |
| JP | 2007252989 | 10/2007 |
| KR | 100759430 | 10/2007 |
| WO | WO 01/83108 A1 | 11/2001 |
| WO | WO 02/074431 A1 | 9/2002 |
| WO | WO 2006/012152 A2 | 2/2006 |
| WO | WO 2007/068731 A1 | 6/2007 |
| WO | WO 2008/104793 A2 | 9/2008 |
| WO | WO 2010/049715 A1 | 5/2010 |
| WO | WO 2010/097754 A2 | 9/2010 |
| WO | WO 2010/115105 A1 | 10/2010 |

OTHER PUBLICATIONS

Great Britain Further Search Report, Application No. GB1102101.1, dated Oct. 4, 2011.

Great Britain Search Report, Application No. GB1201619.2, dated May 28, 2012.

Kakihana et al.; "Application of Water-Soluble Titanium Complexes as Precursors for Synthesis of Titanium-Containing Oxides via Aqueous Solution Processes"; Bull. Chem. Soc. Jpn 2010, 83 (11), pp. 1285-1308.

Mohamed et al.; "Synthesis, characterization and catalytic properties of titania-silica catalysts"; Colloids and Surfaces, A: Physicochemical and Engineering Aspects 207 (2002) 25-32.

Riva et al.; "Metal-support interaction in $Co/SiO_2$ and $Co/TiO_2$"; Applied Catalysis A: General 196 (2000) 111-123.

Song et al.; "The role if impregnation medium on the activity of ceria-supported cobalt catalysts for ethanol steam reforming"; Journal of Molecular Catalysis A: Chemical 318 (2010) 21-29.

Hinchiranan et al.; "$TiO_2$ promoted $Co/SiO_2$ catalysts for Fischer-Tropsch synthesis"; Fuel Processing Technology 89 (2008), 455-459.

Bouh et al.; "Mono- and Dinuclear Silica-Supported Titanium (IV) Complexes and the Effect of TiOTi Connectivity on Reactivity"; J. Am. Chem. Soc. 1999, 121, 7201-7210.

Bu et al.; "Preparation and Characterization of $TiO_2$-Supported on the Surface of $SiO_2$ "; Advanced Materials Research vols. 194-196 (2011) pp. 1807-1810.

Castillo et al.; "Influence of Preparation Methods on the Texture and Structure of Titania supported on Silica"; J. Mater. Chem. 1994, 4(6), 903-906.

Jehng et al.; "Surface Chemistry of Silica-Titania-supported Chromium Oxide Catalysts"; J. Chem. Soc. Fraraday Trans., 1995, 91(5), 952-861.

Oh et al.; "Preparation of monodispersed magnesia coated silica particles through a surface-induced precipitation method"; Powder Technology 204 (2010) 154-158.

Meijers et al.; "Preparation of zirconium oxide on silica and characterization by X-ray photoelectron spectroscopy, secondary ion mass spectrometry, temperature programmed oxidation and infra-red spectroscopy"; Applied Catalysis, 70 (1991) 53-71.

Shi et al.; "Surface Impregnation Combustion Method to Prepare Nanostructured Metallic Catalysts without Further Reduction: As-Burnt $Co/SiO_2$ Catalysts for Fischer-Tropsch Synthesis"; ACS Catal. 2011, 1, 1225-1233.

Koizumi et al.; "Enhancing the Fischer-Tropsch Synthesis Activity of Co-based Catalysts by Adding $ZrO_x$ to the $SiO_2$ Support and Chelating Ligands to the Co-precursor"; Catal Lett (2001) 141:1207-1214.

Official Action for Chinese Patent Application No. 201280014772.X dated Dec. 22, 2014 and its English translation.

International Search Report for corresponding Application No. PCT/GB2012/000125, mailed Oct. 26, 2012.

* cited by examiner

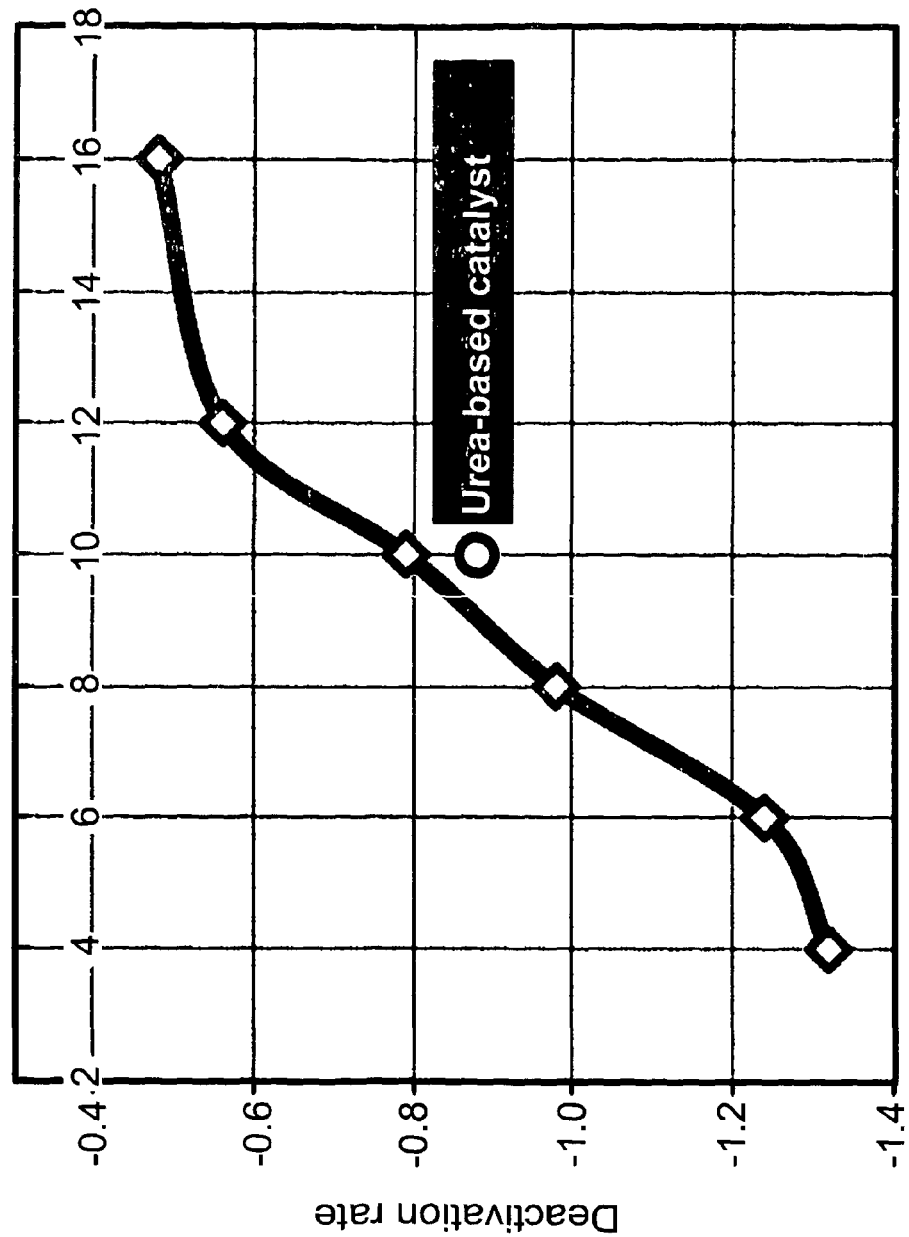

ns/elevados# CATALYSTS

TECHNICAL FIELD

This invention relates to improvements in the design of Fischer-Tropsch catalysts.

BACKGROUND ART

WO 2008/104793 describes a Fischer-Tropsch catalyst precursor, a method for its production and a resulting catalyst. All documents cited herein are incorporated by reference in their entirety.

DISCLOSURE OF THE INVENTION

A first aspect of the invention provides a method of preparing a catalyst precursor comprising:
depositing a solution or suspension comprising at least one catalyst metal precursor and a reducing agent onto a catalyst support;
drying the catalyst support onto which the solution or suspension has been deposited; and
calcining the catalyst support onto which the solution or suspension has been deposited in an oxygen-containing atmosphere,
wherein the reducing agent is a carboxylic acid. This aspect of the invention further provides the use of a carboxylic acid as the reducing agent to minimise catalyst precursor fracturing in the above method.

The carboxylic acid may additionally act as a complexing agent.

This aspect of the invention also provides a catalyst precursor obtainable by the above method, and a catalyst that is an activated form of the catalyst precursor.

A second aspect of the invention provides a catalyst precursor comprising:
(i) a catalyst support comprising silica and at least 11 wt % $TiO_2$; and
(ii) cobalt on the catalyst support.

This aspect of the invention also provides a catalyst that is an activated form of the catalyst precursor. The catalyst precursor may be obtainable by using the first aspect of the invention.

A third aspect of the invention provides a catalyst precursor comprising:
(i) a catalyst support; and
(ii) $Co_3O_4$ on the catalyst support,
wherein the numerical average particle diameter of the $Co_3O_4$ is less than 12 nm as determined by X-ray diffraction (XRD).

The third aspect of the invention also provides a catalyst precursor comprising a catalyst support; and $Co_3O_4$ on the catalyst support, wherein the numerical average particle diameter of the $Co_3O_4$ is less than 12 nm as determined by XRD and the c value of a lognormal particle size distribution of $Co_3O_4$ is less than or equal to 0.31. The c-value is known as "the dimensionless ratio".

The third aspect of the invention also provides a catalyst precursor comprising a catalyst support; and $Co_3O_4$ on the catalyst support, wherein the D-value of the lognormal particle size distribution is greater than or equal to about 19.

It is important to note that the D-value is simply a reformulation of the size distribution as described by the c-value and does not represent any new data. Therefore, the c- and D-values are mathematically related and both can be included in the third aspect of the invention. A D-value of 19.2 is equivalent to an average particle size of about 10 nm and a size distribution width of about 0.31. It is preferred to use the D-value as this number incorporates both the size and distribution width into a single metric.

This aspect of the invention also provides a catalyst that is an activated form of the catalyst precursor. The catalyst precursor may be obtainable by using the first aspect of the invention. The catalyst support may be as defined in the second aspect of the invention.

A fourth aspect of the invention provides a catalyst precursor comprising:
a catalyst support comprising silica; and
$Co_3O_4$ on the catalyst support, where the catalyst is in the form of a particulate catalyst with a particle size distribution of d10 greater than 90 μm and d90 less than 310 μm.

A fifth aspect of the invention provides a catalyst precursor comprising:
a $TiO_2$-modified silica catalyst support;
at least 40 wt % Co at least partially in the form of $Co_3O_4$, wherein the numerical average particle diameter of the $Co_3O_4$ is 8 to 10 nm as determined by XRD; and
Pt and optionally Re as promoters;
wherein one or more of the following conditions is satisfied the mean particle size distribution of the support is between 180 and 300 μm;
the mean pore volume is less than 1 ml/g;
the mean pore diameter is less than 100 Å;
the FTIR spectra band at 950 $cm^{-1}$ is 50%-200% of the intensity of the band at 970 $cm^{-1}$; and
the catalyst precursor comprises a titania-cobalt spinel as indicated by Raman spectra.

Alternatively an aspect of the invention provides a catalyst precursor comprising:
a $TiO_2$-modified silica catalyst support;
at least 40 wt % Co at least partially in the form of $Co_3O_4$, wherein the numerical average particle diameter of the $Co_3O_4$ is 8 to 10 nm as determined by XRD; and
Pt and optionally Re as promoters;
wherein one or more of the following conditions is satisfied the mean particle size distribution of the support is between 180 and 300 μm;
the mean pore volume is less than 1 ml/g;
the mean pore diameter is less than 100 Å;
the FTIR spectra band at 950 $cm^{-1}$ is 50%-200% of the intensity of the band at 980 $cm^{-1}$; and
the catalyst precursor comprises $Co_3O_4$ as indicated by Raman spectra. In each aspect, the catalyst precursor may be a Fischer-Tropsch catalyst precursor and the resulting catalyst may, accordingly, be a Fischer-Tropsch catalyst.

A sixth aspect of the invention provides a Fischer-Tropsch catalyst tested using Test Method 1 described herein with a deactivation rate in a fixed-bed combinatorial reactor measured as percent loss of CO conversion per day of less than 2.68c-0.14, where c is the dimensionless ratio.

A seventh aspect of the invention provides a Fischer-Tropsch catalyst tested using Test Method 1 described herein with a deactivation rate in a fixed-bed combinatorial reactor measured as percent loss of CO conversion per day of less than 1.2. An eighth aspect of the invention provides a Fischer-Tropsch catalyst tested using Test Method 2 described herein with a deactivation rate in a microchannel reactor measured as percent loss of CO conversion per day of less than 0.25.

A ninth aspect of the invention provides a method of conducting a Fischer Tropsch reaction (or Fischer Tropsch Synthesis (FTS)) comprising using a catalyst according to the present invention or a catalyst derived from a catalyst precursor according to the present invention in a microchannel reactor, in which the performance of the catalyst is substantially maintained over a reaction period of about 5000 hours or more without regeneration of the catalyst, such that the contact time is less than 500 milliseconds, the CO conversion is greater than 50% and the methane selectivity is less than 15%. In particular, the reaction period may be 8000 hours or more. Preferably, the reaction is carried out in a microchannel reactor.

A tenth aspect of the invention provides a method of conducting a Fischer Tropsch reaction comprising using a catalyst according to the present invention or a catalyst derived from a catalyst precursor according to the present invention, in which the deactivation rate of the catalyst measured as percent loss of CO conversion per day is 0.09% or less over a reaction period of about 5000 hours or more. In particular, the reaction period may be 8000 hours or more. The method of any of claims 43 to 45, wherein the reaction is carried out in a microchannel reactor.

BRIEF DESCRIPTION OF THE DRAWINGS

FIGS. 14 (A) and (B) show Fischer-Tropsch synthesis performance for catalysts supported on silica modified with different amounts of $TiO_2$. FIG. 14(B) shows Fischer-Tropsch synthesis performance in a fixed-bed combinatorial reactor.

DETAILED DESCRIPTION OF THE INVENTION

Figure 1:
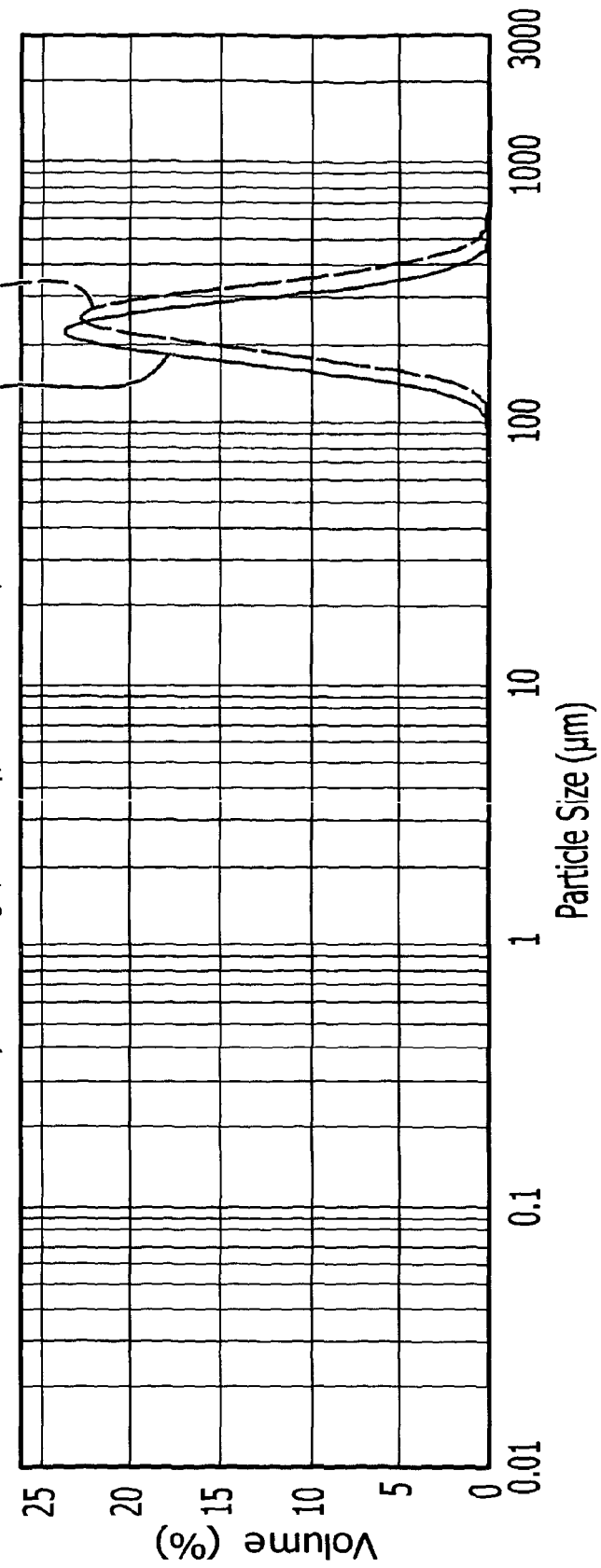
FIG. 1 shows a particle size distribution for a 180×300 μm support compared with a catalyst made with the same support and citric acid.

Features of the various aspects of the invention are described in more detail below. Features related to one aspect of the invention are also, where applicable, features of the other aspects of the invention. It will be recognised that features specified in one embodiment of the invention may be combined with other specified features to provide further embodiments.

Catalyst Precursor

A catalyst precursor is a material that may be activated to form a catalyst. The terms "catalyst" and "catalyst precursor" are used herein interchangeably and will be understood accordingly to their specific context.

A catalyst precursor comprises at least one catalyst metal, such as cobalt, which may be present in oxide form, as elemental metal, in the form of its carbide or as a mixture of any of these. In particular, the catalyst precursor may comprise from 10 to 60% cobalt (based on the weight of the metal as a percentage of the total weight of the catalyst precursor), or from 35 to 50% of cobalt, or from 40 to 44% of cobalt or about 42% of cobalt. The cobalt may be present as $Co_3O_4$.

The catalyst precursor may comprise a noble metal on the support that may be one or more of Pd, Pt, Rh, Ru, Re, Ir, Au, Ag and Os. The noble metal may be one or more of Pd, Pt, Rh, Ru, Ir, Au, Ag and Os. In particular, the noble metal may be one or more of Pt, Ru and Re. In particular, the noble metal may be Ru. As an alternative, or in addition, the noble metal may be Pt. The catalyst precursor may comprise from 0.01 to 30% in total of noble metal(s) (based on the total weight of all noble metals present as a percentage of the total weight of the catalyst precursor), or from 0.05 to 20% in total of noble metal(s), or from 0.1 to 5% in total of noble metal(s), or about 0.2% in total of noble metal(s).

If desired, the catalyst precursor may include one or more other metal-based components as promoters or modifiers. These metal-based components may also be present in the catalyst precursor at least partially as carbides, oxides or elemental metals. A suitable metal for the one or more other metal-based components is one or more of Zr, Ti, V, Cr, Mn, Ni, Cu, Zn, Nb, Mo, Tc, Cd, Hf, Ta, W, Re, Hg, Tl and the 4f-block lanthanides. Suitable 4f-block lanthanides are La, Ce, Pr, Nd, Pm, Sm, Eu, Gd, Tb, Dy, Ho, Er, Tm, Yb and Lu. In particular, the metal for the one or more other metal-based components may be one or more of Zn, Cu, Mn, Mo and W. Alternatively, the metal for the one or more other metal-based components may be one or more of Re and Pt. The catalyst precursor may comprise from 0.01 to 10% in total of other metal(s) (based on the total weight of all the other metals as a percentage of the total weight of the catalyst precursor), or from 0.1 to 5% in total of other metals, or about 3% in total of other metals.

The catalyst precursor may contain up to 10% carbon (based on the weight of the carbon, in whatever form, in the catalyst as percentage of the total weight of the catalyst precursor), or from 0.001 to 5% of carbon, or about 0.01% of carbon. Alternatively, the catalyst precursor may comprise no carbon.

Optionally, the catalyst precursor may contain a nitrogen-containing organic compound such as urea, or an organic ligand such as ammonia or a carboxylic acid, such as citric acid or acetic acid, which may be in the form of a salt or an ester.

The precursor may be activated to produce a Fischer-Tropsch catalyst, for instance by heating the catalyst precursor in hydrogen and/or a hydrocarbon gas, or in a hydrogen gas diluted with another gas, such as nitrogen and/or methane, to convert at least some of the carbides or oxides to elemental metal. In the active catalyst, the cobalt may optionally be at least partially in the form of its carbide or oxide.

Reducing Agent

The inventors have surprisingly found that the use of a carboxylic acid as the reducing agent in the method of the first aspect of the invention minimises or reduces the fracturing and fragmentation of the catalyst precursor, thereby allowing more of the catalyst precursor to be incorporated into the activated catalyst to be used in a Fischer-Tropsch reaction, because fewer catalyst precursor particles are produced below a minimum particle size criteria for achieving an acceptable reactor pressure drop (e.g. <340 kPa (or 50 psi)). In some cases, the need for screening the catalyst precursor to remove particles below a threshold size limit is completely eliminated. Without wishing to be bound by theory, it is believed that is because the reaction between the carboxylic acid and the catalyst metal precursor(s) is less violent than with other reducing agents (e.g. urea), yet the reaction is still effective to provide a highly active, stable and selective catalyst.

By contrast, methods using e.g. urea as the reducing agent can cause significant fracturing of the catalyst precursor particles, such that the average particle size is reduced and the distribution is skewed towards smaller particles. This fracturing may result from the violence of the reaction between urea and the catalyst metal precursor(s) during calcination. The eventual catalyst, if used unscreened, would cause a significant increase in reactor pressure drop (e.g. >340 kPa (or 50 psi)), thus requiring a larger compressor and increasing operating costs. Alternatively, if the eventual catalyst were screened to reduce the pressure drop, the yield of usable catalyst would be reduced, thereby increasing the cost of catalyst production.

In the first aspect of the invention, the carboxylic acid is therefore chosen such that is minimises the fracturing of the catalyst precursor whilst still ultimately producing an effective catalyst. A mixture of two or more carboxylic acids may be used. The carboxylic acid may be an α-hydroxy carboxylic acid, such as citric acid, glycolic acid, lactic acid or mandelic acid. In one embodiment, the carboxylic acid is citric acid.

As used herein the term "reducing agent" may also include that the agent acts additionally as a complexing agent.

Catalyst Metal Precursor

The catalyst metal precursor may be a cobalt-containing precursor.

Suitable cobalt-containing precursors include cobalt benzoylacetonate, cobalt carbonate, cobalt cyanide, cobalt hydroxide, cobalt oxalate, cobalt oxide, cobalt nitrate, cobalt acetate, cobalt acetlyactonate and cobalt carbonyl. These cobalt precursors can be used individually or can be used in combination. These cobalt precursors may be in the form of hydrates but or in anhydrous form. In some cases, where the cobalt precursor is not soluble in water, such as cobalt carbonate or cobalt hydroxide, a small amount of nitric acid or a carboxylic acid may be added to enable the precursor to fully dissolve in the solution or suspension. The solution or suspension may contain little or no water, in which case the drying step in the method of forming the catalyst precursor may be omitted.

In one embodiment, the catalyst metal precursor is cobalt nitrate. Cobalt nitrate may react with the reducing agent during calcination to produce $Co_3O_4$.

The solution or suspension may contain at least one primary catalyst metal precursor, such as one of the above cobalt-containing precursors or a mixture of cobalt-containing precursors, and at least one secondary catalyst metal precursor. Such secondary catalyst metal precursor(s) may be present to provide a promoter and/or modifier in the catalyst. Suitable secondary catalyst metals include noble metals, such as Pd, Pt, Rh, Ru, Ir, Au, Ag and Os, transition metals, such as Zr, Ti, V, Cr, Mn, Fe, Co, Ni, Cu, Zn, Nb, Mo, Tc, Cd, Ta, W, Re, Hg and Ti and the 4f-block lanthanides, such as La, Ce, Pr, Nd, Pm, Sm, Eu, Gd, Tb, Dy, Ho, Er, Tm, Yb and Lu.

In particular, the secondary catalyst metals may be one or more of Pd, Pt, Ru, Ni, Co (if not the primary catalyst metal), Fe (if not the primary catalyst metal), Cu, Mn, Mo, Re and W.

Catalyst Support

A catalyst may be dispersed on a support, such as silica, to anchor the catalyst particles and provide mechanical strength.

The catalyst support may be a refractory solid oxide, carbon, a zeolite, boronitride or silicon carbide. A mixture of these catalyst supports may be used. Suitable refractory solid oxides are alumina, silica, titania, zirconia and zinc oxide. In particular, a mixture of refractory solid oxides may be used. If silica is used in the catalyst support for a cobalt-based catalyst, the surface of the silica may be coated with a non-silicon oxide refractory solid oxide, in particular zirconia, alumina or titania. The catalyst support may be in the form of a structured shape, pellets or a powder.

In the second aspect of the invention, $TiO_2$ (titania) is used to increase the stability (e.g. by decreasing deactivation) of a silica-supported catalyst. The deactivation rate of the catalyst may thus be such that it can used in a Fischer-Tropsh synthesis for e.g. >300 hours.

At elevated temperatures, the catalyst material may react with the surface Si—OH groups on a silica support to generate silicate species which are not Fischer-Tropsch active and may not be readily reducible. This may lead to a loss in active surface area of the catalyst and therefore a drop in FTS activity.

Without wishing to be bound by theory, the inventors believe that dispersion of titania onto a silica surface occurs via consumption of the surface Si—OH groups with the subsequent forming of bridging Ti—O—Si bonds. Thus, modification of a silica support with a layer of titania removes the Si—OH groups and thereby prevents the formation of silicates.

$TiO_2$ may comprise at least 11 wt %, or greater than 11 wt %, of the total weight of the catalyst support. In particular, the catalyst support may comprise 11-30 wt %, 11-25 wt %, 11-20 wt %, or 12-18 wt %, or 15-17 wt %, or about 16 wt % $TiO_2$ on silica ($SiO_2$).

In one embodiment of the invention, the catalyst precursor comprises:
40 to 44 wt % Co, 0.1 to 0.3 wt % Re, and 0.01 to 0.05 wt % Pt (each expressed as a percentage of the total weight of the catalyst precursor); and
a $TiO_2$-modified silica catalyst support, comprising 12-18 wt % $TiO_2$ (expressed as a percentage of the total weight of the catalyst support).

The catalyst precursor may comprise 42 wt % Co, 0.2 wt % Re, and 0.03 wt % Pt (each expressed as a percentage of the total weight of the catalyst precursor); and a $TiO_2$-modified silica catalyst support, comprising 16 wt % $TiO_2$ (expressed as a percentage of the total weight of the catalyst support).

In one embodiment, the catalyst is in the form of a particulate catalyst with a particle size distribution of d10 greater than 90 μm and d90 less than 310 μm. The mean particle size distribution may be between 180 and 300 μm.

As titania is more acidic than silica, the efficacy of the dispersion of titania onto the silica surface may be characterised by measurement of the surface acidity of the modified support. In addition, the presence of tetrahedrally coordinated $Ti^{4+}$ ions at the silica/titania interface may generate further, particularly strong, Lewis acid sites.

The surface acidity of the modified support may be measured using Temperature Programmed Desorption (TPD) experiments with a Lewis base such as ammonia.

In one embodiment, the surface acidity of the catalyst support is such that neutralisation requires 0.20 μmol $NH_3$/$m^2$ or more, e.g. 0.22 μmol $NH_3/m^2$ or more.

Another method for measurement of the replacement of Si—OH bonds with Ti—O—Si on a modified support is through the use of FT-IR spectroscopy. In FT-IR, a band for a Si—OH groups is expected at a frequency of approximately 980 $cm^{-1}$. In addition, a band for a Ti—O—Si groups is expected at a frequency of approximately 950 $cm^{-1}$. Therefore, as the number of Si—OH bonds are replaced by Ti—O—Si groups, one would expect a reduction in the intensity of the band at 980 $cm^{-1}$ and an increase in the intensity of the band at 950 $cm^{-1}$. The ratio of the intensities of the bands at 980 $cm^{-1}$ and 950 $cm^{-1}$ provides an indication of how many Si—OH groups have been replaced with Ti—O—Si groups.

In the measurements taken for the present application, the FT-IR spectra were corrected by subtracting a spectrum for silica. Therefore, the band at 980 $cm^{-1}$ will appear, in these corrected spectra, as a dip. The "FT-IT intensity ratio" is therefore calculated using the observed intensities of the 980 cm$^{-1}$ and 950 cm$^{-1}$ bands in the corrected spectra, with the intensity of the band maximum at 950 cm$^{-1}$ being divided by the intensity of the band minimum at 980 cm$^{-1}$.

In one embodiment, the modified catalyst support has a ratio of FT-IR intensities at 950:980 cm$^{-1}$ of 1.2 or more, e.g. 1.3 or more, 1.4 or more or 1.5 or more.

Deactivation Rate

In some embodiments of the invention, the catalyst may be used for an extended period (e.g. >300 hours) with a deactivation rate of less than 1.4% per day, or less than 1.2% per day, or between 0.1% and 1.0% per day in a fixed-bed combinatorial reactor or high throughput screening reactor tested using Test Method 1 as described herein.

Preferably, a catalyst of the present invention tested using Test Method 1 described herein has the deactivation rate in a fixed-bed combinatorial reactor or high throughput screening reactor measured as percent loss of CO conversion per 24 hours wherein the CO conversion is greater than 70%, preferably greater than 75%, more preferably greater than 80%, wherein said loss is measured over a period of 200 hours or more, and wherein said period of 200 hours starts at a time on stream (TOS) of less than 500 hours.

Preferably, the conditions for Test Method 1 are selected such that the activity during the test is greater than about 0.15 mol CO hr$^{-1}$ g$_{Co}^{-1}$, preferably greater than about 0.2 mol CO hr$^{-1}$ g$_{Co}^{-1}$, more preferably greater than about 0.25 mol CO hr$^{-1}$ g$_{Co}^{-1}$. The activity during the test may be in the range about 0.15 to about 0.5 mol CO hr$^{-1}$ g$_{Co}^{-1}$, or about 0.2 to about 0.4 mol CO hr$^{-1}$ g$_{Co}^{-1}$.

In some embodiments of the invention, the catalyst may be used for an extended period (e.g. >300 hours) with a deactivation rate of less than 0.25% per day, or between 0.001% and 0.20% per day, or between 0.01 and 0.05% per day, or about 0.02% per day in a microchannel reactor tested using Test Method 2 as described herein.

Preferably, a catalyst of the present invention tested using Test Method 2 described in the description has a deactivation rate in a microchannel reactor measured as percent loss of CO conversion per 24 hours of less than 0.25, wherein the CO conversion is greater than 70%, preferably greater than 75%, more preferably greater than 80%, wherein said loss is measured over a period of 200 hours or more, and wherein said period of 200 hours starts at a time on stream (TOS) of less than 500 hours.

As used herein the term "microchannel reactor" refers to an apparatus comprising one or more process microchannels wherein a reaction process is conducted. The process may comprise any chemical reaction such as a Fischer-Tropsch Synthesis (FTS) process. When two or more process microchannels are used, the process microchannels may be operated in parallel. The microchannel reactor may include a manifold for providing for the flow of reactants into the one or more process microchannels, and a manifold providing for the flow of product out of the one or more process microchannels. The microchannel reactor may further comprise one or more heat exchange channels adjacent to and/or in thermal contact with the one or more process microchannels. The heat exchange channels may provide heating and/or cooling for the fluids in the process microchannels. The heat exchange channels may be microchannels. The microchannel reactor may include a manifold for providing for the flow of heat exchange fluid into the heat exchange channels, and a manifold providing for the flow of heat exchange fluid out of the heat exchange channels. Examples of microchannel reactors are as described in WO 2009/126769, WO 2008/030467 and WO 2005/075606.

The depth of each microchannel may be in the range of about 0.05 to about 10 mm, or from about 0.05 to about 5 mm, or from about 0.05 to about 2 mm, or from about 0.1 to about 2 mm, or from about 0.5 to about 2 mm, or from about 0.5 to about 1.5 mm, or from about 0.08 to about 1.2 mm. The width of each microchannel may be up to about 10 cm, or from about 0.1 to about 10 cm, or from about 0.5 to about 10 cm, or from about 0.5 to about 5 cm.

$Co_3O_4$ Average Particle Diameter and Size Distribution

The activity and the selectivity of cobalt-based catalysts are principally influenced by the density of active sites, favouring very small particle sizes. However, the deactivation mechanisms of cobalt catalysts follow in general the reverse trend, where the largest particles are the most stable.

The inventors have found that a numerical average particle diameter of $Co_3O_4$ of less than 12 nm (determined by powder X-ray diffraction, preferably using a Siemens D5000 theta/theta powder diffractometer and Cu K$_\alpha$ radiation. A measurement method is given in the examples) gives a catalyst having optimum Fischer-Tropsch synthesis performance. The inventors have further found that the cobalt oxide particle size distribution influences catalyst's activity and stability, such that, a particle size distribution as narrow as possible is preferred. The width of the particle size distribution can be measured by the c value of the lognormal particle size distribution. Preferably, the c value of the lognormal particle size distribution of $Co_3O_4$ particles is less than 0.31. The average particle diameter of $Co_3O_4$ may be below 11 nm, or between 8 and 10 nm. The c value may be between 0.19 and 0.31, or below 0.25, or between 0.19 and 0.25. Preferably, where the numerical average particle diameter of the $Co_3O_4$ is in the range 8 to 10 nm, c is less than 0.31.

In one embodiment, preferably where the numerical average particle diameter is in the range 8 to 10 nm, the c-value may be 0.31 or less, e.g. 0.29 or less, 0.26 or less or 0.25 or less. Alternatively or in addition, the c-value may be 0.19 or more, e.g. 0.20 or more or 0.235 or more. It is within the scope of the present application to combine any of these upper and lower limits such that the c-value may be $0.19 \le c \le 0.31$; $0.19 \le c \le 0.29$; $0.19 \le c \le 0.26$; $0.19 \le c \le 0.25$; $0.20 \le c \le 0.31$; $0.20 \le c \le 0.29$; $0.20 \le c \le 0.26$; $0.20 \le c \le 0.25$; $0.235 \le c \le 0.31$; $0.235 \le c \le 0.29$; $0.235 \le c \le 0.26$; or $0.235 \le c \le 0.25$.

c is known as the dimensionless ratio, and characterises the width of the size distribution.

In a sample of calcined catalyst (assuming spherical particles equivalent to crystallites or crystallites with a lognormal monomodal distribution) the form of the particle size distribution may be written as:

$$f(R) = \frac{1}{R\sqrt{2\pi \ln(1+c)}} e^{-\frac{\left[\ln\left(\frac{R}{R_0}\sqrt{1+c}\right)\right]^2}{2\ln(1+c)}} \quad \text{Equation 1}$$

where $$c = \frac{\sigma^2}{R_o^2}$$

where $R_O$ is the numeric average particle radius and c, which is known as the dimensionless ratio, characterises the width of the size distribution. Multiplication of $R_O$ by 2 yields the numerical average particle diameter.

An alternative way to characterise the relationship between the $Co_3O_4$ particle size distribution and the catalyst's activity and stability is through the D-value. It is important to note that the D-value is simply a reformulation of the size distribution as described by the c-value and does not represent any new data. Therefore, the c- and D-values are mathematically related, but an improved correlation is seen between the D-value and the catalyst's activity and stability.

The D-value is calculated from parameters of the particle size distribution of $Co_3O_4$ particles in a fresh, unreduced catalyst, i.e. in a catalyst precursor Trends between the c-value and the deactivation rate can be seen for $Co_3O_4$ particles of substantially the same numerical average particle diameter. The D-value is an improvement on the c-value because, while it still takes into account both the width of the $Co_3O_4$ particle size distribution and the numerical average particle diameter, it places a larger weighting on the numerical average $Co_3O_4$ particle diameter, which removes the need to maintain substantially the same numerical average particle diameter in order to observe trends in the data. This enables a single metric (D-value) to be reported and compared, rather than two metrics (c-value and numerical average particle diameter).

The D-value may be calculated by plotting the lognormal particle size distribution using Equation 1. The frequency at the mode of this lognormal distribution ($f_{mode}$) may be considered to be a measure of the width of the distribution. In order to account for the dependence of the FTS catalyst stability on numerical average particle diameter, the inventors have developed a formula in which $f_{mode}$ is weighted by the size distribution median to create a "size-weighted distributed breadth", or D-value, using the formula:

$$D = f_{mode}^y \times R_O \times 2 \qquad \text{Equation 2}$$

wherein $f_{mode}$ is the frequency at the mode of the lognormal distribution, $R_O$ is the numeric average particle radius, and y is an empirical value based on experimental observation. The value of y is determined via comparison of the stability of a selection of catalysts (at least about 5 to 10) with substantially similar compositions but small variations in $Co_3O_4$ particle size and size distribution width. These variations may be achieved via minor modifications of the synthesis method eg. increasing the dilution of the impregnation solution (which is shown in an example to cause subtle changes to the particle size distribution). FTS stability data on these catalysts under the same testing conditions is then collected. Within this set of similar catalysts, y is then manually adjusted to create a spread of D-values such that the difference in the stability of the FTS catalysts can be distinguished. For the catalyst composition 42% Co-0.2% Re-0.03% Pt on 16% $TiO_2/SiO_2$, the y value is 1.15.

Therefore, an increase in the D-value represents either a narrowing of the particle size distribution or an increase in the numerical average particle diameter.

The inventors have further found that the $Co_3O_4$ particle size distribution influences catalyst's FTS activity and stability, such that, preferably, the D-value of the lognormal particle size distribution of $Co_3O_4$ particles is about 19 or more. A D-value of 19.2 corresponds to a size distribution with a c-value of about 0.31 and numerical average particle diameter of about 10 nm. A D-value of 19.8 corresponds to a size distribution with a c-value of about 0.31 and an average particle size of about 8 nm. In either of these cases, a decrease in c (eg. narrowing of the size distribution) would result in an increase in D. Therefore the specification of c≤0.31 over the average particle size range 8-10 nm corresponds to particle distributions defined by having D-values greater than or equal to about 19.

In one embodiment, the D-value may be about 19 or more, e.g. 19.2 or more, 20.4 or more, 21.0 or more or 21.35 or more, or 21.4 or more. Alternatively or in addition, the D-value may be 23.5 or less, e.g. 22.2 or less. It is within the scope of the present application to combine any of these upper and lower limits such that the D-value may be 19≤D≤23.5; 19≤D≤22.2; 19.2≤D≤23.5; 19.2≤D≤22.2; 20.4≤D≤23.5; 20.4≤Dc≤22.2; 21.0≤D≤23.5; 21.0≤Dc≤22.2; 21.35≤D≤23.5; or 21.35≤D≤22.2.

In particular, the catalyst or catalyst precursor may comprise a 16% $TiO_2$ modified silica support comprising $Co_3O_4$ on the support having an average particle size of about 9.6 nm, a c-value of about 0.31 and a D-value of about 19.2. Alternatively, the catalyst or catalyst precursor may comprise a 16% $TiO_2$ modified silica support comprising $Co_3O_4$ on the support having an average particle size of about 6.2 nm, a c-value of about 0.14 and a D-value of about 29.1.

The characteristics of the $Co_3O_4$ particles may be affected by the synthetic procedure by which the catalyst precursor and catalyst are produced.

In particular, where the catalyst comprises a $TiO_2$-modified silica support, the use of a titanium alkoxide (e.g. titanium isopropoxide) to modify the support can provide a catalyst comprising $Co_3O_4$ having the above properties. In this embodiment, the catalyst precursor may contain less than 10%, or less than 5%, or preferably less than 1% crystalline $TiO_2$ (expressed as a percentage of all of the $TiO_2$ in the catalyst precursor). Alternatively, all of the $TiO_2$ present in the catalyst precursor may be amorphous or not crystalline (up to detectable limits).

Alternatively, where the catalyst comprises a $TiO_2$-modified silica support, an aqueous method (e.g. using titanium (IV) bis(ammoniumlactato)dihydroxide) may be used to modify the support in place of using a titanium alkoxide. A preferred aqueous method is as described in the section headed "Aqueous Treating of Catalyst Support" below. The resulting modified support is also able to provide a catalyst comprising $Co_3O_4$ having the above properties.

Similarly, the use of citric acid as fuel/reducing agent in the production of the catalyst precursor can provide a catalyst precursor and a catalyst comprising $Co_3O_4$ having the above properties.

Also, the number of impregnations used to form a catalyst may affect the particle size distribution and therefore the c value. Specifically, an increase in the number of impregnations may result in an increase in the c value and an increase in the deactivation rate of the catalyst. Therefore, a reduced number of impregnation steps is preferred.

In one embodiment, the catalyst may be formed using 4 impregnations resulting in a c value of 0.25, preferably with the numerical average particle diameter of $Co_3O_4$ in the range from about 8 to about 10 nm.

In a further embodiment, the catalyst may be formed using 6 impregnations resulting in a c value of 0.27, preferably with the numerical average particle diameter of $Co_3O_4$ in the range from about 8 to about 10 nm.

In a still further embodiment, the catalyst may be formed using 8 impregnations resulting in a c value of 0.30, preferably with the numerical average particle diameter of $Co_3O_4$ in the range from about 8 to about 10 nm.

Catalyst Precursor Preparation

Catalyst precursors may be prepared by the method defined above or by any of the methods discussed in WO 2008/104793. The solution or suspension may be applied to the catalyst support by spraying, impregnating or dipping.

As mentioned above, if the solution or suspension contains no water at all there is no need for the drying step and the calcination step can be carried out directly after the deposition step.

However, if a catalyst metal precursor which is a hydrate is used, the solution or suspension will necessarily contain some water of hydration. This water may be sufficient to dissolve some of the components of the solution or suspension, such as the carboxylic acid (if solid at room temperature). However, in some cases, it may be necessary to add some water to the solution or suspension in order to ensure that the catalyst metal precursor(s) and the other components are able to dissolve or become suspended. In such cases, the amount of water used is usually the minimum required to allow the catalyst metal precursor(s) and the other components to dissolve or be suspended.

The deposition, drying and calcination steps may be repeated one or more times. For each repeat, the solution or suspension used in the deposition step may be the same or different.

If the solution or suspension in each repetition is the same, the repetition of the steps allows the amount of catalyst metal(s) to be brought up to the desired level on the catalyst support stepwise in each repetition. If the solution or suspension in each repetition is different, the repetition of the steps allows schemes for bringing the amounts of different catalyst metals up to the desired level in a series of steps to be executed.

A programmed heating regime may be used during drying and calcination which increases the temperature gradually so as to control gas and heat generation from the catalyst metal precursors and the other components of the solution or suspension.

During the heating processes, the catalyst support may reach a maximum temperature of no more than 500° C., or no more than 375° C., or no more than 250° C. at atmospheric pressure.

The temperature may be ramped up at a rate of from 0.0001 to 10° C. per minute, or from 0.1 to 5° C. per minute.

An illustrative programmed heating regime may comprise:
(a) heating the catalyst support onto which the solution or suspension has been deposited at a rate of 1 to 5, or about 2° C. per minute to a temperature of 80 to 120° C., or about 100° C. and maintaining it at this temperature for 1 to 10, or about 5 hours;
(b) heating it at a rate of 1 to 5, or about 2° C. per minute to a temperature of 150 to 400° C., or 200 to 350° C., or about 250° C. and maintaining it at this temperature for 1 to 6, or about 3 hours.

The heating steps can be carried out in a rotating kiln, in a static oven or in a fluidised bed.

Once the calcination step has been completed, either after the steps are first carried out or at the end of a repetition, further catalyst metals may optionally be loaded onto the catalyst support.

The calcination step may be carried out in an oxygen-containing atmosphere (e.g. air), in particular if metal catalyst oxides are to be formed.

Catalyst Activation

The catalyst precursor may be activated by any of the conventional activation processes. For instance, the catalyst precursor may be activated using a reducing gas, such as hydrogen, a gaseous hydrocarbon, a mixture of hydrogen and a gaseous hydrocarbon (e.g. methane), a mixture of gaseous hydrocarbons, a mixture of hydrogen and gaseous hydrocarbons, a mixture of hydrogen and nitrogen, syngas, or a mixture of syngas and hydrogen.

The gas may be at a pressure of from 1 bar (atmospheric pressure) to 100 bar, or at a pressure of less than 30 bar.

The catalyst precursor may be heated to its activation temperature at a rate of from 0.01 to 20° C. per minute. The activation temperature may be no more than 600° C., or no more than 400° C.

The catalyst precursor may be held at the activation temperature for from 2 to 24 hours, or from 8 to 12 hours.

After activation, the catalyst may be cooled to a desired reaction temperature.

The catalyst, after activation, may be used in a Fischer-Tropsch process. This process may be carried out in a fixed bed reactor, a continuous stirred tank reactor, a slurry bubble column reactor or a circulating fluidized bed reactor.

The Fischer-Tropsch process is well known and the reaction conditions can be any of those known to the person skilled in the art, for instance the conditions discussed in WO 2008/104793. For example the Fischer-Tropsch process may be carried out at a temperature of from 150 to 300° C., or from 200 to 260° C., a pressure of from 1 to 100 bar, or from 15 to 25 bar, a $H_2$ to CO molar ratio of from 1:2 to 8:1, or about 2:1, and a gaseous hourly space velocity of from 200 to 5000, or from 1000 to 2000.

In a Fischer Tropsch reaction carried out in a microchannel reactor comprising using a catalyst according to the present invention or a catalyst derived from a catalyst precursor according to the present invention, the performance of the catalyst is substantially maintained over a reaction period of about 5000 hours or more without regeneration of the catalyst, such that the contact time is less than 500 milliseconds, the CO conversion is greater than 50% and the methane selectivity is less than 15%.

The reaction period may be 8000 hours or more. Preferably, the reaction is carried out in a microchannel reactor.

The reaction period of 5000 hours or more, preferably 8000 hours or more may be continuous or interrupted.

By "performance of the catalyst is substantially maintained" is meant that the average contact time, the average CO conversion and the average methane selectivity parameters during the reaction period are in the ranges described above. Additionally, the reaction period may be divided into one or more data collection intervals and the average contact time, the average CO conversion and the average methane selectivity parameters during each data collection interval may be in the ranges described above. The data collection intervals may be, for example, 24 hours, 12 hours, 6 hours, 3 hours or 1 hour in duration. In particular, the data collection interval is 1 hour. In this way, although there may be minor variations of these parameters, the overall performance of the catalyst in terms of the contact time, CO conversion and methane selectivity is still considered to be maintained.

The "contact time" is derived from the volume of a reaction zone within a microchannel divided by the volumetric feed flow rate of the reactants at a temperature of 0° C. and a pressure of one atmosphere.

In a Fischer Tropsch reaction comprising using a catalyst according to the present invention or a catalyst derived from a catalyst precursor according to the present invention, the deactivation rate of the catalyst measured as percent loss of CO conversion per day is 0.09% or less over a reaction period of about 5000 hours or more. In particular, the reaction period may be 8000 hours or more. Preferably, the reaction is carried out in a microchannel reactor. The reaction period may be continuous or interrupted.

Aqueous Treating of Catalyst Support

The present method relates to a method for the preparation of a modified catalyst support and the catalyst supports formed using this method. The present method also relates to catalyst precursors and catalysts formed on the modified catalyst support.

The supports, precursors and catalysts of the present method are particularly suitable for use in Fischer-Tropsch reactions.

The modification of catalyst supports has conventionally been carried out using organic solvents, as described in, for example, Bouh et al., J. Am. Chem. Soc, 121 (1999) 7201, Bu et al., Advanced Materials Research, 194 (2011) 1807 and US patent application US 2010/0024874 A1 In the modern era, there is a continual push towards more environmentally friendly, or "greener", technologies. This push has caused considerable interest in water-based processes in the catalyst manufacturing industry. Furthermore, the use of aqueous methods, compared to non-aqueous methods, often results in a lowering of manufacturing costs.

Therefore, there is a need for further aqueous methods for the preparation of modified catalyst supports.

U.S. Pat. No. 7,510,994 discloses a method of loading an oxide of titanium onto a support in film form in an amount of from 0.5 to 10% through impregnation with an aqueous solution containing compounds which act as titanium sources.

An object of the present method is to provide an improved method for the preparation of an improved modified catalyst support.

A further object of the present method is to provide improved modified catalyst supports, catalyst precursors and catalysts.

The present method provides a method for the preparation of a modified catalyst support comprising (a) treating a bare catalyst support material with an aqueous solution or dispersion of one or more titanium metal sources and one or more carboxylic acids and (b) drying the treated support and (c) optionally calcining the treated support.

This method is advantageous for environmental reasons. In particular, aqueous methods are more environmentally friendly than non-aqueous methods because the by-products of aqueous methods are easier to dispose of safely and are less toxic.

This method is also advantageous because it provides a modified catalyst support which is more stable than modified catalyst supports produced by alternative methods, particularly methods in which one or more carboxylic acids are not used. This is also shown in the examples of this application.

This method is also advantageous because it provides a modified catalyst support which, when used to manufacture a catalyst, provides a more active catalyst as shown in the examples of this application.

The present method also provides a modified catalyst support obtainable by the methods described herein.

The modified catalyst support of the present method is advantageous because it is more stable than alternative supports. This is also shown in the examples of this application.

The modified catalyst support of the present method is advantageous because it can be used to manufacture a more active catalyst as shown in the examples of this application.

The present method also provides a method for preparing a catalyst precursor comprising (a) depositing a solution or suspension comprising at least one catalyst metal precursor and a complexing/reducing agent onto the modified catalyst support according to the present method; (b) optionally drying the modified catalyst support onto which the solution or suspension has been deposited; and (c) calcining the modified catalyst support onto which the solution or suspension has been deposited.

The present method also provides a catalyst precursor obtainable by the method according to this aspect of the method. The present method further provides a catalyst precursor comprising the modified catalyst support according to the method.

A catalyst precursor comprising the modified catalyst support of the present method is advantageous because it is more stable than a catalyst precursor comprising a modified catalyst support synthesised by alternative methods. This is shown in the examples of this application.

A catalyst precursor comprising the modified support of the present method is advantageous because it can be activated to provide a more active catalyst as shown in the examples of this application.

The present method also provides a catalyst obtainable by activation of the catalyst precursor according to these aspects of the method.

A catalyst comprising the modified catalyst support of the present method is advantageous because it is a more active catalyst as shown in the examples of this application.

In addition, a catalyst comprising the modified catalyst support of the present method is advantageous because it has a lower deactivation rate (i.e. is more stable) compared to catalysts comprising alternative modified catalyst supports. This is shown in the examples of this application.

The present method also provides the use of the modified catalyst support according to the present method as a substrate in the manufacture of a Fischer-Tropsch catalyst.

The present method also provides the use of a catalyst comprising the modified catalyst support according to the present method to catalyse a Fischer-Tropsch reaction.

The present method also provides the use of the catalyst precursor according to the present method to form a Fischer-Tropsch catalyst.

The present method also provides the use of the activated catalyst according to the present method to catalyse a Fischer-Tropsch reaction.

Support Modification Method

As used herein, the term "modified catalyst support" means a catalyst support whose structure and/or composition has been altered from the bare catalyst support material by the incorporation of a refractory solid oxide in at least a part of the volume of the support material. The term "bare catalyst support" refers to a catalyst support material that is substantially free of catalytic metals, i.e. platinum group metals, iron, nickel, copper or cobalt. Suitable bare catalyst support materials are silica or refractory oxides, for example refractory oxides of Mg, Si, Ti, Zn, Al, Zr, Hf, Y or Ce or mixtures thereof. In other embodiments the catalyst support material may comprise or consist essentially of carbon, a zeolite, a boronitride or silicon carbide. If the bare catalyst support material is also a refractory solid oxide, the refractory solid oxide which modifies the structure or composition of the bare catalyst support material will suitably be different to the bare catalyst support material. A catalyst may then be affixed to the modified catalyst support.

As used herein, the term "treating" when referring to the treating of a bare catalyst support material with the aqueous solution described herein means a method of including a modifying material on or in the bare catalyst support material. Treating includes such methods as impregnating, coating, brushing, spraying, rolling or spreading. The preferred method of treating used is impregnation, for example by spraying.

The bare catalyst support material may be in the form of a structured shape, pellets or a powder.

The refractory solid oxide which modifies the bare catalyst support material comprises or consists of a titanium metal oxide.

Preferably, the modified catalyst support is a titania-modified silica support.

Treating of the bare catalyst support material with the modifying material may involve spraying the bare support material into the aqueous treatment solution one or more times (e.g. 1, 2, 3, 4, 5, 6, 7, 8, 9, 10 or more times). As used herein, the "aqueous treatment solution" is the aqueous solution or dispersion comprising one or more titanium metal sources and one or more carboxylic acids as described in claim 1.

Each spraying of the support material may last from about 5 minutes to about 1 hour, preferably from about 15 minutes to about 30 minutes. Typically spraying of the basic support material takes place at a temperature of 30° C. or less. The volume of the solution or dispersion taken up by the bare catalyst support in the process may suitably range from about 0.5 to about 2.50 ml per gram of bare support material.

The aqueous treatment solution is an aqueous solution or dispersion comprising one or more titanium metal sources and one or more carboxylic acids.

The term "aqueous" herein refers to solutions or suspension of the reagents in a solvent or solvent mixture that is predominantly (i.e. more than 50%, suitably more than 80%, for example more than 95%, and most typically about 100%) water. Preferably the aqueous treatment solution comprises from about 68% w/v to about 88% w/v water, preferably from about 70% w/v to about 75% w/v water.

Suitably, the titanium metal source may be present as a water soluble titanium metal ion complex or water soluble compound, preferably a complex. The titanium metal source may comprise one or more different titanium metals. The term "water soluble" herein signifies a solubility in water of at least about 10 g/liter to form a solution that is stable against precipitation for at least about one hour.

Suitable titanium metal sources include soluble complexes of a titanium metal with an organic complexing/reducing agent. The organic complexing/reducing agents may be mono-, bi- or tridentate. Suitable organic complexing/reducing agents include alcohols, aldehydes, ketones, amino acids, amides, ureas, carboxylic acids and mixtures thereof. Suitably, the soluble titanium metal source is substantially or completely free of sulphur and/or halide, since these could react adversely with the substrate, catalytic metal and/or metal promoter. Likewise, suitably the soluble titanium metal source is suitably substantially free of metals other than the titanium metal (e.g. sodium or potassium counter-ions) since these could react adversely with the substrate, catalytic metal and/or metal promoter. Thus, for example, the titanium metal compound is suitably a soluble complex of the titanium metal with one or more organic ligands comprising only C, H, O and/or N and any counterions are selected from organic counterions, ammonium counterions, and carbonate counterions.

An example of a suitable titanium metal complex is titanium (IV) bis (ammoniumlactato) dihydroxide (TALH).

The one or more titanium metal sources may be present in the aqueous treatment solution in an amount of about 30% w/v to about 45% w/v, preferably about 40% w/v to about 45% w/v. Where the titanium metal complex is TALH, the concentration is preferably from about 40% w/v to about 45% w/v.

One or more carboxylic acids are present in the aqueous treatment solution. The carboxylic acids are organic acids that are soluble in water.

Suitable carboxylic acids may be branched, linear or unbranched, saturated, unsaturated, aliphatic and/or aromatic, and/or derivatives thereof. Suitably, the carboxylic acid comprises or consists essentially of one or more dicarboxylic or tricarboxylic acids. Alternatively or in addition, the carboxylic acid may comprise one or more alpha- or beta-hydroxyl carboxylic acids. Examples of suitable carboxylic acids include citric acid, tartaric acid, malic acid, maleic acid, lactic acid, glycolic acid, propionic acid, succinic acid, oxalic acid and combinations thereof.

Mixtures or one of more different carboxylic acids may be used. In one embodiment, the mixture of one or more different carboxylic acids includes a tricarboxylic acid, preferably citric acid. In an alternative embodiment, the mixture of one or more different carboxylic acids includes an alpha hydroxyl carboxylic acid, such as lactic acid. In a further alternative embodiment, the mixture of one or more different carboxylic acids includes a tricarboxylic acid, preferably citric acid, and an alpha hydroxyl carboxylic acid, preferably lactic acid.

Preferred carboxylic acids are lactic acid, citric acid and mixtures thereof. In one embodiment, citric acid must be present in the aqueous treatment solution.

Without wishing to be bound by theory, the inventors believe that the one or more carboxylic acids, particularly citric acid, in the aqueous treatment solution act as ligands to the titanium metal source thereby changing the coordination sphere around the titanium metal. The carboxylic acid is also thought to replace OH groups on the bare catalyst support material (e.g. silica) forming dimeric and oligomeric titanium metal species on the surface of the bare catalyst support material leading to a higher dispersion of the titanium metal species over the bare catalyst support material surface. This is thought to lead to the increased stability of a catalyst manufactured with the modified catalyst support.

The one or more carboxylic acids may be present in the aqueous treatment solution in an amount of about 5% w/v to about 20% w/v, preferably from about 18% w/v to about 20% w/v, more preferably from about 18% w/v to about 19% w/v.

Preferably, the aqueous treatment solution consists of a titanium precursor, a carboxylic acid and water. Preferably, the aqueous treatment solution has a pH of from about 3.0 to about 3.5. A particularly preferred aqueous treatment solution has from about 40% w/v to about 45% w/v of TALH, from about 18% w/v to about 20% w/v of citric acid, the remainder water and a pH of from about 3.0 to about 3.5.

The treated support may be dried following treatment. The drying step may take place in a box furnace. Where a box furnace is used, preferably drying takes place by heating at a temperature that increases at a rate (known as a "ramp rate") of 2° C./min up to a temperature of 100° C. and the temperature is then held at 100° C. for about 5 hours. Alternatively, drying may take place in other equipments, such as in a cone blender or in a rotary calciner. Where a rotary calciner is used, preferably the ramp rate is higher than 2° C./min and the holding time is shorter than 5 hours.

The treated support may be calcined following treatment. Calcining may increase stability of a catalyst manufactured with the modified catalyst support. Calcination may use a programmed heating regime which increases the temperature gradually so as to control gas and heat generation from the treated support and the other components of the treatment solution. A preferred heating regime has a final temperature of up to 250° C. Preferably, the temperature ramp rate is 2° C./min. The final temperature should not exceed about 250° C. because calcining at higher temperatures reduces the amount of carbon and nitrogen retained on the modified support after drying and calcination, which has the effect of reducing catalyst stability. During calcination of the treated support, the final temperature is preferably held for about 5 hours. Typically, after calcination the modified catalyst support contains from about 5% to about 15% carbon, preferably from about 6% to about 7% carbon, and from about 1% to about 1.5% nitrogen.

The modified catalyst support of the present method is preferably a modified Fischer-Tropsch catalyst support.

Modified Catalyst Support

The present method further provides a catalyst support obtainable by the method of the present method.

Method of Preparation of Catalyst Precursor

A method for preparing a catalyst precursor may comprise (a) depositing a solution or suspension comprising at least one catalyst metal precursor and a complexing/reducing agent onto the modified catalyst support of the present method; (b) optionally drying the modified catalyst support onto which the solution or suspension has been deposited; and (c) calcining the modified catalyst support onto which the solution or suspension has been deposited.

Other methods for the preparation of catalyst precursors may be found in WO 2008/104793.

The catalyst metal precursor may be a cobalt-containing precursor.

Suitable cobalt-containing precursors include cobalt benzoylacetonate, cobalt carbonate, cobalt cyanide, cobalt hydroxide, cobalt oxalate, cobalt oxide, cobalt nitrate, cobalt acetate, cobalt acetylacetonate and cobalt citrate. These cobalt precursors can be used individually or in combination. These cobalt precursors may be in the form of hydrates or in anhydrous form. In some cases, where the cobalt precursor is not soluble in water, such as cobalt carbonate or cobalt hydroxide, a small amount of nitric acid or a carboxylic acid may be added to enable the precursor to fully dissolve in an aqueous solution or suspension.

In one embodiment, the catalyst metal precursor is cobalt nitrate. Cobalt nitrate may react with a complexing/reducing agent, such as citric acid, during calcination to produce $Co_3O_4$. The citric acid may act as a complexing/reducing agent and/or as a fuel (i.e. reducing agent for cobalt nitrate) in the calcination reaction.

The solution or suspension may contain a mixture of the primary catalyst metal precursor (i.e. a cobalt-containing precursors) and at least one secondary catalyst metal precursor. Such secondary catalyst metal precursor(s) may be present to provide a promoter and/or modifier in the catalyst. Suitable secondary catalyst metals include noble metals, such as Pd, Pt, Rh, Ru, Ir, Au, Ag and Os, transition metals, such as Zr, Ti, V, Cr, Mn, Fe, Co, Ni, Cu, Zn, Nb, Mo, Tc, Cd, Hf, Ta, W, Re, Hg and Ti and the 4f-block lanthanides, such as La, Ce, Pr, Nd, Pm, Sm, Eu, Gd, Tb, Dy, Ho, Er, Tm, Yb and Lu.

In particular, the secondary catalyst metals may be one or more of Pd, Pt, Ru, Ni, Co (if not the primary catalyst metal), Fe (if not the primary catalyst metal), Cu, Mn, Mo, Re and W.

Suitable complexing/reducing agents for use in the method of making the catalyst precursor of the present method are urea, carboxylic acids such as citric acid, glycolic acid, propionic acid, succinic acid, lactic acid or oxalic acid. Mixtures of complexing/reducing agents may also be used.

If a catalyst metal precursor which is a hydrate is used, the solution or suspension will necessarily contain some water of hydration. This water may be sufficient to dissolve some of the components of the solution or suspension, such as the complexing/reducing agent (if solid at room temperature). However, in some cases, it may be necessary to add some water to the solution or suspension in order to ensure that the catalyst metal precursor(s) and the other components are able to dissolve or become suspended. In such cases, the amount of water used is usually the minimum required to allow the catalyst metal precursor(s) and the other components to dissolve or be suspended.

As will be clear to the skilled person, the choice of complexing/reducing agent will be partly dictated by the aqueous/non-aqueous nature of the solution or suspension. For example, if the solution or suspension is aqueous, a citric acid complexing/reducing agent is preferred because it provides a highly stable catalyst compared to other organic complexing/reducing agents such as polyols and sugars. The use of citric acid is also preferred because it provides a catalyst which is selective and stable at CO conversion levels greater than 70%.

The use of an aqueous method for the preparation of a modified catalyst support in combination with an aqueous method for the preparation of the catalyst precursor is advantageous for environmental reasons. In particular, aqueous methods are more environmentally friendly than non-aqueous methods because the by-products of aqueous methods are easier to dispose of safely and are less toxic. For example, most organic solvents are highly flammable and have low boiling points. As such, the vapours of these organic solvents tend to escape through the exhaust without decomposing. An effect of this is that manufacturing plants need to have extra safety measures in addition to COx and NOx scrubbers.

Optionally, the modified catalyst support onto which the solution or suspension has been deposited may be dried. Drying may take place at a temperature in the range from about 100° C. to about 130° C., preferably from about 100° C. to about 120° C. Drying may take place in a box oven, furnace or rotary calciner. Preferably drying takes place by heating at a temperature that increases at a ramp rate of 2° C./min up to a temperature of 100° C. and the temperature is then held at 100° C. for about 5 hours.

The modified catalyst support onto which the solution or suspension has been deposited may be calcined at a temperature in the range from about 200° C. to about 350° C., preferably from about 200° C. to about 250° C. Calcining may take place in a box oven, furnace or rotary calciner. Preferably, calcining takes place by heating at a temperature that increases at a ramp rate of 2° C./min up to a final temperature of 250° C. The temperature is held at 250° C. for about 3 hours. Alternatively, calcining preferably takes place by heating at a temperature that increases at a ramp rate of 2° C./min up to a temperature of 200° C. The temperature is held at 200° C. for about 3 hours before being increased again at a ramp rate of 1° C./min up to a temperature of 250° C. and then held at that temperature for a further 3 hours. The final temperature should not exceed about 250° C. because calcining at higher temperatures reduces the amount of carbon and nitrogen retained on the modified support after drying and calcination, which has the effect of reducing catalyst stability.

The deposition, drying and calcination steps may be repeated one or more times. For each repeat, the solution or suspension used in the deposition step may be the same or different. If the solution or suspension in each repetition is the same, the repetition of the steps allows the amount of catalyst metal(s) to be brought up to the desired level on the modified catalyst support stepwise in each repetition. If the solution or suspension in each repetition is different, the repetition of the steps allows schemes for bringing the amounts of different catalyst metals up to the desired level in a series of steps to be executed.

A programmed heating regime may be used during drying and calcination which increases the temperature gradually so as to control gas and heat generation from the catalyst metal precursors and the other components of the solution or suspension.

During the heating processes, the catalyst support may reach a maximum temperature of no more than 500° C., or no more than 375° C., or no more than 250° C. at atmospheric pressure.

The temperature may be ramped up at a rate of from 0.0001 to 10° C. per minute, or from 0.1 to 5° C. per minute.

An illustrative programmed heating regime may comprise:
(a) heating the catalyst support onto which the solution or suspension has been deposited at a rate of 1 to 10, or about 1 to 5, or about 2° C. per minute to a temperature of 80 to 120° C., or about 100° C. and maintaining it at this temperature for 0.25 to 10, or about 1 to 10, or about 5 hours;
(b) heating it at a rate of 1 to 10, or about 1 to 5, or about 2° C. per minute to a temperature of 150 to 400° C., or 200 to 350° C., or about 250° C. and maintaining it at this temperature for 0.25 to 6, or about 1 to 6, or about 3 hours.

The heating steps can be carried out in a rotating kiln, in a static oven or in a fluidised bed. Preferably, the heating steps are carried out in a rotating kiln because generally this has a more even temperature profile than a static oven.

Once the calcination step has been completed, either after the steps are first carried out or at the end of a repetition, further catalyst metals may optionally be loaded onto the catalyst support.

The calcination step may be carried out in an oxygen-containing atmosphere (e.g. air), in particular if metal catalyst oxides are to be formed.

Catalyst Precursor

A catalyst precursor is a material that may be activated to form a catalyst. The terms "catalyst" and "catalyst precursor" are used herein interchangeably and will be understood accordingly to their specific context.

A catalyst precursor comprises at least one catalyst metal, such as cobalt, which may be present in oxide form, as elemental metal or as a mixture of any of these. In particular, the catalyst precursor may comprise from 10 to 60% cobalt (based on the weight of the metal as a percentage of the total weight of the catalyst precursor), or from 35 to 50% of cobalt, or from 40 to 44% of cobalt or about 42% of cobalt. The cobalt may be present as $Co_3O_4$.

The catalyst precursor may comprise a noble metal on the support that may be one or more of Pd, Pt, Rh, Re, Ru, Ir, Au, Ag and Os. In particular, the noble metal may be selected from the group consisting of Ru, Re or Pt, and mostsuitably it comprises Pt. The catalyst precursor may suitably comprise from about 0.01 to about 1% in total of noble metal(s) (based on the total weight of all noble metals present as a percentage of the total weight of the catalyst precursor), or from about 0.015 to about 0.5% in total of noble metal(s), or from about 0.02 to about 0.3% in total of noble metal(s).

If desired, the catalyst precursor may include one or more other metal-based components as promoters or modifiers. These metal-based components may also be present in the catalyst precursor at least partially as oxides or elemental metals. A suitable metal for the one or more other metal-based components is one or more of Zr, Ti, V, Cr, Mn, Ni, Cu, Zn, Nb, Mo, Tc, Cd, Hf, Ta, W, Re, Hg, Tl and the 4f-block lanthanides. Suitable 4f-block lanthanides are La, Ce, Pr, Nd, Pm, Sm, Eu, Gd, Tb, Dy, Ho, Er, Tm, Yb and Lu. In particular, the metal for the one or more other metal-based components may be one or more of Zn, Cu, Mn, Mo and W. Alternatively, the metal for the one or more other metal-based components may be one or more of Re and Pt. The catalyst precursor may comprise from 0.01 to 10% in total of other metal(s) (based on the total weight of all the other metals as a percentage of the total weight of the catalyst precursor), or from 0.1 to 5% in total of other metals, or about 3% in total of other metals.

The catalyst precursor may contain up to 10% carbon (based on the weight of the carbon, in whatever form, in the catalyst as percentage of the total weight of the catalyst precursor), or from 0.001 to 5% of carbon, or about 0.01% of carbon. Alternatively, the catalyst precursor may comprise no carbon.

Optionally, the catalyst precursor may contain a nitrogen-containing organic compound such as urea, or an organic ligand such as an amine or a carboxylic acid, such as citric acid or acetic acid, which may be in the form of a salt or an ester.

The precursor may be activated to produce a Fischer-Tropsch catalyst, for instance by heating the catalyst precursor in hydrogen and/or a hydrocarbon gas, or in a hydrogen gas diluted with another gas, such as nitrogen and/or methane, to convert at least some of the oxides to elemental metal. In the active catalyst, the cobalt may optionally be at least partially in the form of its oxide.

Catalyst Activation

The catalyst precursor may be activated by any of the conventional activation processes. For instance, the catalyst precursor may be activated using a reducing gas, such as hydrogen, a gaseous hydrocarbon, a mixture of hydrogen and a gaseous hydrocarbon (e.g. methane), a mixture of gaseous hydrocarbons, a mixture of hydrogen and gaseous hydrocarbons, a mixture of hydrogen and nitrogen, syngas, or a mixture of syngas and hydrogen.

The gas may be at a pressure of from 1 bar (atmospheric pressure) to 100 bar, or at a pressure of less than 30 bar.

The catalyst precursor may be heated to its activation temperature at a rate of from 0.01 to 20° C. per minute. The activation temperature may be no more than 600° C., or no more than 400° C.

The catalyst precursor may be held at the activation temperature for from 2 to 24 hours, or from 8 to 12 hours.

After activation, the catalyst may be cooled to a desired reaction temperature.

The catalyst, after activation, may be used in a Fischer-Tropsch process. This process may be carried out in a fixed bed reactor, a continuous stirred tank reactor, a slurry bubble column reactor or a circulating fluidized bed reactor.

The Fischer-Tropsch process is well known and the reaction conditions can be any of those known to the person skilled in the art, for instance the conditions discussed in WO 2008/104793. For example the Fischer-Tropsch process may be carried out at a temperature of from 150 to 300° C., or from 200 to 260° C., a pressure of from 1 to 100 bar, or from 15 to 25 bar, a $H_2$ to CO molar ratio of from 1.2 to 2.2 or 1.5 to 2.0 or about 1.8, and a gaseous hourly space velocity of from 200 to 5000, or from 1000 to 2000.

It will be recognised that features related to one aspect of the method are also, where applicable, features of other aspects of the method. It will further be recognised that features specified herein in one embodiment of the method may be combined with other features specified herein to provide further embodiments.

MODES FOR CARRYING OUT THE INVENTION

The present invention is now described, by way of illustration only, in the following examples. It will be understood that these examples are not limiting and that variations and modifications may be made within the spirit and scope of the invention as set out above and as defined in the following claims.

Use of a Carboxylic Acid as the Polar Organic Compound (a) Alkoxide Method

A catalyst precursor having the composition 42% Co-0.2% Re-0.03% Pt/$TiO_2$—$SiO_2$ was made using the following reagents:

|  | Supplier | Code | Purity |
|---|---|---|---|
| Titanium (IV) isopropoxide | Sigma-Aldrich | 205273 | 97% |
| Cobalt nitrate hexahydrate | Sigma-Aldrich | 230375 | 98% |
| Tetraammine platinum hydroxide | Alfa Aesar | 38201-97-7 | 9.3% Pt w/w |
| Silica | Grace Davison | (180-300 µm) |  |
| Citric acid monohydrate (CA) | Sigma Aldrich | C1909 | ACS Reagent |
| Perrhenic acid | Sigma Aldrich | 70 wt % solution in water | 99.99% |

Support Preparation 100 g of 16% $TiO_2$-modified silica (expressed as a weight percentage of the catalyst support) was prepared from:

| Silica (180-300 µm) | 84 g |
| Ti-isopropoxide | 58.7 g |
| Iso-propanol | 60 mL |
| Approximate solution volume | 120 mL |

The silica was dried at 100° C. for 2 hours and cooled to room temperature before impregnation. Titanium isopropoxide was mixed with isopropanol. The required amount of silica was impregnated with the resulting titanium isopropoxide solution.

Drying was then carried out at: 2° C./100° C./10 h (Ramp/Temp/Hold).

Preparation of Impregnation Solution

An impregnation solution was prepared first by dissolving 15 g citric acid in water using the minimum water required to get a clear solution. To the clear solution, 106 g of cobalt nitrate hexahydrate was added and the solution heated to 40-45° C. until the salt dissolved. Perrhenic acid (0.19 g) was added to the cobalt nitrate/citric acid solution and mixed well. The solution was cooled to room temperature (<30° C.) and made up to 85 ml.

Multiple Impregnation and Calcination (4 Steps)

21-22 ml of the stock solution was used for the incipient wetness impregnations shown in Table 1(a).

Drying/Calcination was carried out after each impregnation:

2° C./100° C./5 h; 2° C./250° C./3 h.

Promoter Addition—5th Impregnation Step

Weight of catalyst taken (after 4 impregnations)=20 g 0.03% Pt addition: Tetraamine platinum hydroxide solution (0.06 g) was diluted to 9 mL with water and used for the 5th impregnation.

Drying/Calcination: 2° C./100° C./5 h; 2° C./250° C./3 h.

Figure 2:
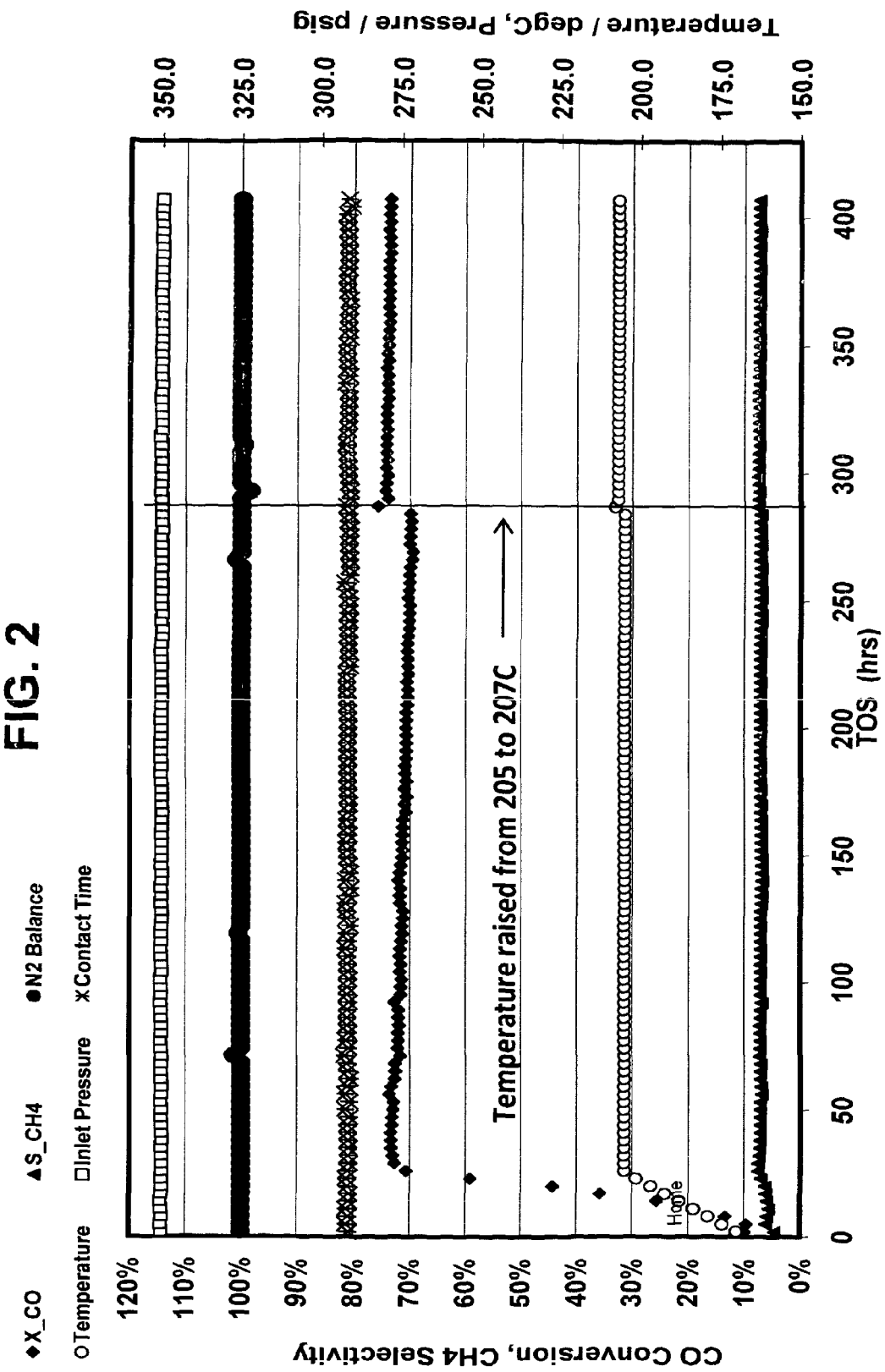
FIG. 2 shows the results of a Fischer-Tropsch synthesis (FTS) in a microchannel reactor with a catalyst (42% Co-0.2% Re-0.03% Pt/$TiO_2$—$SiO_2$) made using citric acid at 290 millisecond contact time, 205-207° C., 350 psig, $H_2$:CO=2:1, pressure drop of 34 psid.

The particle size distribution for the 180×300 µm support versus catalyst made with the same support and citric acid is shown in FIG. 1. As is evident, the level of fracturing is low and thus the finished catalyst does not have to be screened to have an acceptable pressure drop. Furthermore, the performance of the catalyst made with citric acid in a microchannel reactor is very stable while maintaining a high level of CO conversion and low methane selectivity for Fischer-Tropsch synthesis as illustrated in FIG. 2 (the deactivation rate is 0.12% per day).

(b) Aqueous Method 1

A catalyst precursor was made using the following reagents:

|  | Supplier | Code | Purity |
|---|---|---|---|
| Cobalt nitrate hexahydrate | Sigma-Aldrich | 230375 | 98% |
| Tetraammine platinum hydroxide | Alfa Aesar | 38201-97-7 | 9.3% Pt w/w |
| Silica (SG432) | Grace Davison | (180-300 µm) |  |
| Citric acid monohydrate (CA) | Sigma Aldrich | C1909 | ACS Reagent |
| Perrhenic acid | Sigma Aldrich | 70 wt % solution in water | 99.99% |

Support Preparation 100 g of 16% $TiO_2$-modified silica (expressed as a weight percentage of the catalyst support) was prepared from:

| Silica (180-300 µm) | 84 g |
| Citric acid monohydrate | 25 g |
| Titanium (IV) bis(ammoniumlactate)dihydroxide solution (TALH) | 118 g (97 mL) |
| Approximate solution volume | 130-135 mL |

The silica bare catalyst support material was dried at 100° C. for 2 hours and allowed to cool to room temperature before impregnation. 25 g citric acid was dissolved in minimum water at 40 to 45° C. and cooled down to less than 30° C. The citric acid solution was then added to 118 g (97 ml) of titanium (IV) bis(ammoniumlactate)dihydroxide solution (TALH) and made up to the required volume of impregnation, which was about 130 to 135 ml, with water. The required amount of silica (84 g, weight determined after drying) was impregnated by spraying with the resulting citric acid—TALH impregnation solution.

Drying was then carried out at 2° C./100° C./5 h (Ramp/Temp/Hold) and calcining was carried out at 2° C./250° C./5 h (Ramp/Temp/Hold). The yield of the modified catalyst support B after drying and calcining was about 120 g. The modified catalyst support was dark brown in colour.

Preparation of First Impregnation Solution 25 g of cobalt nitrate hexahydrate (Sigma Aldrich, 98% purity) was dissolved in water and then the solution was heated to 40 to 45° C. until the salt dissolved completely.

The minimum required water was used to obtain a clear solution. 0.048 g of perrhenic acid (Sigma Aldrich, 70 wt % solution in water, 99.99% purity) was added to the cobalt nitrate solution and mixed well. The resulting solution was cooled to room temperature (less than 30° C.) and made up with water to 19 ml.

Impregnation—1st Step

A first impregnation of the catalyst support modified using the aqueous method was carried out by using 19 ml of the cobalt nitrate/perrhenic acid solution to impregnate 20 g of the modified catalyst support. The resulting modified catalyst support was then dried at a temperature that increased at a ramp rate of 2° C./min up to 100° C. The temperature was held at 100° C. for 5 hours. The modified support catalyst was subsequently calcined by increasing the temperature to 200° C. using a ramp rate of 2° C./min and holding the temperature at 200° C. for 3 hours, followed by further increasing the temperature to 250° C. using a ramp rate of 2° C./min and holding the temperature at 250° C. for 1 hour.

Preparation of Impregnation Solution for 2nd to 4th Step 12 g of citric acid monohydrate (Sigma Aldrich, ACS Reagent) was dissolved in water. To the clear solution was added 81.4 g of cobalt nitrate hexahydrate (Sigma Aldrich, 98% purity) and then the solution was heated to 40 to 45° C. until the salt dissolved. The minimum required water was used to obtain a clear solution. 0.14 g of perrhenic acid (Sigma Aldrich, 70 wt % solution in water, 99.99% purity) was added to the cobalt nitrate and citric acid solution and was mixed well. The resulting stock solution was cooled to room temperature (less than 30° C.) and made up with water to 66 to 67 ml.

Impregnation—2nd to 4th Steps

A second impregnation step was carried out by using about 22 ml of the stock solution to impregnate the modified catalyst support B obtained from the first impregnation step (27.20 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours. A third impregnation step was carried out by using about 22 ml of the stock solution to impregnate the modified catalyst support B obtained from the second impregnation step (34.40 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours. A fourth impregnation step was carried out by using about 22 ml of the stock solution to impregnate the modified catalyst support B obtained from the third impregnation step (41.60 g). The modified catalyst support was then dried at a temperature that increased at a ramp rate of 2° C./min up to 100° C. The temperature was held at 100° C. for 5 hours. The modified support catalyst was subsequently calcined by increasing the temperature to 250° C. using a ramp rate of 2° C./min and holding the temperature at 250° C. for 3 hours. The four impregnation steps are summarised in Table 1(b). The total value in Table 1(b) relates to the total of steps 2 to 4 only.

Promoter Addition—5th Impregnation Step

A promoter addition step was then carried out using 20 g of the catalyst precursor obtained after the four impregnation steps. 0.06 g of tetraammine platinum hydroxide (Alfa Aesar, 9.3% Pt w/w) was added to 9 ml water to make a dilute solution and this solution was used to further impregnate the catalyst precursor. After impregnation, the catalyst was then dried at a temperature that increased at a ramp rate of 2° C./min up to 100° C. The temperature was held at 100° C. for 5 hours. The catalyst was subsequently calcined by increasing the temperature to 250° C. using a ramp rate of 2° C./min and holding the temperature at 250° C. for 3 hours.

The resulting catalyst had 0.03% Pt.(c) Aqueous method 2

A modified catalyst support (16% $TiO_2$ on silica) was made in the same way as specified in the "Support Preparation" section above for aqueous method 1 but without using citric acid.

A catalyst precursor was synthesised using the same method outlined in the "Preparation of impregnations solution", "Multiple impregnation and calcination (4 steps)" and "Promoter addition—5th impregnation step" sections outlined in the alkoxide method above but using the modified catalyst support made by aqueous method 2 rather than a support made by the alkoxide method.

Use of Urea as the Polar Organic Compound (Reference Example)

A catalyst precursor having the composition 42% Co-0.2% Ru/$TiO_2$—$ZrO_2$—$SiO_2$ was made using the following reagents

|  | Supplier | Code | Purity |
|---|---|---|---|
| Titanium (IV) isopropoxide | Sigma-Aldrich | 205273 | 97% |
| Cobalt nitrate hexahydrate | Sigma-Aldrich | 230375 | 98% |
| Zirconium (IV) oxynitrate hydrate | Sigma-Aldrich | 243493 | 99% |
| Ruthenium (III) nitrosyl nitrate | Strem chemicals | 44-3800 | 1.5% Ru |
| Silica | Grace Davison | (180-300 mm) |  |
| Urea | Fischer Scientific | U/0450/63 | 99+% |

Support Preparation 100 g of 10.7% $TiO_2$-modified silica (expressed as a weight percentage of the catalyst support) was prepared from:

| Silica (180-300 μm) | 90 g |
|---|---|
| Ti-isopropoxide | 39.6 g |
| Absolute ethanol | 110 mL |

The silica was dried at 100° C. for 2 hours and cooled before impregnation. Titanium isopropoxide was mixed with absolute ethanol. The required amount of silica was impregnated with the resulting titanium solution.

Drying was then carried out at: 2° C./100° C./4 h; 2° C./350° C./4 h (Ramp/Temp/Hold).

Catalyst Preparation 1 41 g of support (10.7% $TiO_2$ on silica) was weighed out.
2 The impregnation solution was prepared using the amounts of reagents given in Table 2 for each impregnation. Cobalt nitrate hexahydrate and urea were weighed out and mixed together until a pink solid paste was obtained. The salt was heated to dissolve it (e.g., 60-70° C.). Zirconium nitrate was dissolved in minimum water and heated until a clear solution was obtained (e.g., 60-70° C.). The hot Zr solution was added over the pink paste and mixed together. The mixture was heated until a clear solution obtained.

Figure 3:
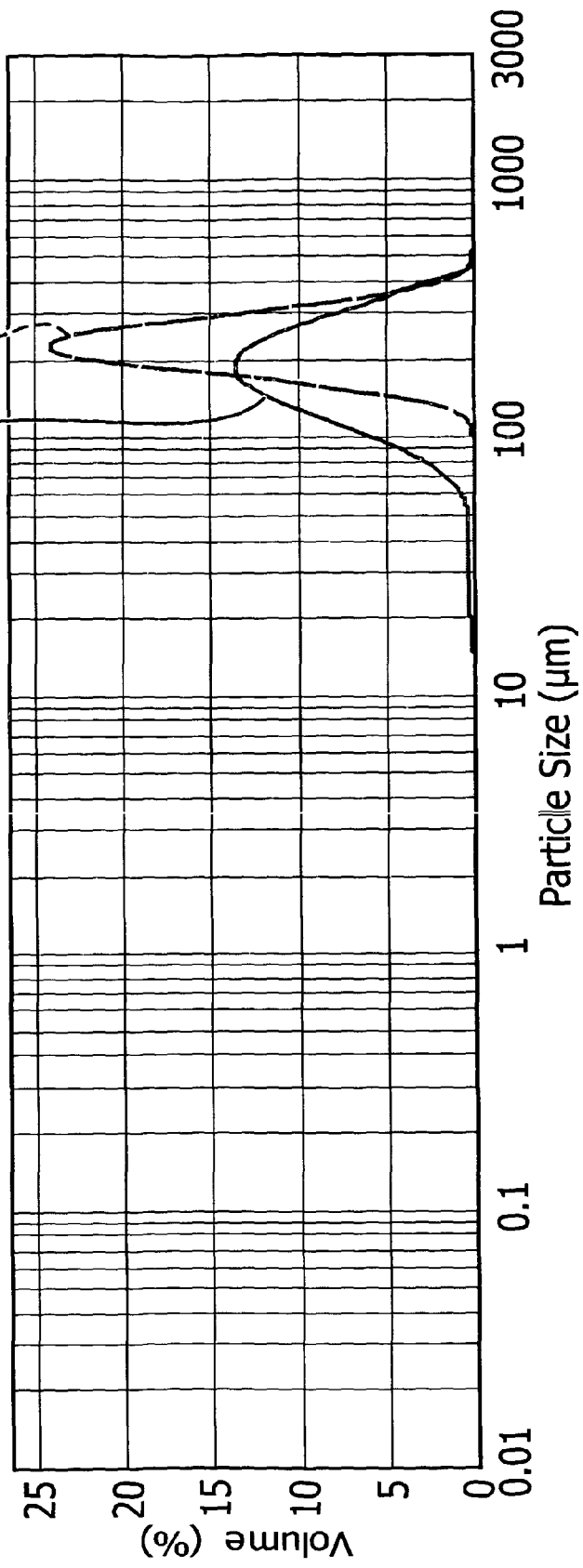
FIG. 3 shows a particle size distribution for a catalyst made with a 180×300 μm support and urea compared with a screened fraction of the same catalyst.
Figure 4:
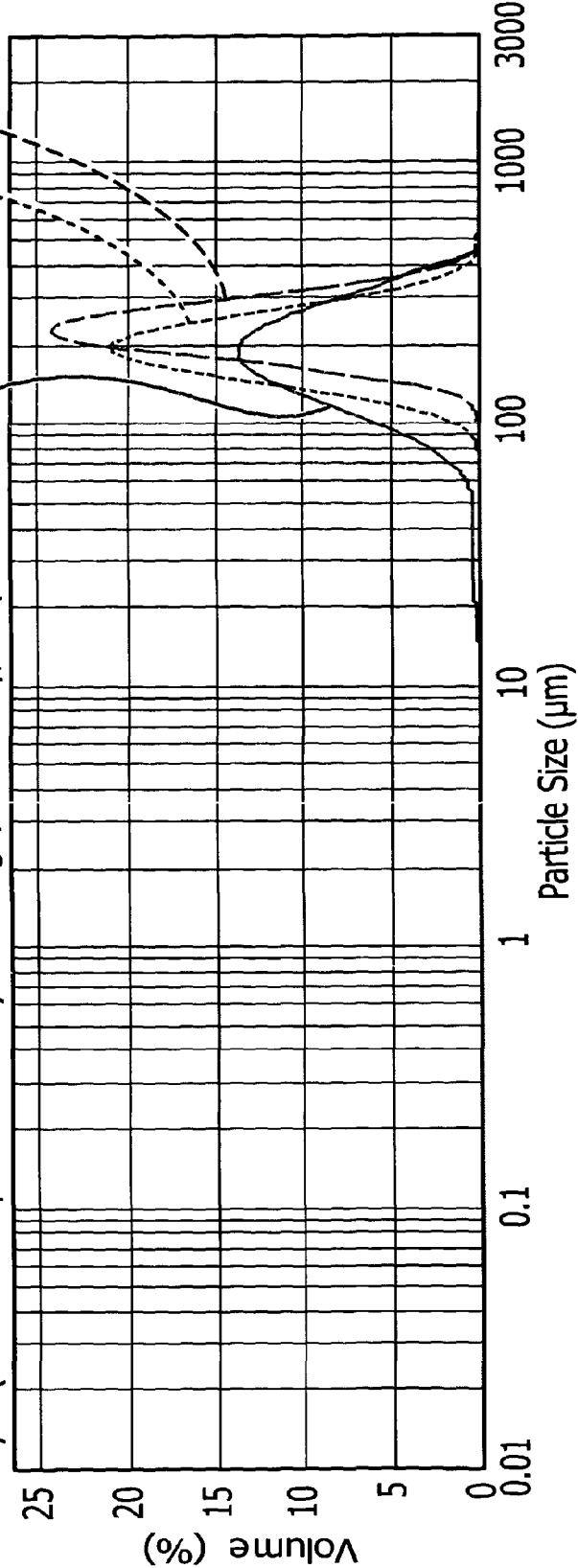
FIG. 4 shows a particle size distribution for a catalyst made with a 180×300 μm support and urea compared with a screened fractions of the same catalyst and the screening yield and density for the catalyst.

3 The weighed support was impregnated with the solution and mixed well for 1 hour to get the solution homogeneously spread into all the support particles.
4 Drying/Calcination: 2° C./100° C./9 h; 0.1° C./140° C./5 h; 0.1° C./160° C./3 h; 0.1° C./170° C./3 h; 0.1° C./180° C./2 h; 2° C./350° C./3 h (Ramp/Temp/Hold)
5 Impregnations 2 and 3 were repeated, each followed by drying and calcination as given in step 4.
6 For the fourth and fifth impregnations, only cobalt nitrate-urea solution (prepared as given in step 2) was used. Drying and calcination were performed as in Step 4.
7 For the last impregnation, Ru solution was diluted up to the required volume with water.
8 Drying/Calcination: Dried at 100° C. in a blender until free flowing.
2° C./100° C./3 h; 1° C./128° C./3 h; 1° C./150° C./3 h; 0.5° C./350° C./3 h The reaction between urea and cobalt nitrate results in a fracturing of the catalyst particles whereby the average particle size is reduced, and the distribution is skewed to smaller particles as illustrated in FIG. 3 for a catalyst made using a desired $SiO_2$ support particle size distribution, i.e. 180×300 microns. The generation of smaller catalyst particles results in a significant increase in reactor pressure drop which in turn adds to the operating costs of the reactor due to the need for a larger gas compressor. The pressure drop of the catalyst can be reduced by screening the finished catalyst. For a particle size distribution that would lead to a lower pressure, e.g. 180×300 microns, as illustrated in FIG. 4 the yield of catalyst made with urea would be approximately 24%, making the catalyst 4 times more expensive than a catalyst that did not require screening.

TABLE 1(a)

(CA (citric acid):Co = 0.20)

| Impr. No. | BASE g | $Co(NO_3)_2 \cdot 6H_2O$ g Purity 98% | $Co(NO_3)_2 \cdot 6H_2O$ g | $Co_3O_4$ g | Co g | CA g | Perrhenic acid G | % Re g | $H_2O$ mls | Ru/Pt mls | Soln. vol. | wt. (approx.) g. | % Co (approx.) |
|---|---|---|---|---|---|---|---|---|---|---|---|---|---|
| 1 | 20 | 26.53 | 26 | 7.17 | 5.26 | 3.75 | 0.0480 | | min. | 0 | 20.9 | 27.2 | 19.4 |
| 2 | 27.20 | 26.53 | 26 | 7.17 | 5.26 | 3.75 | 0.0480 | | min. | 0 | 20.7 | 34.4 | 30.6 |
| 3 | 34.40 | 26.53 | 26 | 7.17 | 5.26 | 3.75 | 0.0480 | | min. | 0 | 21.2 | 41.6 | 38.0 |
| 4 | 41.60 | 26.53 | 26 | 7.17 | 5.26 | 3.75 | 0.0480 | | min. | 0 | 22.2 | 48.8 | 43.2 |
| | | 106.12 | | | | 15.01 | 0.19 | 0.20 | | | 85.01 | | |

TABLE 1(b)

| Step | Support wt (g) | $Co(NO_3)_26H_2O$ (g) (Purity 98%) | $Co(NO_3)_26H_2O$ (g) | $Co_3O_4$ (g) | Co (g) | Citic acid (g) | Perrhenic acid (g) | % Re (g) | $H_2O$ (ml) | Solution volume (ml) | Mass (g) | % Co |
|---|---|---|---|---|---|---|---|---|---|---|---|---|
| 1 | 20 | 24.49 | 24 | 6.62 | 4.86 | 0.00 | 0.0480 | 0.05 | min. | 19 | 26.6 | 18.2 |
| 2 | 27.2 | 27.14 | 26.6 | 7.33 | 5.38 | 3.84 | 0.0480 | 0.05 | min. | 22 | 34.5 | 29.7 |
| 3 | 34.4 | 27.14 | 26.6 | 7.33 | 5.38 | 3.84 | 0.0480 | 0.05 | min. | 22 | 41.7 | 37.4 |
| 4 | 41.6 | 27.14 | 26.6 | 7.33 | 5.38 | 3.84 | 0.0480 | 0.05 | min. | 22 | 48.9 | 42.9 |
| Total 2-4 | | 81.43 | | | | 11.52 | 0.14 | 0.20 | | 66.38 | | |

TABLE 2

(urea:Co = 1:1)

| Impr. No. | BASE g | $Co(NO_3)_2 \cdot 6H_2O$ g Purity 98% | $Co(NO_3)_2 \cdot 6H_2O$ g | $Co_3O_4$ g | Co g | Urea g | $ZrO(NO_3)_2 \cdot 6H_2O$ G | $ZrO_2$ | $H_2O$ mls | Ru soln mls | Total soln volume | Final wt. g. (approx) | % Co after calcination |
|---|---|---|---|---|---|---|---|---|---|---|---|---|---|
| 1 | 41 | 51.02 | 50 | 13.79 | 10.12 | 10.30 | 4.0 | 1.45 | minimum | 0 | 57.4 | 56.2 | 17.99 |
| 2 | 56.2 | 51.02 | 50 | 13.79 | 10.12 | 10.30 | 4.0 | 1.45 | minimum | 0 | 56.2 | 71.4 | 28.33 |
| 3 | 71.4 | 40.82 | 40 | 11.03 | 8.10 | 8.24 | 2.3 | 0.83 | minimum | 0 | 42.8 | 83.3 | 34.03 |
| 4 | 83.6 | 40.82 | 40 | 11.03 | 8.10 | 8.24 | 0.0 | 0.00 | minimum | 0 | 41.8 | 94.6 | 38.50 |
| 5 | 94.6 | 40.82 | 40 | 11.03 | 8.10 | 8.24 | 0.0 | 0.00 | minimum | 0 | 42.6 | 105.6 | 42.15 |
| 6 | 105.6 | | 0 | 0.00 | 0.00 | 0 | 0 | | minimum | 13 | 47.5 | 105.6 | |

Effect of $TiO_2$ Modification on FTS Performance

A silica support was modified with different titania loadings from 0-16 wt % using titanium isopropoxide in isopropanol and dried at 100° C. to remove the solvent and weakly bound isopropoxides. Thermal analysis of the modified support confirmed that >90% of precursor decomposition takes place below 100° C. This low temperature drying is therefore beneficial to reduce the manufacturing cost and also to minimise the gradual phase transition of anatase to rutile at higher temperatures.

Pore volume and pore size decreases with increasing titania loadings. The density of the material and the carbonaceous alkoxide species present on the support increases with increasing titania loading.

The physicochemical data of the modified supports are shown below:

| wt % $TiO_2$ on silica | % C | % H | PV, ml/g | MPD, Å | Density, g/ml |
|---|---|---|---|---|---|
| 0 | — | — | 1.3 | 124 | 0.35 |
| 4 | 1.6 | 0.47 | 1.1 | 104 | 0.38 |
| 8 | 2.3 | 0.87 | 1.0 | 93 | 0.40 |
| 10 | 2.9 | 0.98 | 0.98 | 92 | 0.42 |
| 16 | 3.9 | 1.2 | 0.86 | 91 | 0.46 |

Figure 5:
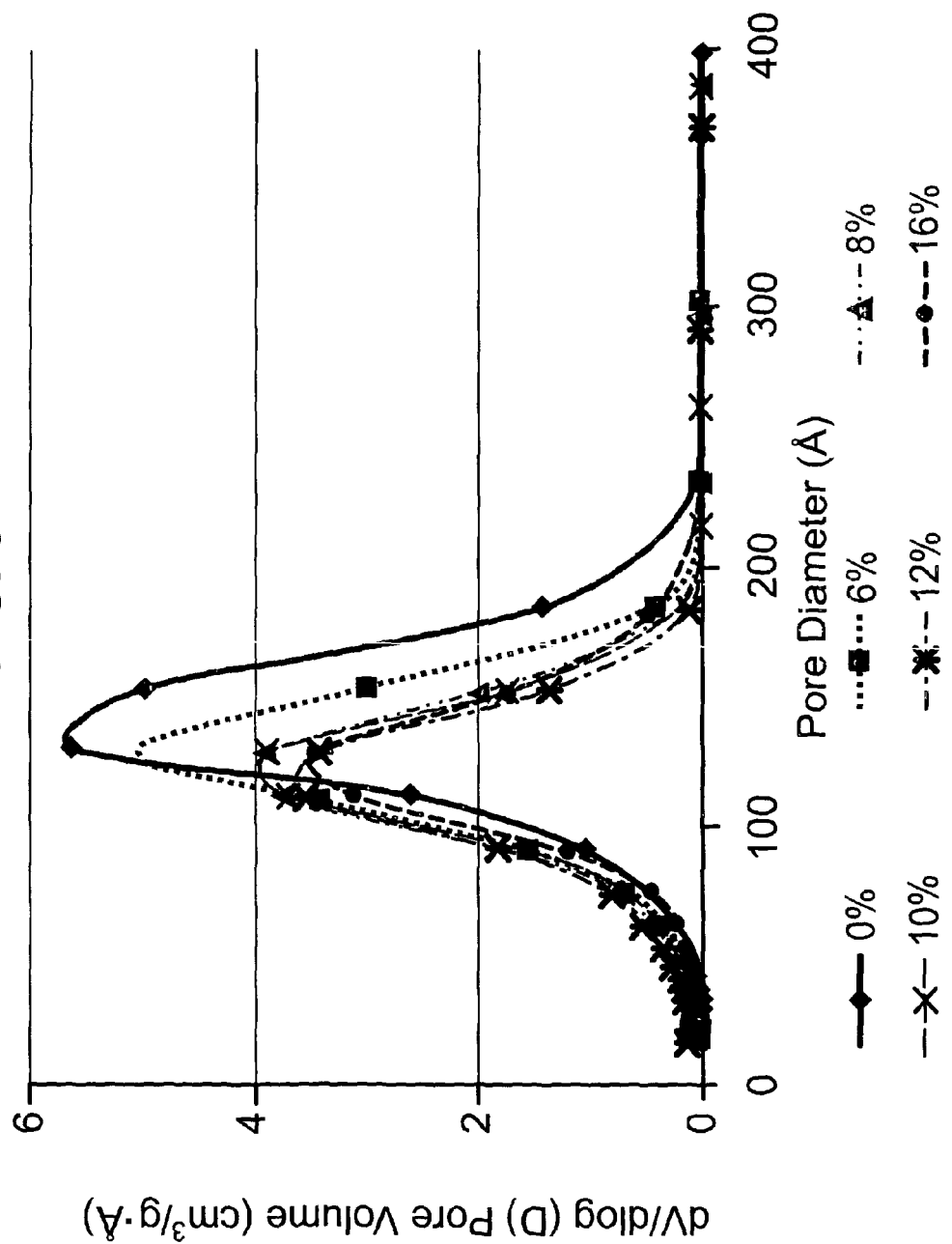
FIG. 5 shows the pore size distribution of $TiO_2$-modified silica supports (BET data).
Figure 6:
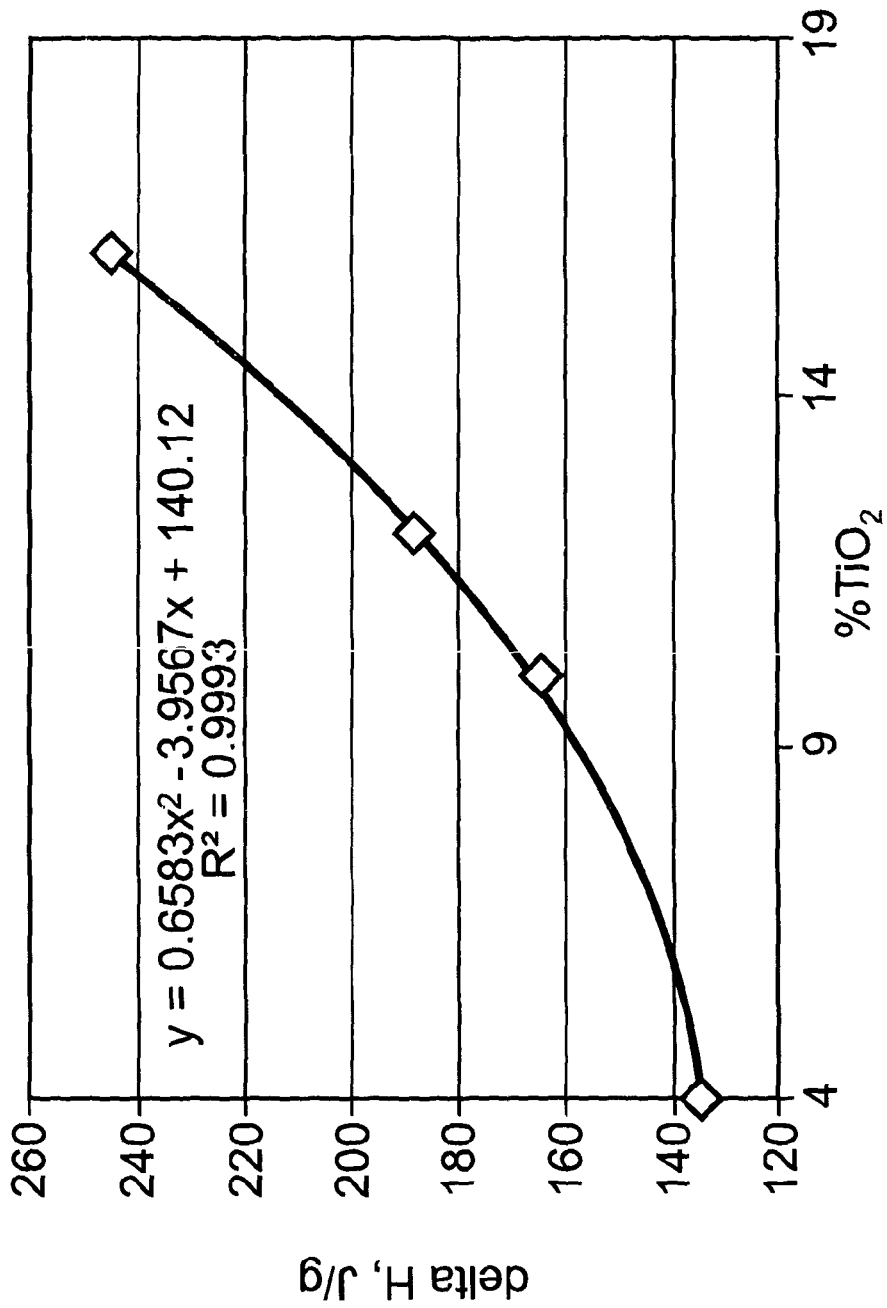
FIG. 6 shows the heat of decomposition of silica modified with different amounts of $TiO_2$.

As the titania loading increases, mean pore diameter decreases and titania occupies mainly larger pores (FIG. 5). Thermal decomposition of bound Ti-alkoxide species is exothermic and the heat of reaction increases with the amount of Ti-precursor/alkoxide species on the silica (FIG. 6). This exothermicity is expected to be beneficial to develop an active and stable cobalt oxide spinel on the titania interface formed on the silica surface.

Figure 7:
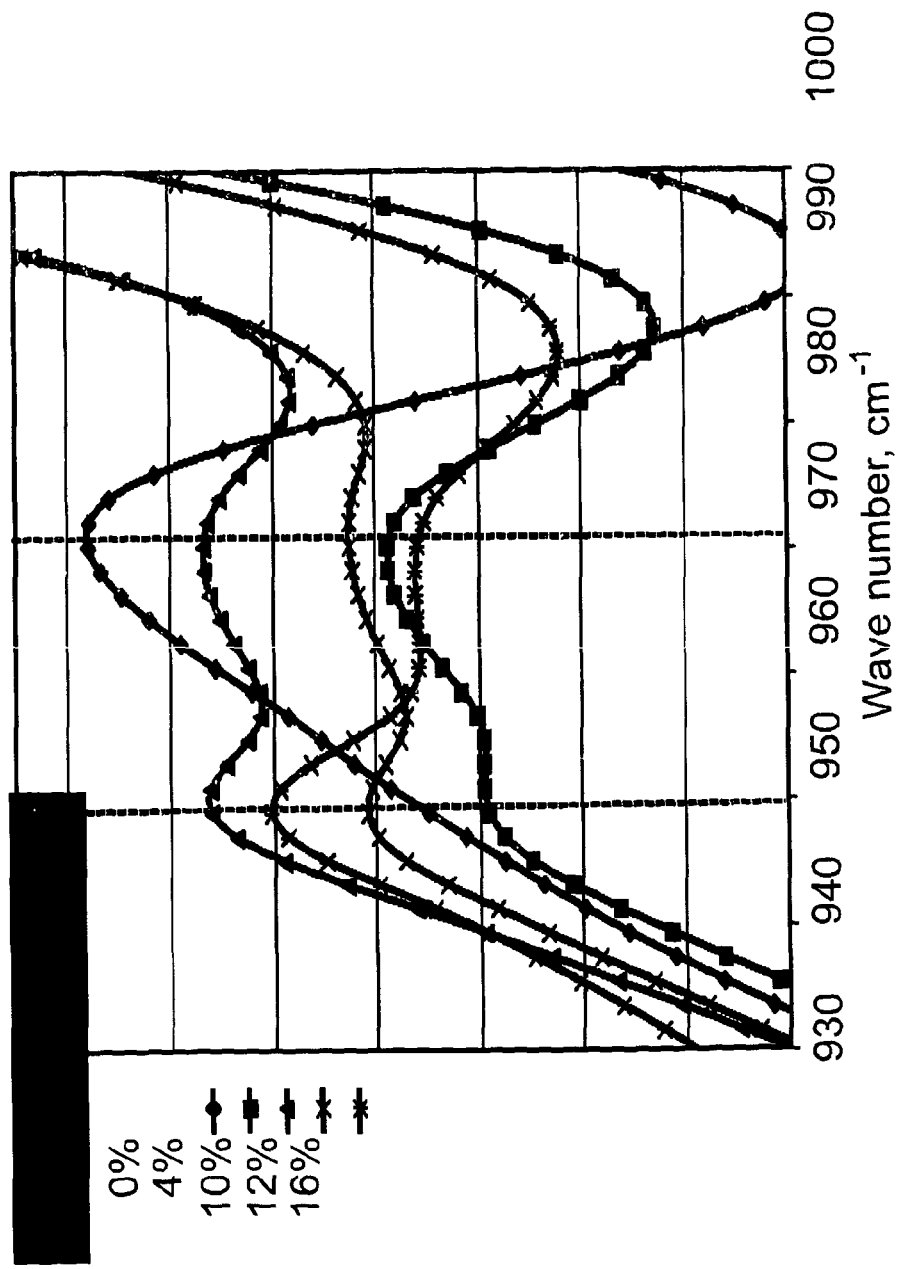
FIG. 7 shows FTIR spectra of silica modified with different amounts of $TiO_2$.

FTIR spectra of the modified supports indicate the formation of Ti—O—Si linkages on the surface (FIG. 7). The spectrum of parent silica displays a band at 970 $cm^{-1}$ due to Si—OH stretching of surface silanol groups. In the spectra of titania modified silica, there is a decrease in intensity of Si—OH band and appearance of a new band at 950 $cm^{-1}$ due to the interaction of Ti with surface silanol groups of silica and formation of Si—O—Ti linkages.

Figure 8:
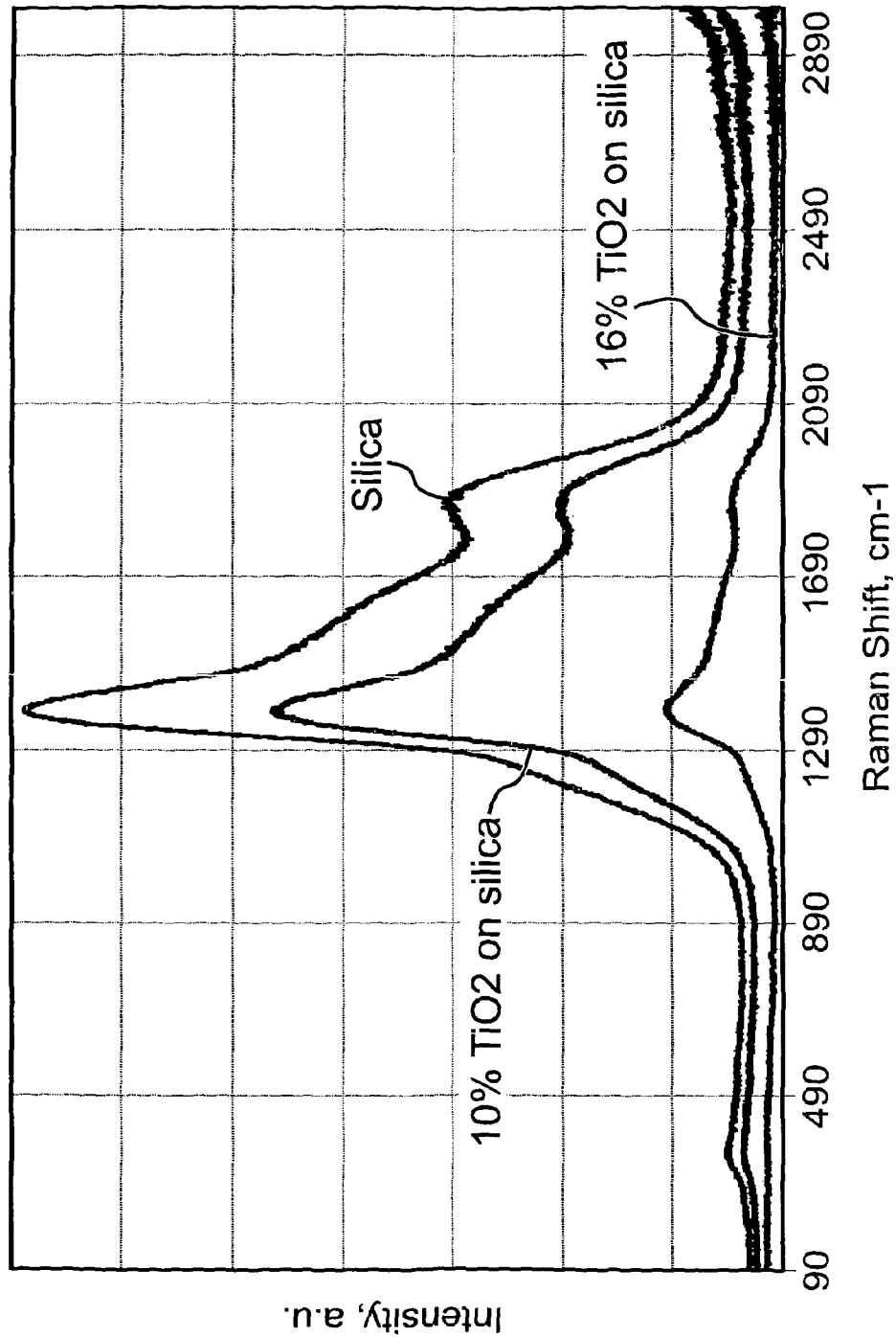
FIG. 8 shows laser Raman spectra of silica and modified silica.

The Raman spectra shown in FIG. 8 show the complete coverage of silica with increased titania loading (the intensity of the strong silica band at 1890 $cm^{-1}$ and the medium band at 1390 $cm^{-1}$ gradually decrease and is almost disappears when the % $TiO_2$ loading is 16 wt %), confirming good dispersion of titania on silica using alkoxide precursors. The degree of interaction between cobalt and the support affects the response of cobalt oxide to reduction. Cobalt-titania interaction is much stronger than cobalt-silica interaction and thus gets reduced at higher temperatures. Cobalt is believed to spread on titania during reduction compared to that on silica.

Figure 9:
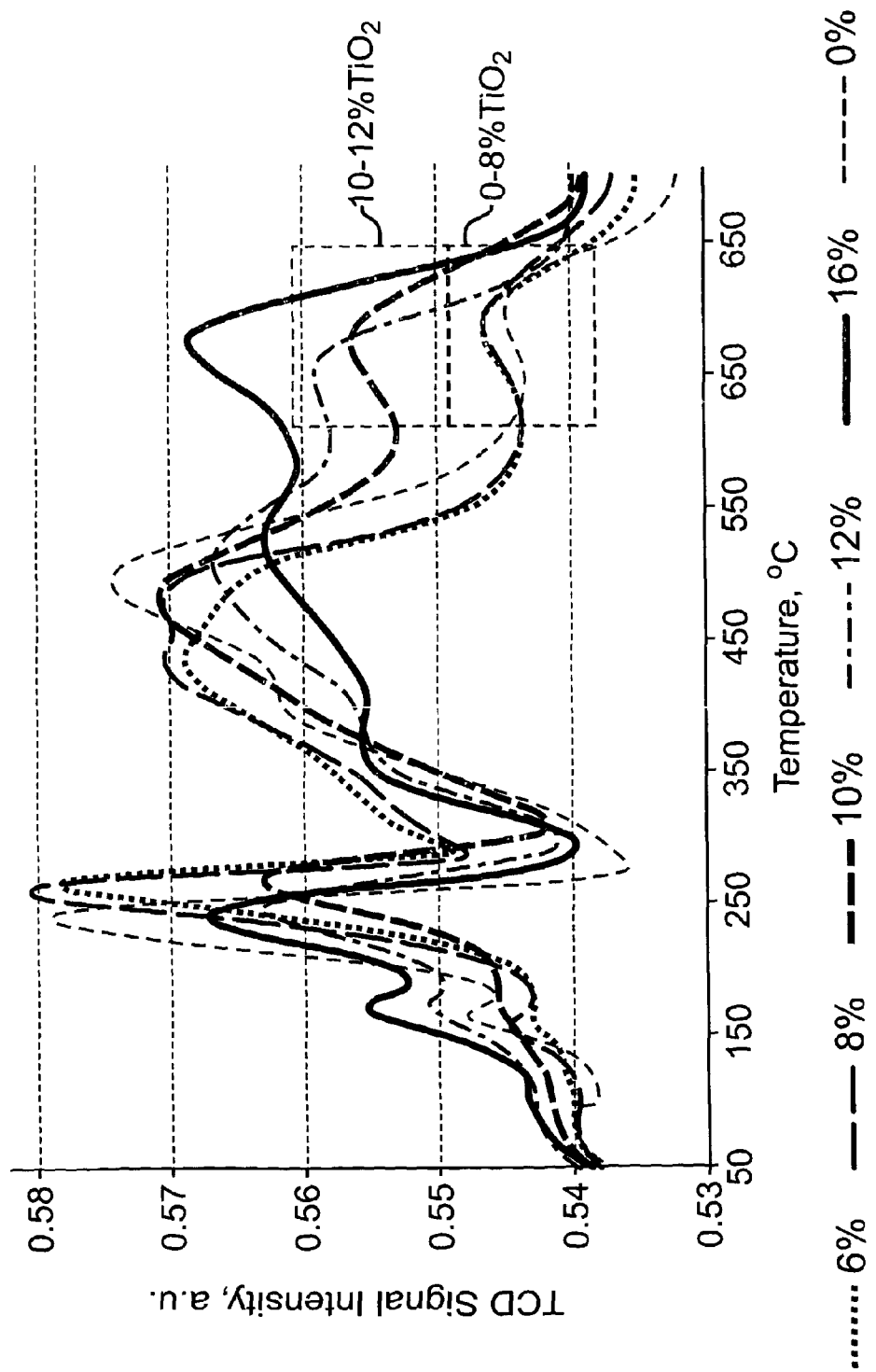
FIG. 9 shows temperature programmed reduction of catalyst intermediates (after first cobalt impregnation step and calcination).

TPR patterns (FIG. 9) of the catalyst intermediates (after first cobalt impregnation) shows a predominant difference in the nature of cobalt species and its interaction with the support. The intensity of the high temperature peak, due to the reduction of cobalt oxide species on titania, increases with increasing amount of titania on the surface.

Figure 10:
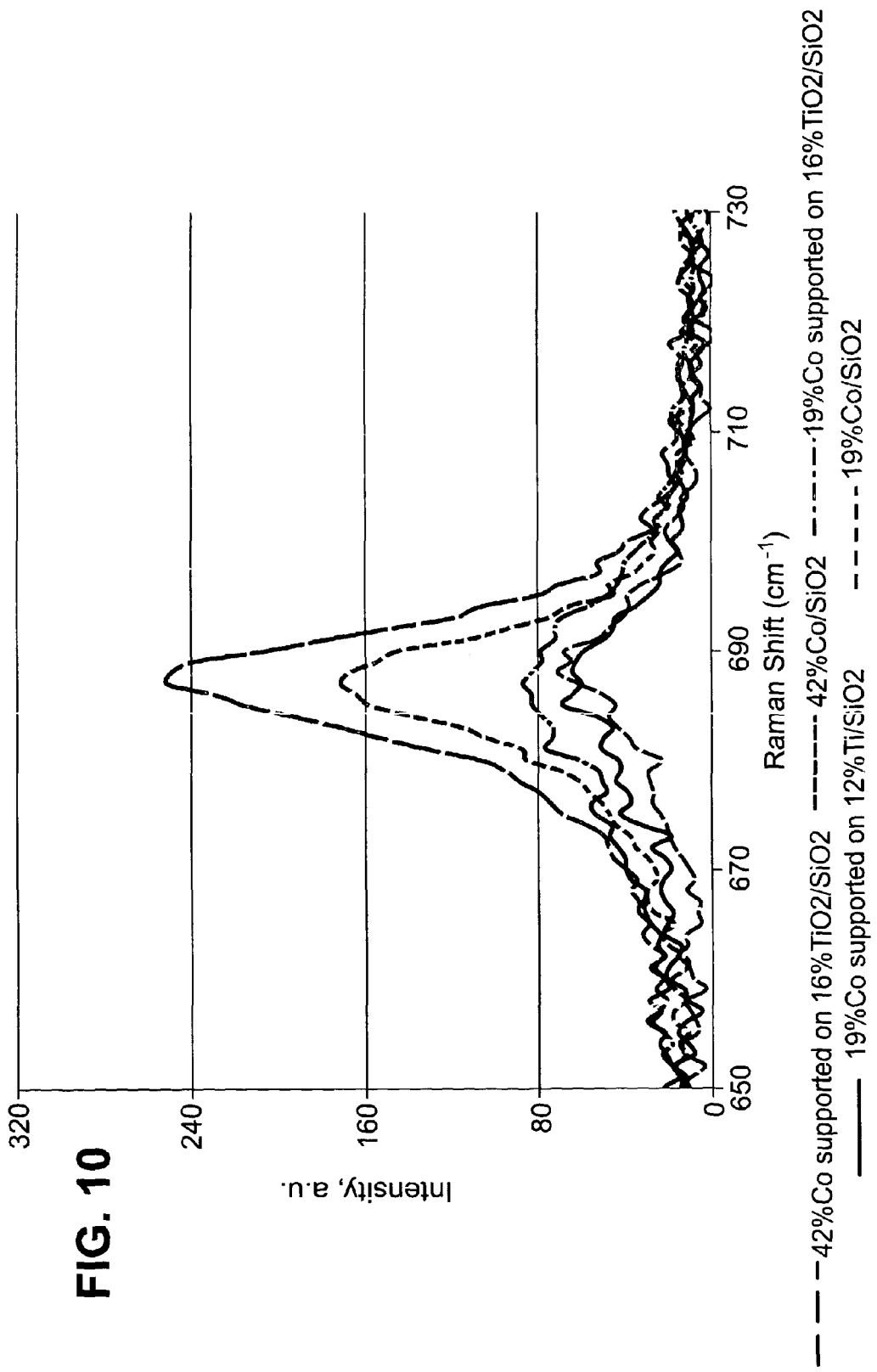
FIG. 10 shows laser Raman spectra of catalysts and intermediates.

FIG. 10 shows the laser Raman spectra of catalyst intermediates after a first impregnation and calcination (containing 19% Co) compared with that for the finished catalysts on silica and also on 16 wt % $TiO_2/SiO_2$. The titania bands are not seen in the spectra and could be attributed to the strong interaction of titania with cobalt oxide. The band at 688 $cm^{-1}$ is characteristic for the stretching vibration of Co—O in spinel $Co_3O_4$ species, and is more intense with increased $TiO_2$ loading. Intensity of this band in different catalyst precursors suggest that $Co_3O_4$ spinel formation is more favoured on titania surface compared to silica surface.

The catalysts prepared with different supports were screened for FTS performance. Results showed an increase in catalyst stability with increasing wt % $TiO_2$ on the support. Catalyst prepared using 16 wt % $TiO_2/SiO_2$ showed no signs of deactivation for over 300 hours on stream.

Surface Acidity of $TiO_2$ Modified Supports

Titania modification of supports, where impregnation of the titania precursor was by an alkoxide or an aqueous precursor (aqueous method 1), was carried out as described above in the section "Use of a carboxylic acid as a polar organic compound". Prior to characterisation of the support, calcination was performed (heating in a muffle furnace at 2° C. per minute to 325° C. for 8 hours) in order to fully convert the precursor molecule to the oxide form.

TPD experiments were carried out in an Altamira AMI-200 instrument. The samples were first degassed in argon at 150° C. for 30 minutes, before decreasing the temperature to 100° C. and changing the flow to 10% $NH_3$ in He for 30 minutes. Inert gas flow was then maintained for 1 hour to remove physisorbed species, and the temperature was then reduced to 70° C. The desorption was carried out under flowing argon from 70-450° C. at 5° C./min, followed by a hold at 450° C. for 30 minutes. As a reference, a TPD was carried out on a titania modified silica that was exposed to the same sequence of steps but without ammonia. This reference spectrum was scaled and subtracted from each collected TPD baring that of pure silica. Quantification of the amount of gas released was carried out by calibration of a 10% $NH_3$ in He stream passed through a null station. In order to express the ammonia desorption in mol/$m^2$, the surface area of the supports in g/$m^2$ was found by $N_2$ physisorption.

Figure 11:
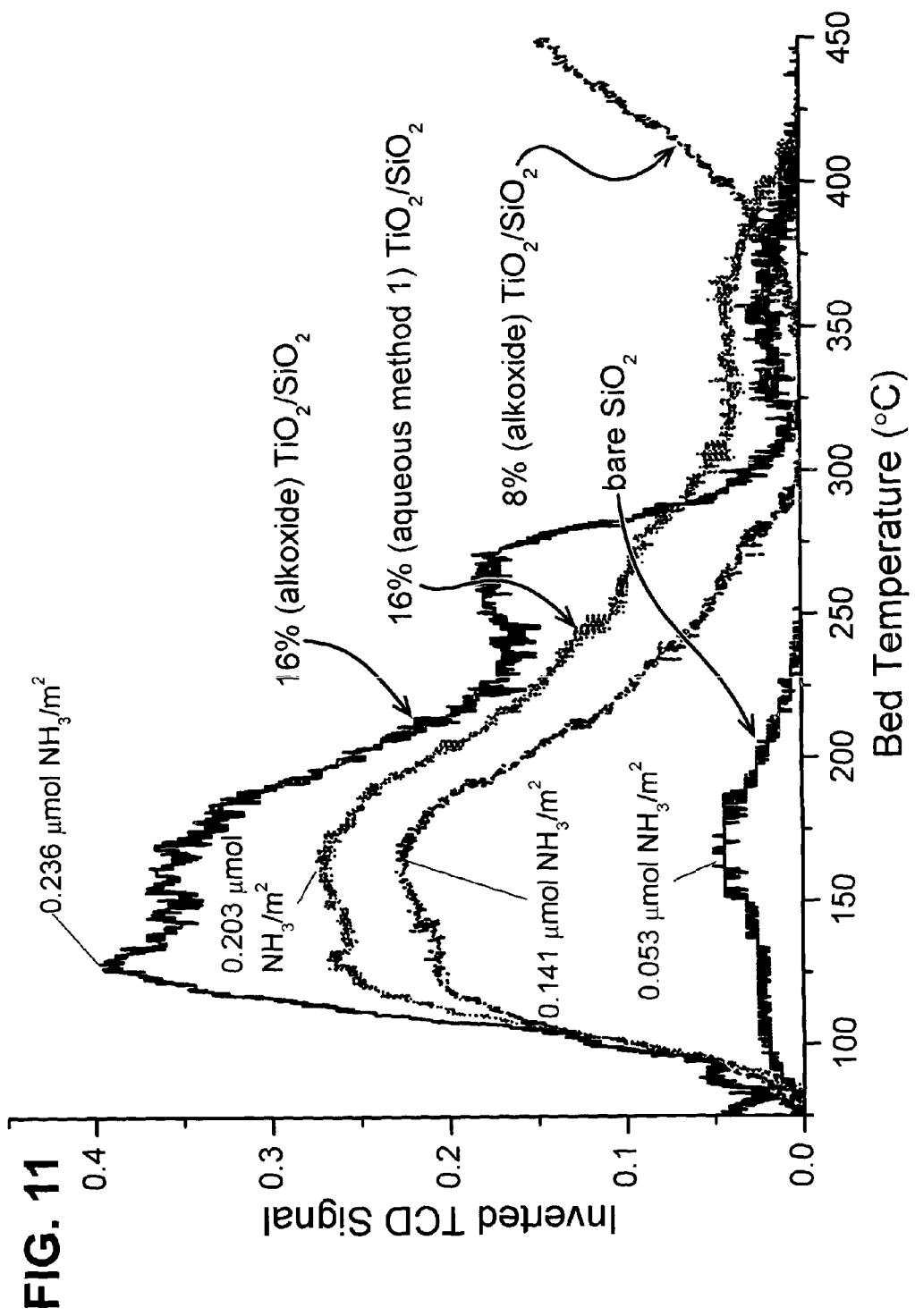
FIG. 11 shows the TPD of ammonia from a selection of titania-modified silica supports. The desorption of ammonia from bare silica is shown for comparison. The raw TCD signal has been multiplied by −1 in all cases for clarity.

The release of ammonia with time, as measured by the Thermal Conductivity Detector (TCD) current, as well as the total ammonia release in µmol/$m^2$, is illustrated for several supports in FIG. 11. FIG. 11 shows that the most ammonia is desorbed from a 16% $TiO_2/SiO_2$ modified support, indicative of the higher percentage of $TiO_2$ present.

The FT-IR spectra were collected on a Bio-Rad FTS-6000 (DigLab) instrument by scanning from 500 to 3000 $cm^{-1}$ at a step size of 0.25 $cm^{-1}$. Samples were prepared for analysis by grinding with KBr into a fine powder; this mixture was then pressed into a self-supporting pellet. The reference spectrum of pure silica was collected, and subtracted from each support spectra using the observed intensity at 1070 $cm^{-1}$ (silica main mode) as a scaling factor. A baseline was drawn on each subtracted spectrum using the intensities at 1070 $cm^{-1}$ and 850 $cm^{-1}$ to extrapolate a linear baseline. A fully corrected spectrum was then compiled by subtracting this linear baseline as well.

Figure 12:
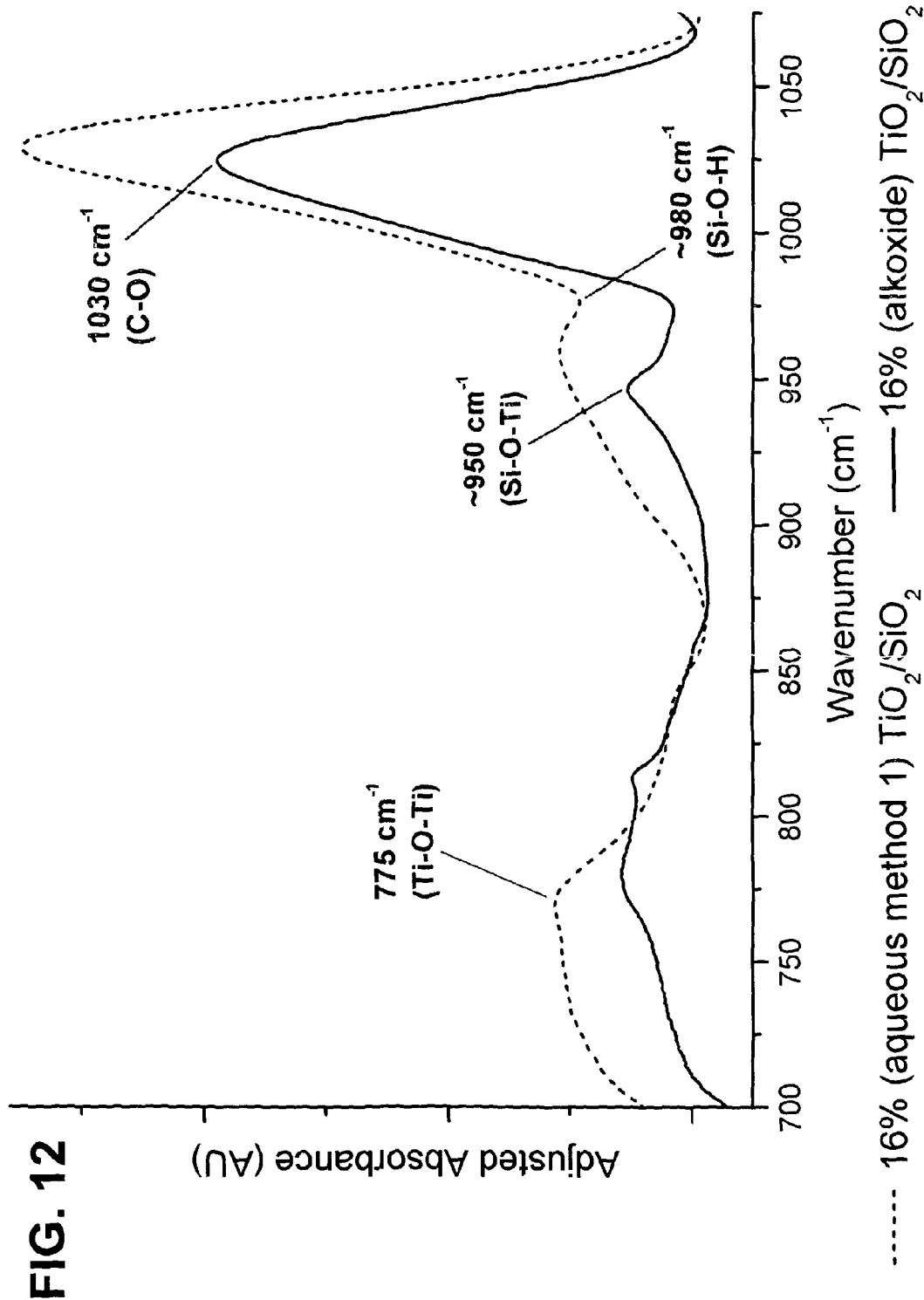
FIG. 12 shows an FT-IR spectrum for a titania-modified support in the region of 700 to 1075 $cm^{-1}$. The scaled spectrum of silica has been subtracted from the observed spectrum and a baseline correction applied. Bands of interest are annotated.

FIG. 12 shows the corrected FT-IR spectrum of a titania-modified support in the region of 700 to 1075 $cm^{-1}$. The Si—OH dip at 975 $cm^{-1}$ (i.e. approx. 980 $cm^{-1}$) is clearly visible, as is the peak at approx. 950 $cm^{-1}$ associated with the Si—O—Ti group.

FTS testing was carried out in catalysts comprising the titania-modified supports. The catalysts used for FTS testing were prepared as described above.

FTS testing was carried out according to test method 1.

Table 3 shows data for the surface acidity and FT-IR intensity ratio of various modified supports and FTS properties of catalysts made from those supports. The titania modified supports were synthesised via the alkoxide method unless otherwise specified.

supports modified with titania using the aqueous method 1 and aqueous method 2 and the alkoxide method were prepared. In one modification of this method, the catalyst

| Composition | FT-IR intensity ratio | Mol NH$_3$ desorbed/ μmol · m$^2$ | FTS properties of catalyst made from support | | | |
|---|---|---|---|---|---|---|
| | | | Deactivation rate (%/day) | % CO converted (initial/final) | C$_{5+}$ selectivity (initial/final) | CH$_4$ selectivity (initial/final) |
| Silica (support A) | — | 0.053 | −1.63 | 78.9/70.3 | 87.8/85.6 | 8.2/8.2 |
| Labscale batch, 16% TiO$_2$ on SiO$_2$ (support B) | 3.61 | 0.236 | −0.74 | 68.8/65.5 | 85.6/84.3 | 10.0/9.3 |
| Labscale batch, 8% TiO$_2$ on SiO$_2$ | — | 0.141 | −1.13 | 73.9/68.3 | 88.2/86.5 | 7.9/8.4 |
| Production batch, 16% TiO$_2$ on SiO$_2$ (support C) | 1.52 | 0.253 | −1.01 | 69.3/64.7 | 85.8/85.0 | 9.1/9.2 |
| Repeat analysis of support C | — | 0.284 | −0.99 | 69.0/64.9 | 87.1/86.1 | 9.0/8.5 |
| Production batch, 16% TiO$_2$ on SiO$_2$ (support D) | 1.18 | 0.168 | −1.42 | 75.3/67.8 | 89.1/87.2 | 7.7/7.6 |
| Labscale batch, 16% TiO$_2$ via aqueous method 1 on SiO$_2$ (support E) | 1.19 | 0.234 | −0.74 | 77.7/74.6 | 86.0/84.3 | 9.2/9.4 |

Figure 13:
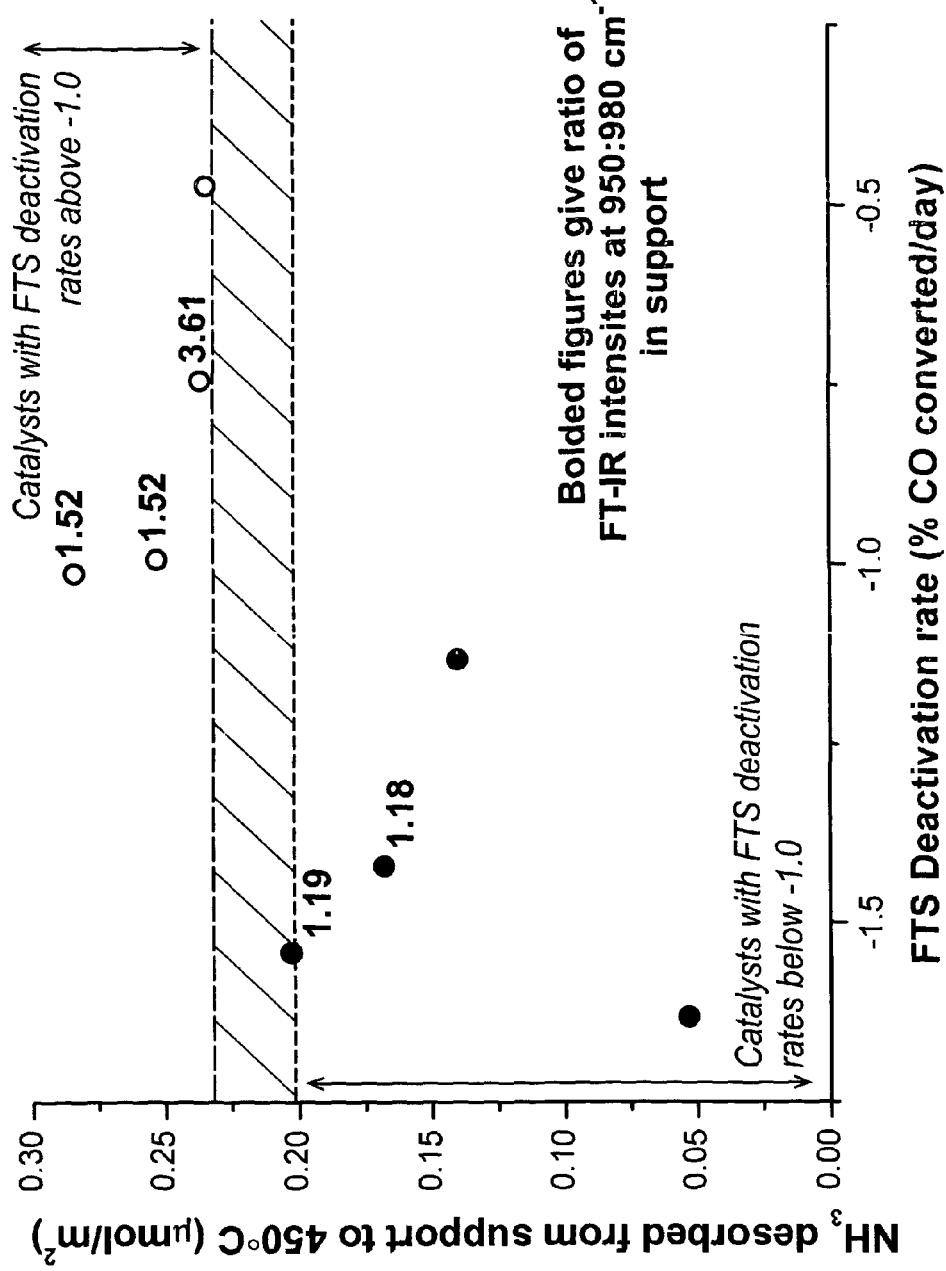
FIG. 13 shows the amount of ammonia desorbed from catalyst supports up to 450° C. vs. FTS deactivation rate of the catalysts made from these supports. The ratio of the FT-IR intensities at 950:980 $cm^{-1}$ in the support is noted beside the data points.
Figure 14A:
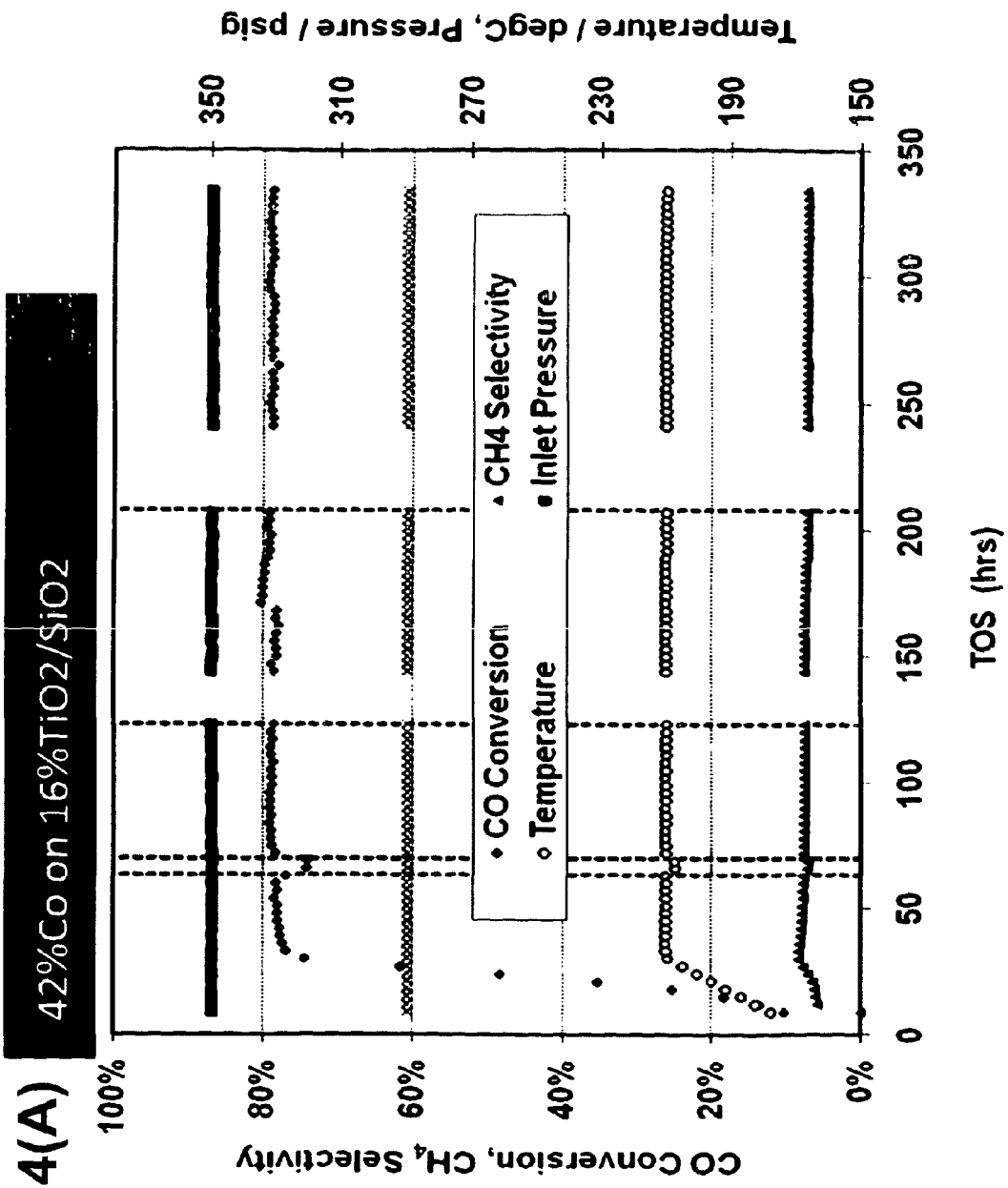
FIG. 14(A) shows Fischer-Tropsch synthesis performance in a microchannel reactor (wherein the deactivation rate is as low as 0.02% per day) whilst

The data in Table 3 is represented in FIG. 13 which shows the amount of ammonia desorbed from catalyst supports up to 450° C. vs. FTS deactivation rate of the catalysts made from these supports. The ratio of the FT-IR bands at approx intensities of 950:980 cm$^{-1}$ in the support is noted beside the data points. The grey box highlights the region of NH$_3$ desorption between 0.20 and 0.23 μmol/m$^2$; this region separates the stable catalysts (deactivation rate >−1.0) from the less stable ones (deactivation rate <−1.0). Catalysts supports with higher surface acidities can be used to make more stable catalysts: a comparison of the FTS stability of the catalysts made from two production batches (supports C and D) shows that the catalyst made from the support with lower surface acidity is less stable during FTS.

It can be seen from Table 3 and FIG. 13 that the less stable catalysts are also those whose modified supports desorb the smallest amounts of ammonia and have the lowest FT-IR band ratios at approx. 950:980 cm$^{-1}$. This suggests that the surface acidity of the modified supports and the FT-IR intensity ratio are linked to the FT stability of the resulting catalyst. In particular, those supports with higher surface acidities and a larger relative amount of Si—O—Ti linkages are more stable.

Correlation Between Fischer-Tropsch Synthesis (FTS) Performance and Average Co$_3$O$_4$ Particle Size and Size Distribution Bimetallic Citric Acid Recipe The catalysts were prepared via the method described above in the section "Use of a carboxylic acid as the polar organic compound". A selection of catalysts made from was prepared without citric acid but otherwise used an identical method. In a different modification of this method, a catalyst was prepared on a support that was not modified with titania (i.e. bare silica) but used an otherwise identical method.

In Table 4, catalyst 1 was prepared using support B as described in the section "Surface acidity of titania modified supports". Catalyst 5 was prepared using support A; catalyst 7 was prepared using support C; and catalyst 10 was prepared using support E.

Urea recipe (reference example) In contrast to the above bimetallic recipe, a catalyst was also synthesised using urea as fuel (1:1 ratio of urea to cobalt nitrate) and with Zr co-impregnated with the cobalt. This solution was impregnated onto a silica support modified with titania. The final catalyst was then promoted with ruthenium.

X-Ray Diffraction

X-ray diffraction patterns of the calcined catalysts were collected on a fully automated Siemens D5000 theta/theta powder diffractometer using Cu K$_\alpha$ radiation. Each sample was ground thoroughly before loading into a spinner carousel in air. Data were collected over the range 10-80° 2θ, and were analysed using the Rietveld method via the program GSAS. Likely crystalline phases were included until all peaks were indexed. The lattice parameters and phase fractions of all phases were refined first along with the background, which was fitted with a 16 term shifted Chebyshev polynomial. The sample shift and transparency were freely refined. As Co$_3$O$_4$ was the major phase in all calcined catalysts studied, this phase was analysed in detail. The oxygen atom position of the $Co_3O_4$ phase was first refined, along with the thermal parameters of all positions in this phase. The profile shape of the $Co_3O_4$ phase was then fitted with a Caglioti instrumental function (previously determined using a corundum standard) and a Lorentzian X and Y term were refined along with a Gaussian U and P contribution. The X, Y, U and P profile parameters of the $Co_3O_4$ phase were deconvoluted into their size and strain components using the methods described in Balzar et al. Journal of Applied Crystallography (2004), 37, 911-924 and Krill et al, Philosophical Magazine A (1998) 77, 620-640.

Explicitly, the X and P profile shape terms were used to determine the average crystallite size and the width of the distribution (assuming a lognormal, monomodal size distribution of spherical crystallites). First, the profile parameters were converted into integral breadths via $$\beta_{G,S} = \frac{\sqrt{2\pi^3 P}}{18000}$$

$$\beta_{L,S} = \frac{\pi^2 X}{2 \cdot 18000}$$

The Lorentzian and Gaussian intergral breadths are then combined for the size (S) part:

$$\beta_S = \frac{\beta_{G,S} e^{-k_S^2}}{1 - \text{erf}(k_S)}$$

where $$k_S = \frac{\beta_{L,S}}{\sqrt{\pi} \beta_{G,S}}$$

Once the separate peak shapes have been deconvoluted into the size component via this method, the volume-weighted ($L_V$, size distribution function weighted by the volume of the domains) and area-weighted ($L_A$, size distribution function weighted by the cross-sectional area of the domains) domain sizes may be determined through $$L_V = \frac{\lambda}{\beta_S}$$

and $$L_A = \frac{\lambda}{2\beta_{L,S}}$$

If the crystallites are assumed to be spheres, the area- and volume-weighted domain sizes can be related to the sphere diameters via $$D_V = 4/3 L_V \text{ and } D_A = 3/2 L_A$$

Finally, the volume and area weighted domain sizes are related to the dimensionless ratio c of the lognormal distribution and the numeric average particle radii $R_O$ by $$c = \frac{8L_V}{9L_A} - 1$$

and $$R_O = \frac{2L_V}{3(1+c)^3}$$

This explicitly assumes that the real particles are equivalent to the crystallites. The numeric average particle diameter ($D_O = 2R_O$) is thus related to the volume- and area-weighed diameters through $$D_V = D_0(1+e)^3 \text{ and } D_A = D_0(1+e)^2$$

The form of the distribution is:

$$f(R) = \frac{1}{R\sqrt{2\pi \ln(1+c)}} e^{-\frac{\left[\ln\left(\frac{R}{R_0}\sqrt{1+c}\right)\right]^2}{2\ln(1+c)}} \quad \text{Equation 1}$$

where $$c = \frac{\sigma^2}{R_o^2}$$

Where $R_O$ is the numeric average particle radius and c, which is known as the dimensionless ratio, characterises the width of the size distribution.

The frequency at the mode of this lognormal distribution ($f_{mode}$) modelled using Equation 1 was weighted by the size distribution median to create a "size-weighted distributed breadth", or D-value, using the formula:

$$D = f_{mode}{}^y \times R_O \times 2 \quad \text{Equation 2}$$

wherein $f_{mode}$ is the frequency at the mode of the lognormal distribution; y is an exponential factor which is determined experimentally to obtain the best degree of fit with the FTS stability data, as described above, and $R_O$ is the numeric average particle radius.

The D-value provides an improved characterisation of the width of the size distribution.

Figure 15:
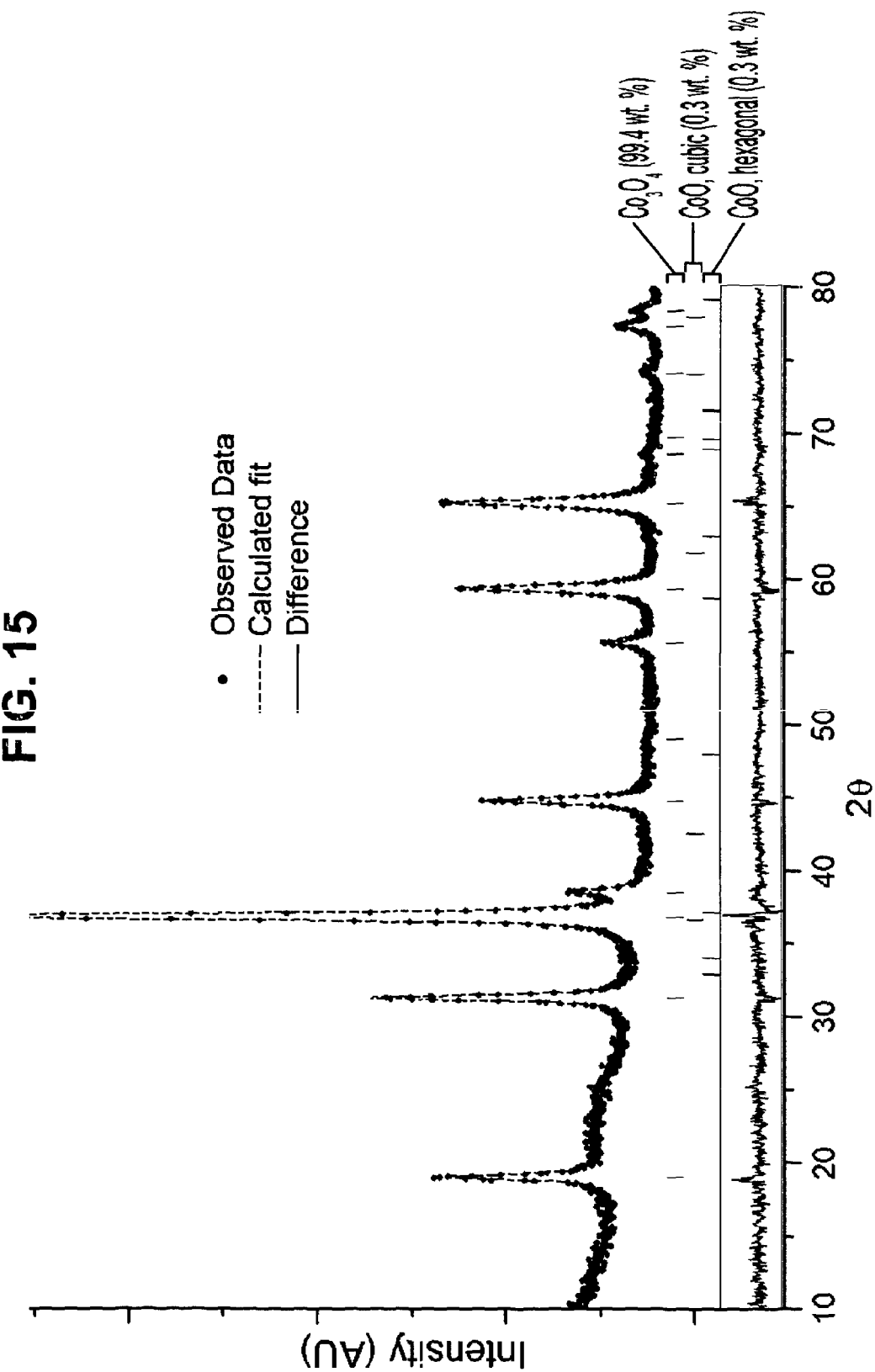
FIG. 15 shows an X-ray diffraction pattern for a 10 kg scale catalyst prepared using the bimetallic citric acid recipe and a support modified with titania using the alkoxide impregnation method. The pattern was fitted using the three phases described in the legend. $R_{wP}$=4.48.

FIG. 15 shows the X-ray diffraction pattern for a catalyst precursor (A) prepared using the bimetallic citric acid recipe on a 10 kg scale, on a support modified with titania using an alkoxide impregnation method. This catalyst is almost entirely composed of $Co_3O_4$ (99.4 wt %), with possible trace amounts of CoO cubic and hexagonal phases. A broad peak extending from approximately 18° to 28° 2θ was modelled as background, but is of the correct d-spacing to correspond to amorphous silica. The pattern was completely indexed with just $Co_3O_4$ and the two CoO phases; therefore, no other crystalline phase, including titania, was present in any detectable amount.

Figure 16:
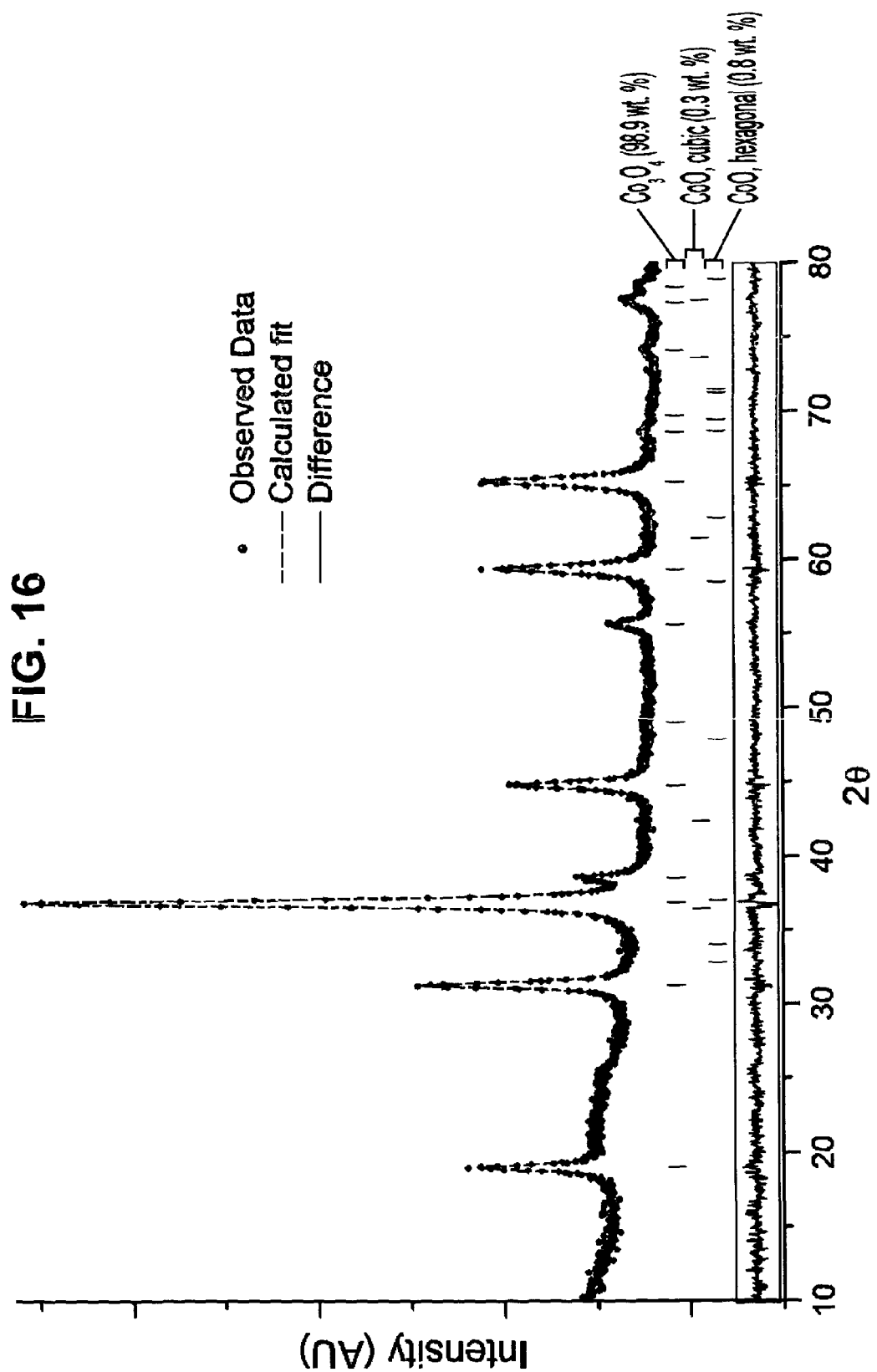
FIG. 16 shows an X-ray diffraction pattern for a 7 kg scale catalyst prepared using the urea recipe and a support modified with titania using the alkoxide impregnation method. The pattern was fitted using the three phases described in the legend. $R_{wP}$=3.70.

FIG. 16 shows the X-ray diffraction pattern for a catalyst precursor (C) prepared with the urea recipe on a 7 kg scale, on a support modified with titania using an alkoxide impregnation method. The urea-based catalyst is almost entirely composed of $Co_3O_4$ (98.9 wt %), with trace amounts of CoO cubic and hexagonal phases. A similar broad peak that may be due to silica was observed, and was modelled as a background. No other crystalline phases besides the cobalt oxides were detected.

Figure 17:
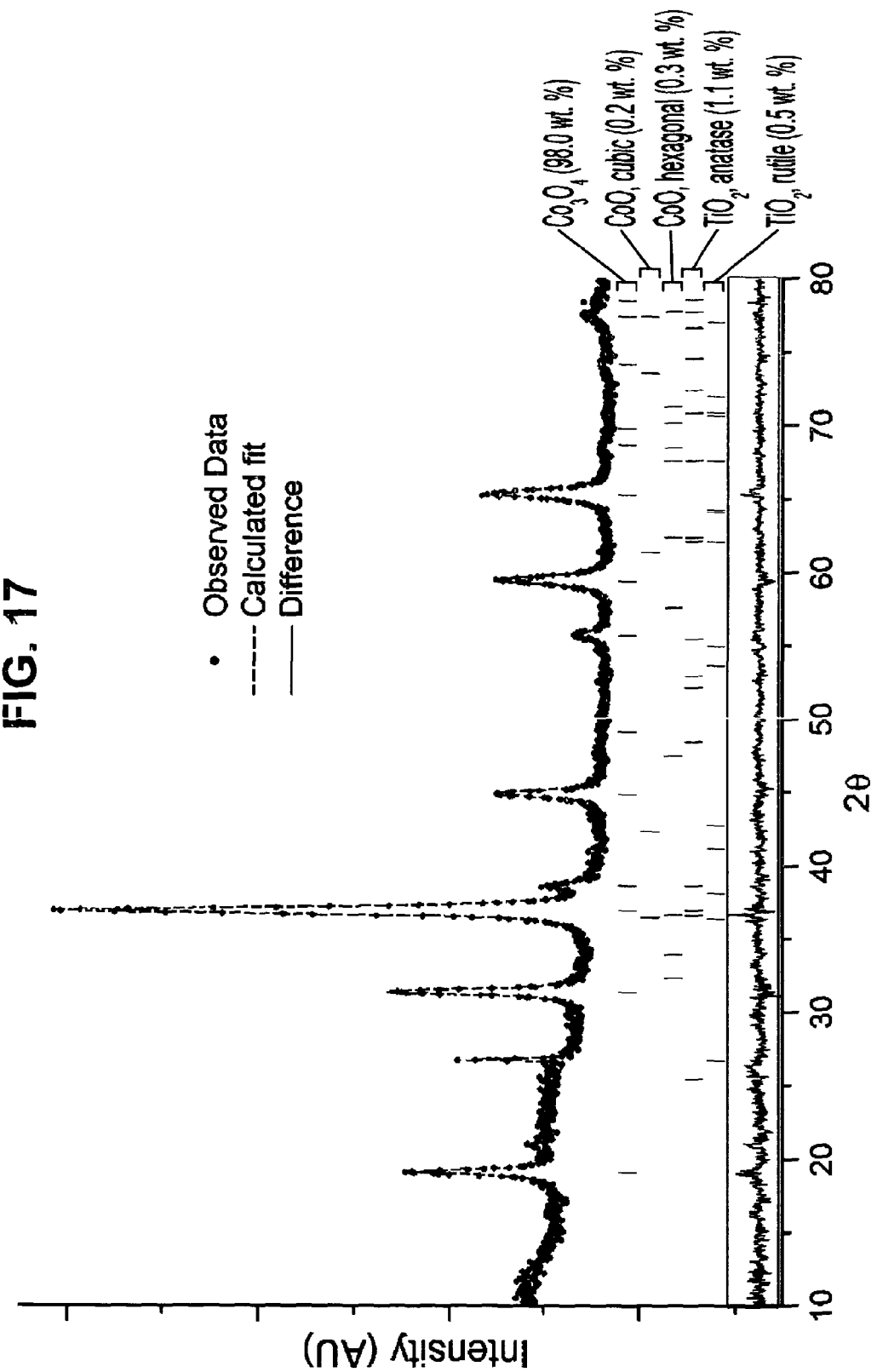
FIG. 17 shows an X-ray diffraction pattern for a 10 g scale catalyst prepared using the bimetallic citric acid recipe and a support modified with titania using the aqueous impregnation method 2. The pattern was fitted using the five phases described in the legend. $R_{wP}$=5.15.

FIG. 17 shows the diffraction pattern for a catalyst precursor (B) prepared using the bimetallic citric acid recipe on a 10 g scale, on a support modified with titania using aqueous impregnation method 2. This catalyst contains mainly $Co_3O_4$ (98.0 wt %), with possible trace amounts of CoO cubic and hexagonal phases. A significant fraction of $TiO_2$ is also present in this catalyst (1.6 wt. %): the rutile phase gives rise to a sharp peak at 26.7°, which is not observed in the diffraction patterns of the catalysts where titania impregnation occurs via an alkoxide method or via aqueous method 1. A peak profile analysis on the rutile phase indicates that the $TiO_2$ particles are relatively large, with an average size of greater than 100 nm. As with the previous XRD patterns, a broad peak extending from approximately 18° to 28° 2θ was modelled as background but may correspond to amorphous silica.

Figure 18:
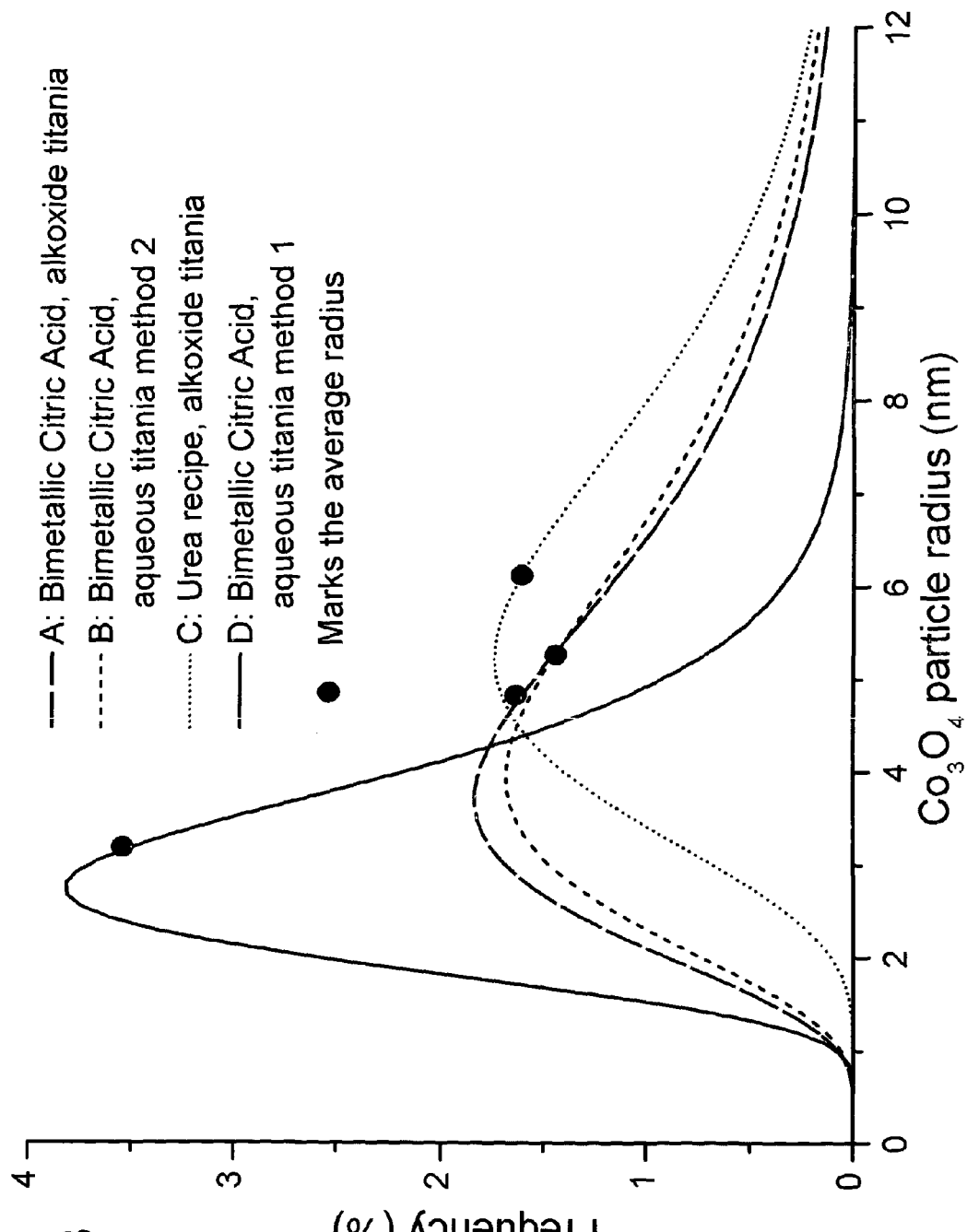
FIG. 18 shows a lognormal particle size distribution for the $Co_3O_4$ phase in a series of calcined catalysts prepared from different recipes.

FIG. 18 gives the $Co_3O_4$ size distribution for the three catalyst precursors whose XRD patterns are given above. The numeric average particle radius is also shown as a vertical line. Three catalyst precursors are shown in this figure:

A. Catalyst precursor prepared using the bimetallic citric acid recipe, on a support modified with titania using an alkoxide impregnation method. 10 kg scale catalyst.
B. Catalyst precursor prepared using the bimetallic citric acid recipe, on a support modified with titania using an aqueous impregnation method. 10 g scale catalyst.
C. Catalyst precursor prepared using the urea recipe, on a support modified with titania using an alkoxide impregnation method. 7 kg scale catalyst.

Table 4 summarises the $Co_3O_4$ particle size and particle size distribution data for these three catalyst precursors.

Table 4—structural parameters of the $Co_3O_4$ phase as determined from analysis of the X-ray diffraction patterns for a selection of calcined catalysts. A larger value of c, the dimensionless ratio, generally indicates a broader size distribution but is also correlated with the inverse square of the average particle size. A larger D-value represents either a narrowing of the particle size distribution or an increase in the numerical average particle diameter.

The method of titania impregnation is also important: catalyst B, with support modified with titania via aqueous method 2, has a D-value (18.8) that is much smaller than that for the catalyst made via aqueous method 1 (catalyst D, D=29.1) or via the alkoxide method (catalyst A, D=19.6). As the titania modification via the aqueous method 1 required citric acid in the titania impregnation step, and method 2 did not, this shows that inclusion of citric acid with the aqueous titania precursor results in a catalyst with a higher D-value.

The use of both citric acid as the reducing/complexing agent and support modification with titania via either aqueous method 1 or the alkoxide method results in a catalyst with a $Co_3O_4$ particle size and particle size distribution, as measured by the D-value, that falls within the range expected for optimum FTS performance.

The trends shown in the $Co_3O_4$ size distribution curves in FIG. 18 are echoed by the structural data given in Table 4. Average $Co_3O_4$ crystallite sizes and size distribution parameters are given for a range of catalysts synthesised via the bimetallic citric acid recipe with an alkoxide titania impregnation method. It is evident that across the range of batch scales, this recipe generates a $Co_3O_4$ phase with an average size between 7.8 and 9.6 nm, and a dimensionless ratio between 0.24 and 0.31. The structural parameters of this phase differ significantly both when the titania impregnation procedure is altered and when the nature of the combustion fuel is changed. In regards to alteration of the combustion fuel, both cases tested lead to an increase in the average particle size and a broadening of the $Co_3O_4$ particle size distribution as compared to use of citric acid. When the titania modification is via the aqueous method, the use of an aqueous precursor with citric acid in the titania modification

| Catalyst | Catalyst synthesis scale | Recipe used | Method of titania impregnation | $Co_3O_4$ Crystallite diameter, $D_o$ (nm) | Dimensionless ratio, c | D-value |
|---|---|---|---|---|---|---|
| 1 | 10 g | Bimetallic citric acid | Alkoxide, 16% $TiO_2$ | 8.5(3) | 0.25(1) | 21.4 |
| 2 | 10 g | Bimetallic citric acid | Alkoxide, 16% $TiO_2$ | 7.8(3) | 0.27(1) | 20.8 |
| 3 | 10 g | Bimetallic citric acid | Alkoxide, 16% $TiO_2$ | 9.0(5) | 0.24(1) | 21.5 |
| 4 | 10 g (catalyst F) | Bimetallic, no citric acid | Alkoxide, 16% $TiO_2$ | 10.8(9) | 0.23(2) | 21.3 |
| 5 | 10 g (catalyst E) | Bimetallic citric acid | No $TiO_2$ impregnation | 5.1(1) | 0.24(1) | 23.4 |
| 6 | 10 kg (catalyst A) | Bimetallic citric acid | Alkoxide, 16% $TiO_2$ | 9.6(3) | 0.30(1) | 19.6 |
| 7 | 150 kg | Bimetallic citric acid | Alkoxide, 16% $TiO_2$ | 9.6(3) | 0.31(1) | 19.2 |
| 8 | 10 g (catalyst B) | Bimetallic citric acid | Aqueous method 2, 16% $TiO_2$ | 10.4(4) | 0.32(2) | 18.8 |
| 9 | 7 kg (catalyst C) | Urea | Alkoxide, 11% $TiO_2$ | 12(1) | 0.18(2) | 23.6 |
| 10 | 10 g (catalyst D) | Bimetallic citric acid | Aqueous method 1, 16% $TiO_2$ | 6.2(9) | 0.14(2) | 29.1 |

It is evident from FIG. 18 and Table 4 that catalyst A, which was prepared with citric acid as fuel, has both a smaller average particle size and a narrower particle size distribution than catalyst C, which was prepared with urea, and catalyst F, which was prepared without any reducing/complexing agent at all. These data also demonstrate the effect of titania as catalyst E (no titania impregnated) has a much smaller average $Co_3O_4$ particle size than catalyst A (titania impregnated via an alkoxide method).

step (aqueous method 1) leads to a catalyst with a small $Co_3O_4$ particle size and high D-value, whilst the use of aqueous precursor without citric acid in the titania modification step (aqueous method 2) leads to a catalyst with a large $Co_3O_4$ particle size and low D-value. Both of catalysts prepared from supports via the titania aqueous method fall outside the particle size and c-value range defined above for the catalysts prepared from supports via the titania alkoxide method.

Effect of Number of Impregnation Steps

A catalyst was prepared using citric acid as a fuel and a titania-modified silica support as follows. Silica (180-300 μm size range) was modified with titania using the alkoxide modification described above in the section "Use of a carboxylic acid as the polar organic compound".

15.0 g of citric acid was dissolved in water and used to prepare a saturated solution of 105.1 g cobalt nitrate hexahydrate, to which 0.205 g of perrhenic acid was added. This solution was used to impregnate 20.0 g of the titania-modified support. The impregnation solution was used in the as-prepared concentration for the formation of the catalysts with 4 and 6 impregnation steps. These catalysts were prepared on a 40 g scale. Table 5 shows the details of the impregnation procedure.

| Impregnation step number | Volume of Co + Re impregnation solution added (mL) | |
|---|---|---|
| | 4-step catalyst | 6-step catalyst |
| 1 | 20.9 | 16.0 |
| 2 | 20.7 | 15.0 |
| 3 | 21.2 | 14.6 |
| 4 | 22.2 | 14.4 |
| 5 | — | 13.7 |
| 6 | — | 13.5 |
| Total volume of impregnation solution used (mL) | 85.0 | 87.2 |

For the catalyst with 8 impregnation steps, additional water was added to the impregnation solution such that the addition of all this solution to the support until the point of incipient impregnation was reached required 8 impregnation steps. The catalyst was prepared on a 10 kg scale.

X-Ray Diffraction Experiment

Figure 19:
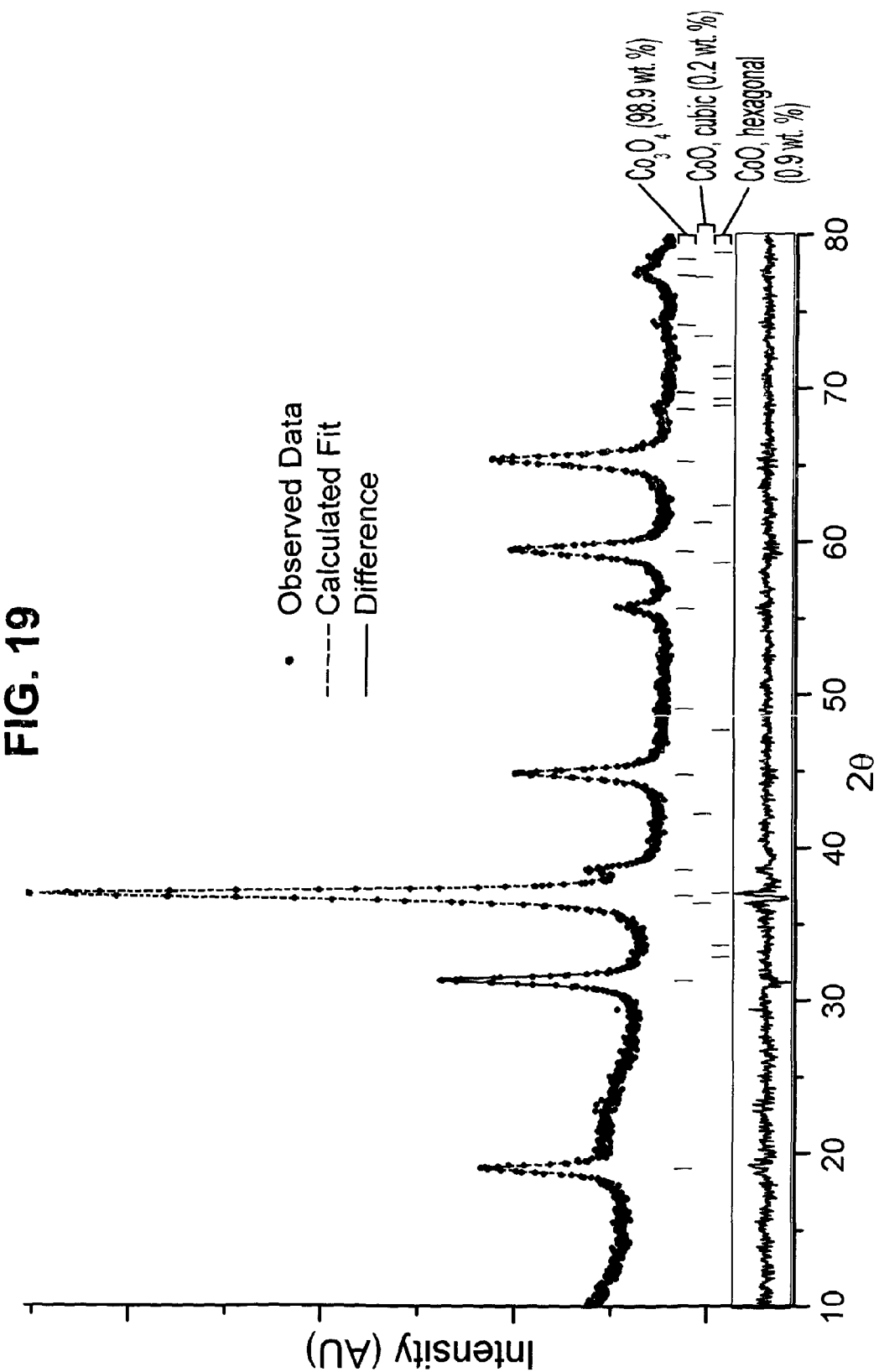
FIG. 19 shows the X-ray diffraction pattern for the catalyst synthesised with four cobalt+rhenium impregnation steps. The calcined catalyst was analysed in air at room temperature and fitted with a mixture of three cobalt oxide phases. $Co_3O_4$ is the major phase at 98.9 wt %.

The X-ray powder diffraction pattern for the catalyst with four impregnation steps was produced using the method previously described and is shown in FIG. 19.

Relationship Between the Number Average Particle Diameter and Width of Size Distribution and the Number of Impregnations.

Figure 20:
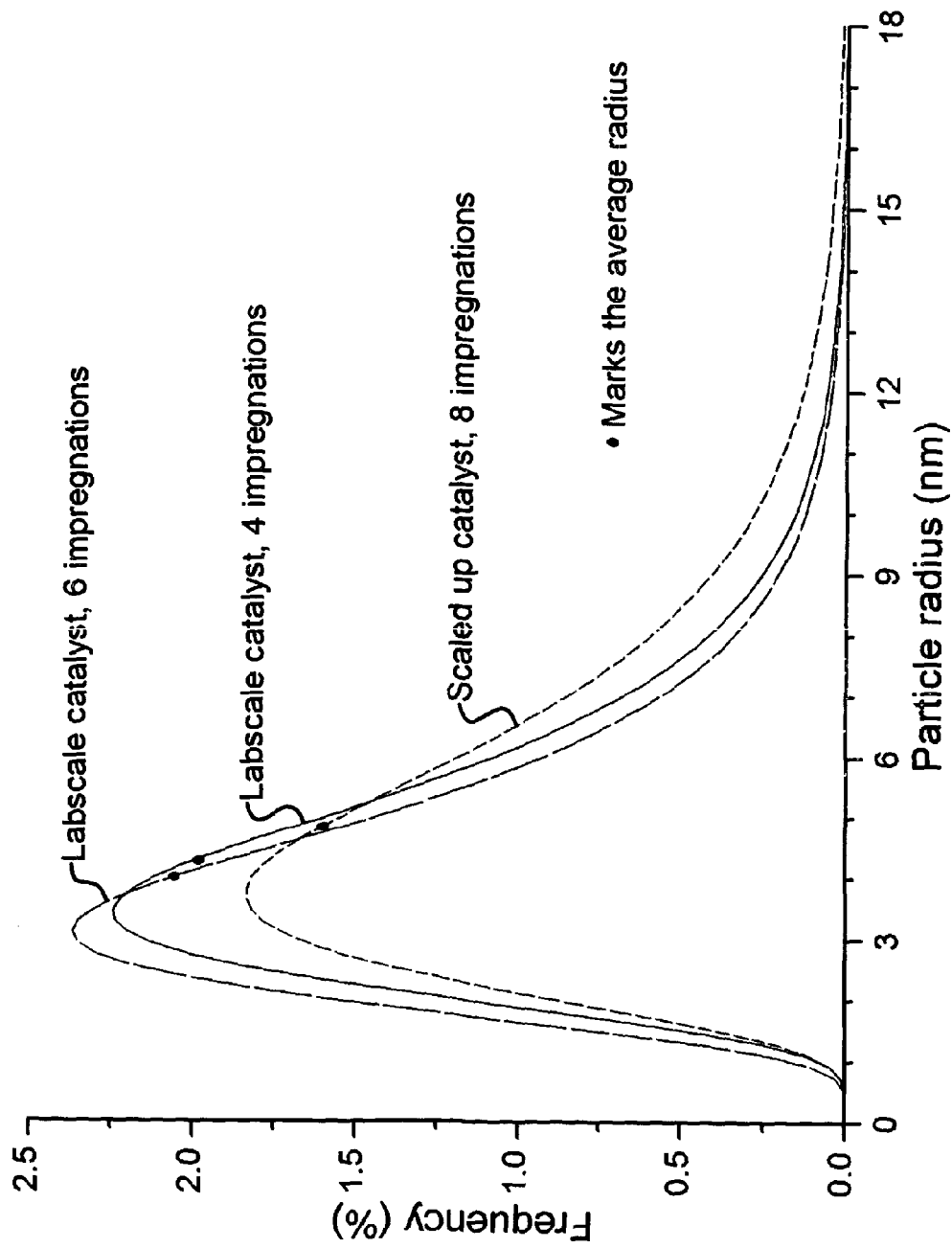
FIG. 20 shows the $Co_3O_4$ particle size distribution for catalysts synthesised with 4, 6 and 8 impregnation steps.

FIG. 20 shows the $Co_3O_4$ particle size distribution for all three catalysts.

Figure 21:
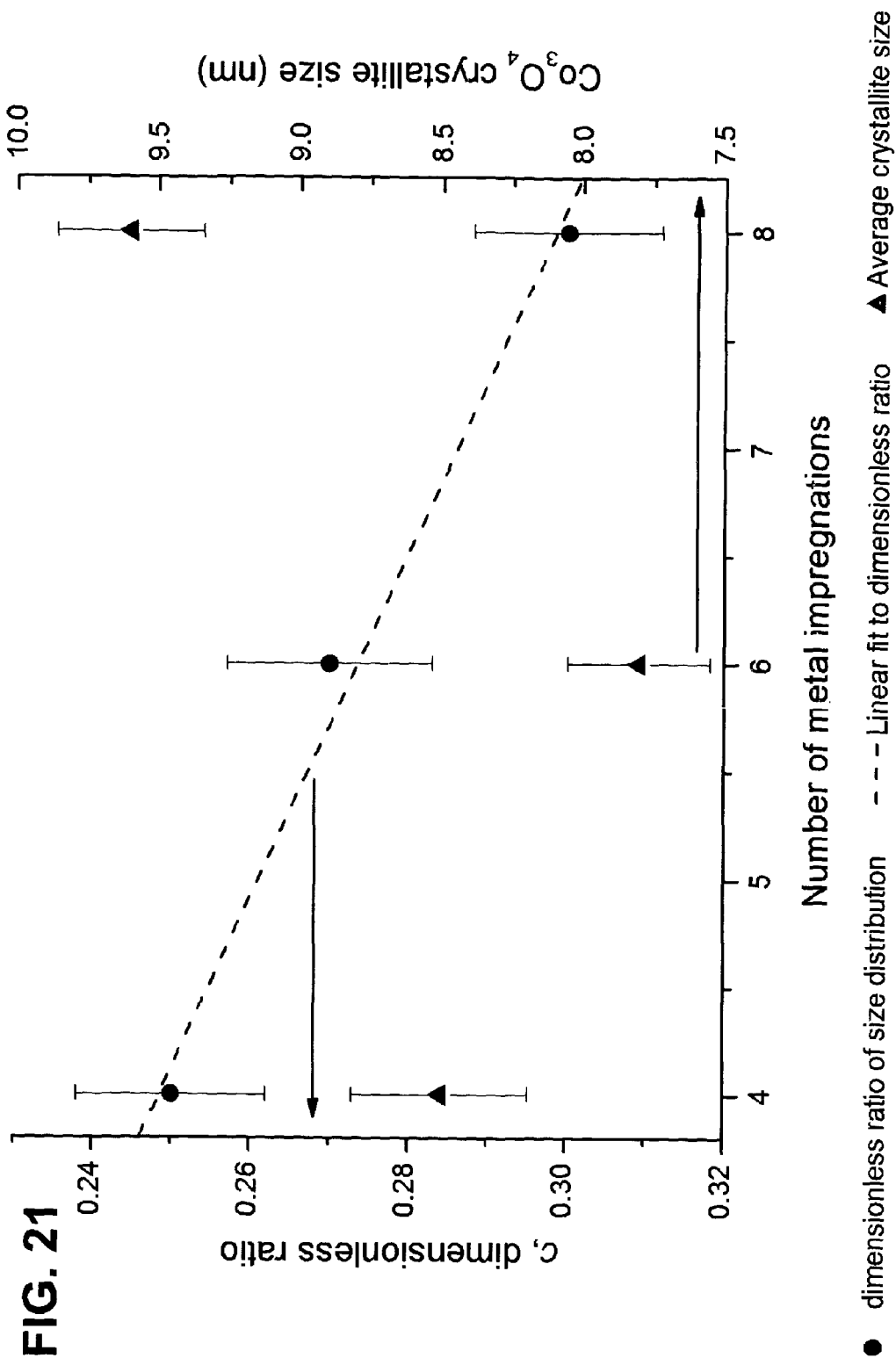
FIG. 21 shows the dependence of the $Co_3O_4$ number average particle diameter and widths of size distribution on the number of impregnation steps during synthesis of the catalyst.

The relationship between the number of impregnation steps used in the catalyst synthesis and the number average particle diameter and width of size distribution of the $Co_3O_4$ particles in the calcined catalyst is shown in FIG. 21. The width of the size distribution is measured using the c value, as discussed above, where a larger c value corresponds to a wider size distribution. It is clear from FIG. 21 that there is a linear relationship between the number of impregnation steps and the width of the size distribution, i.e. as the number of impregnation steps increases, the spread of the cobalt oxide particle size broadens.

FTS testing was carried out according to Test Method 1.

Figure 22:
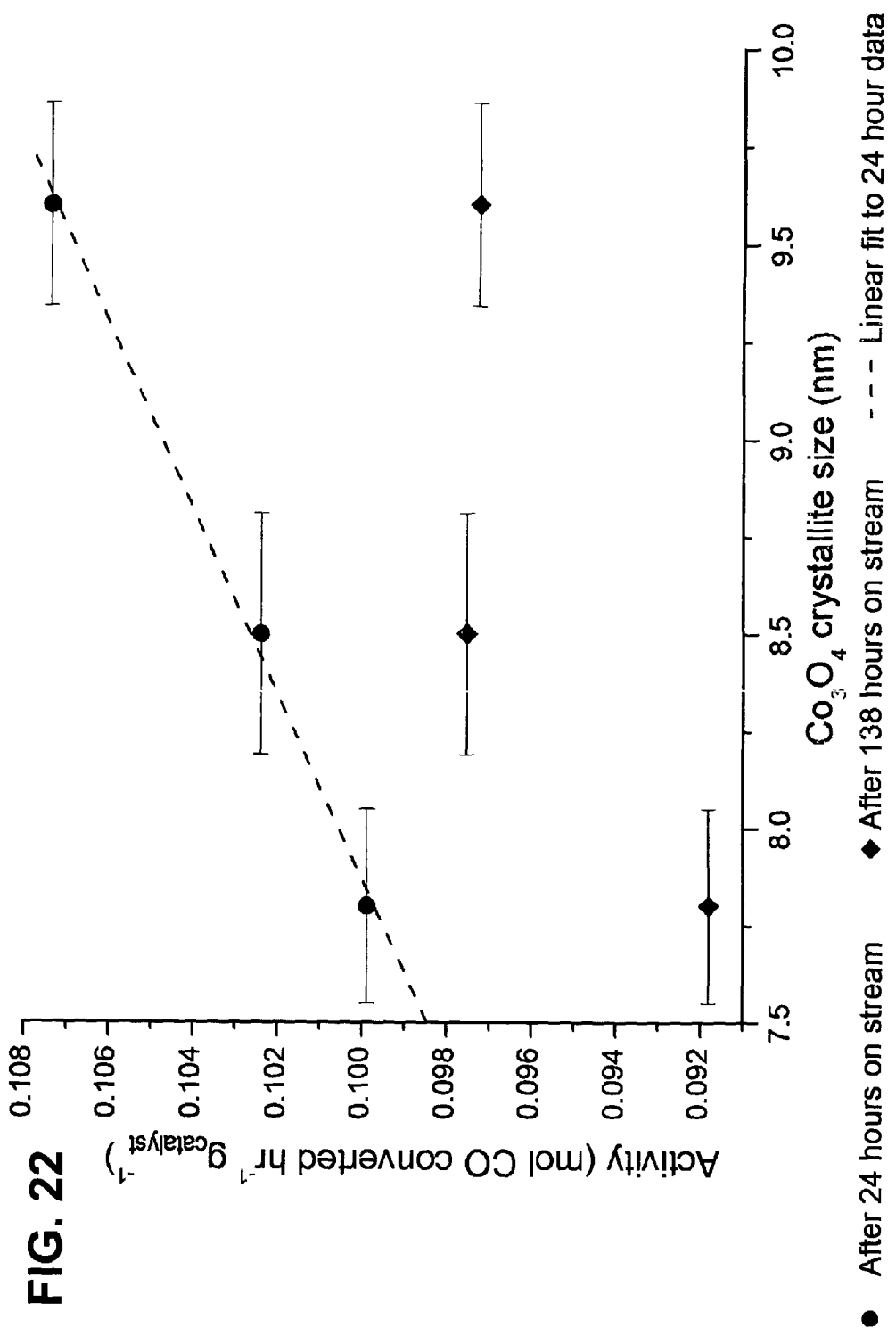
FIG. 22 shows the variation in FTS activity of the catalyst at a time on stream of 24 and 138 hours versus the number average diameter of the $Co_3O_4$ particles.

FIG. 22 shows the relationship between the FTS activity of the three catalysts and the number average particle diameter of the $Co_3O_4$ particles in the calcined catalysts at a time on stream of 24 and 138 hours. There is a linear relationship between the initial activity (i.e. after 24 hours on stream) of the catalysts and the number average particle diameter, i.e. larger particle diameters correspond to more active catalysts. However, the relationship between the number average particle diameter and the FTS activity at a time of 138 hours is less clear due to the effects of deactivation.

Figure 23:
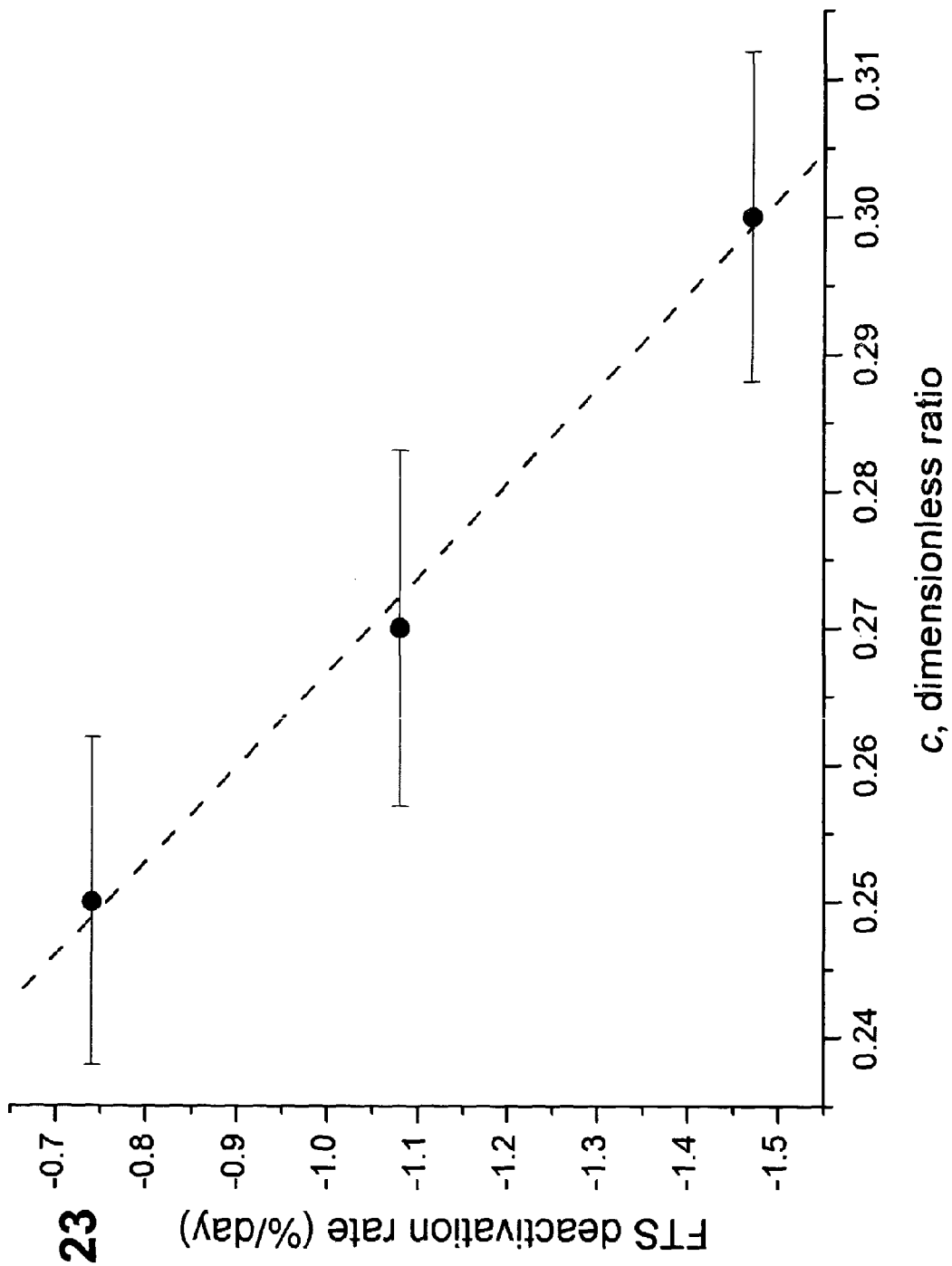
FIG. 23 shows the variation in FTS deactivation rate of the catalysts versus the $Co_3O_4$ particle size distribution.

FIG. 23 shows the relationship between the FTS deactivation rate of the three catalysts and the $Co_3O_4$ particle size distribution. A clear linear relationship is seen between these two variables wherein catalysts with a broader particle size distribution are less stable (i.e. have higher deactivation rates) in FTS.

The correlations outlined in FIG. 21 to FIG. 23 suggest that it may be possible to control the deactivation rate of a $Co_3O_4$ catalyst during FTS by controlling the width of the $Co_3O_4$ particle size distribution, which in turn may be directed by the number of metal impregnation steps used during synthesis.

FTS Testing in Fixed-Bed Combinatorial Reactor—"Test Method 1"

For FTS in a fixed-bed combinatorial reactor a catalyst sample of volume of 0.129 mL was diluted with 2.184 mL of SiC and loaded into a reactor with L/D=31 cm. A reduction was carried out using pure hydrogen at 400° C., with a ramp rate of 1° C./min and a dwell time of 120 minutes. Hydrogen flow was maintained at a GHSV of 15 000 $hr^{-1}$. After this reduction, the reactor was cooled to 165° C. and the gas flow switched to synthesis gas before holding at this temperature for 1 hour. The pressure was then increased to 20 bar at a flow rate of 12 400 $hr^{-1}$ and held there for a further hour. At a ramp rate of 4° C./hour, the temperature was increased from 165° C. to 190° C. whilst maintaining this flow rate, and then increased from 190° C. to 210° C. at a ramp rate of 2° C./hour. The temperature was then held at 210° C. for ~120 hours for the FT reaction. The liquid products of this reaction were trapped in hot and cold knock out pots, and the gas products were injected online to a Clarus 600 gas chromatograph. Hydrogen, carbon monoxide and nitrogen were detected with a thermal conductivity detector and hydrocarbons from $C_1$ to $C_4$ were detected with a flame ionisation detector. Conversion and product selectivity were calculated using nitrogen as a tracer and employing a carbon mass balance.

The deactivation rate was calculated via linear regression analysis on the CO percent conversion from a time on stream of 24 hours until the end of the run (160 hours). The activity of the catalyst, in mol CO $hr^{-1}$ $g_{Co}^{-1}$, at a given time on stream was calculated via $$\text{activity} = \frac{CO \% \text{ conversion}}{100\%} * \frac{CO \text{ flow rate in } \frac{mL}{min} * 60\frac{min}{hr}}{22400\frac{mL}{mol\ CO}} * \frac{1}{\text{catalyst weight in g}} * \frac{100\%}{\text{Wt. \% Co}}$$

Given a set of data $(x_i, y_i)$ with n data points where x is time on stream in hours at Fischer Tropsch conditions and y is the % CO conversion, the slope (m), y-intercept (b) and correlation coefficient, r, can be determined using the following:

$$m = \frac{n\sum(xy) - \sum x \sum y}{n\sum(x^2) - (\sum x)^2}$$

$$b = \frac{\sum y - m\sum x}{n}$$

-continued $$r = \frac{n\sum(xy) - \sum x \sum y}{\sqrt{[n\sum(x^2) - (\sum x)^2][n\sum(y^2) - (\sum y)^2]}}$$

The rate of catalyst deactivation or decline in activity is then calculated as follows:

Rate of catalyst deactivation=% CO conversion/day=
(Slope)(24 hrs/day)(100)

Table 6 summarises the FTS performance of a selection of catalysts: data is given for the same catalysts for which the structure of $Co_3O_4$ phase is explored in Table 4 above.

Table 6—FTS performance for a series of catalysts synthesised using either a bimetallic citric acid recipe or a urea-based recipe. In addition, catalysts prepared using an aqueous method of titania impregnation (rather than an alkoxide method) were also tested.

(support A) has a surface acidity that falls below the preferred range for stable catalyst supports of >0.2 μmol $NH_3/m^2$.

The D-value metrics (Table 4) and the surface acidity data (Table 3) are sufficient to explain all unstable catalysts, i.e. deactivation rate faster than −1.50%/day, tested here. In Table 6, the unstable catalysts are Catalyst E (deactivation rate of −1.63%/day) and catalyst B (−2.19%/day). As discussed above, the support used to make catalyst E has a surface acidity that falls below the preferred range of >0.2 μmol $NH_3/m^2$. Catalyst B has a D-value that falls outside the preferred range of ≥19. In contrast, all of the stable catalysts (deactivation rate slower than −1.50%/day) were made from supports with surface acidities >0.2 μmol $NH_3/m^2$ (where tested, see preceeding discussion) and with D-values greater than or equal to 19. Table 6 shows that catalysts made with citric acid from supports modified with titania via either the alkoxide method or aqueous method 1 (citric acid included

| Catalyst | synthesis scale | Recipe used | Method of titania impregnation | Activity (mol CO $hr^{-1}$ $g_{Co}^{-1}$) 24 hrs | Activity (mol CO $hr^{-1}$ $g_{Co}^{-1}$) 140 hrs | % CO converted 24 hrs | % CO converted 140 hrs | $C_5$+ selectivity (%) 24 hrs | $C_5$+ selectivity (%) 140 hrs | Deactivation Rate (% CO converted/day) |
|---|---|---|---|---|---|---|---|---|---|---|
| 1 | 10 g (G) | Citric acid | Alkoxide, 16% $TiO_2$ | 0.246 | 0.234 | 68.8 | 65.5 | 85.6 | 84.3 | −0.74 |
| 2 | 10 g | Citric acid | Alkoxide, 16% $TiO_2$ | 0.232 | 0.214 | 74.0 | 68.0 | 87.3 | 85.6 | −1.08 |
| 3 | 10 g | Citric acid | Alkoxide, 16% $TiO_2$ | 0.248 | 0.240 | 65.6 | 63.7 | 86.1 | 85.7 | −0.77 |
| 4 | 10 g (F) | None | Alkoxide, 16% $TiO_2$ | 0.280 | 0.261 | 73.6 | 68.5 | 87.1 | 85.9 | −1.11 |
| 5 | 10 g (E) | Citric Acid | No $TiO_2$ impregnation | 0.352 | 0.314 | 78.9 | 70.3 | 87.8 | 85.6 | −1.63 |
| 6 | 10 kg (A) | Citric acid | Alkoxide, 16% $TiO_2$ | 0.263 | 0.238 | 67.8 | 61.4 | 85.8 | 85.0 | −1.47 |
| 7 | 150 kg | Citric acid | Alkoxide, 16% $TiO_2$ | 0.266 | 0.242 | 72.4 | 65.9 | 86.5 | 84.7 | −1.37 |
| 8 | 10 g (B) | Citric acid | Aqueous method 2, 16% $TiO_2$, | 0.264 | 0.222 | 69.9 | 59.0 | 87.9 | 85.3 | −2.19 |
| 9 | 7 kg (C) | Urea | Alkoxide, 11% $TiO_2$ | 0.272 | 0.248 | 69.7 | 63.4 | 86.0 | 85.0 | −1.34 |
| 10 | 10 g (D) | Citric Acid | Aqueous method 1, 16% $TiO_2$, | 0.283 | 0.271 | 77.7 | 74.6 | 86.0 | 84.3 | −0.74 |

It is evident from Table 6 that both the use of a complexing/reducing agent in the combustion synthesis and the method of titania impregnation impact on the FTS performance of the catalyst. When no fuel is used (catalyst F) the deactivation rate is higher as compared to a citric acid based catalyst of the same batch size (catalyst G)—compare deactivation rates of −1.11%/day vs. −0.74%/day. The use of a support modified with 16% titania via the alkoxide method leads to a catalyst with deactivation rates less than −1.50%/day in all cases. When the titania modification instead occurs via an aqueous method, only method 1 (citric acid included in titania modification step) leads to a stable catalyst. The catalyst synthesised via aqueous method 2 (catalyst B) shows the highest deactivation rate of all materials tested, and is much less stable than the catalysts synthesised via the alkoxide impregnation method.

The variation in FTS stability with the nature of the support may be related the support surface acidity, as discussed in the section "Surface Acidity of $TiO_2$ modified supports" above. The support used to synthesise catalyst E in titania impregnation step) fall within these acidity and D-value ranges and are stable during FTS.

Correlations Between FTS Performance and Catalyst Structure

Figure 24:
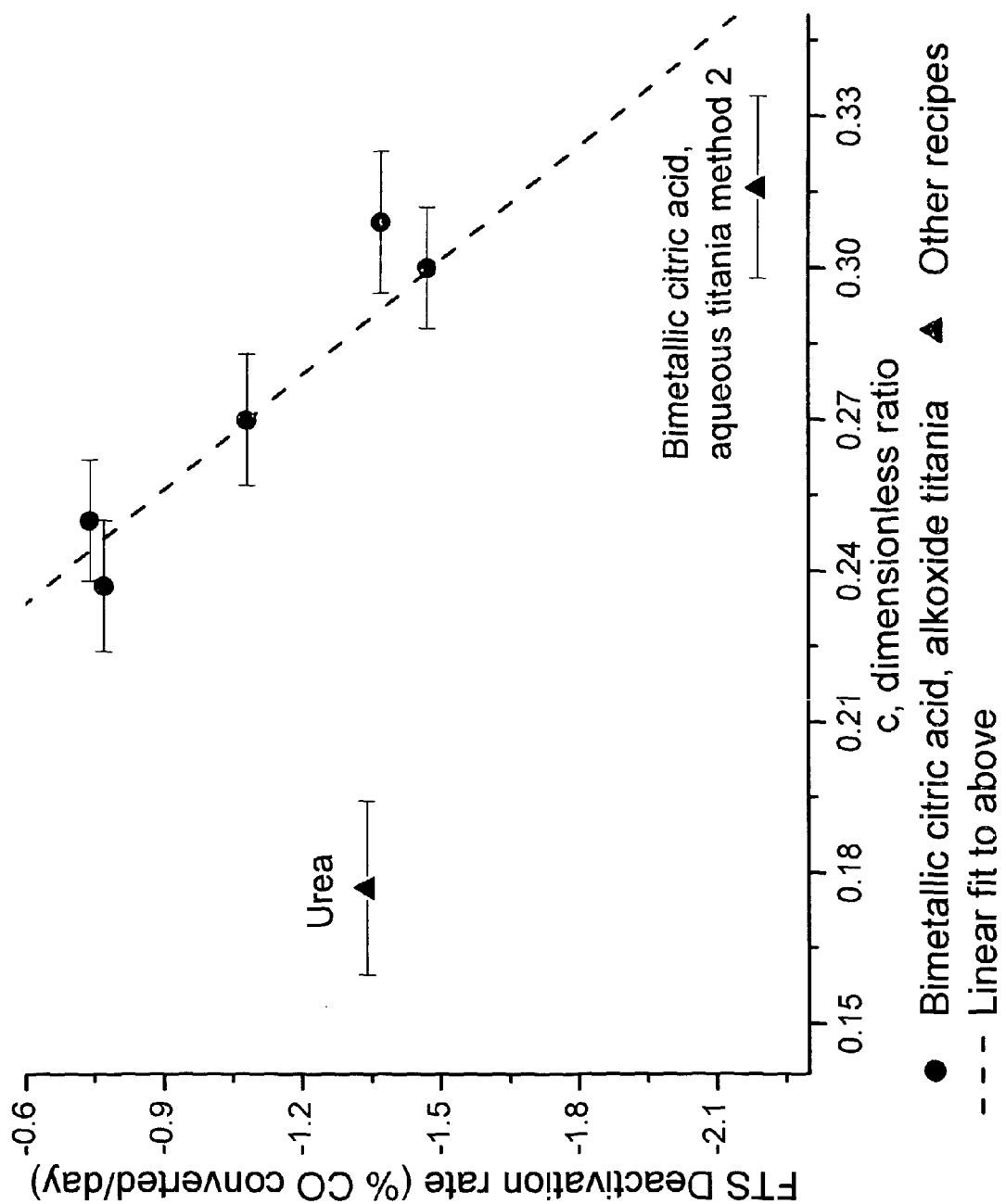
FIG. 24 shows the FTS deactivation rate, expressed as a change in the % CO converted per day from 24 hours to 140 hours, plotted against the dimensionless ratio c of the $Co_3O_4$ size distribution for a series of catalysts prepared from different recipes. A decrease in % CO converted per day is indicative of catalyst deactivation (i.e. loss of activity). The circles are data points for catalysts synthesised using the bimetallic citric acid recipe on a support modified with titania using the alkoxide method. The dotted black line is a linear fit to these data.

Several correlations between the data given in Table 4 (structural properties of the $Co_3O_4$ phase) and Table 6 (FTS performance) are discussed in this section. First, FIG. 24 shows the relationship between the dimensionless ratio, c, and the stability of the catalyst during FTS. A larger value of c indicates a wider distribution of particles sizes when compared amongst a set of particles with very similar average sizes (for example, the set of bimetallic citric acid catalysts with titania deposited via the alkoxide method). However, c is also related to the inverse square of the average particle radius. Thus the catalyst prepared with the urea recipe, which has a large average particle size, also has a small value of c despite displaying an obviously wide particle size distribution as shown in FIG. 18.

The correlation between FTS deactivation rate and c can therefore be constrained to consider only sets of data with similar average $Co_3O_4$ particle sizes: a spread of $D_O\pm 1$ nm is a suitable restriction. As the average particle sizes of all the bimetallic citric acid catalysts prepared via an alkoxide titania impregnation method fall in this range (7.8 nm≤$D_O$≤9.6 nm), the variation of c within this set of catalysts will be directly related to variations in the width of the $Co_3O_4$ particle size distribution. It is therefore evident from FIG. 24 that the deactivation rate of the catalyst linearly depends on c within this set. This suggests that as the width of the cobalt oxide particle size distribution increases, the stability of the catalyst decreases.

Figure 25:
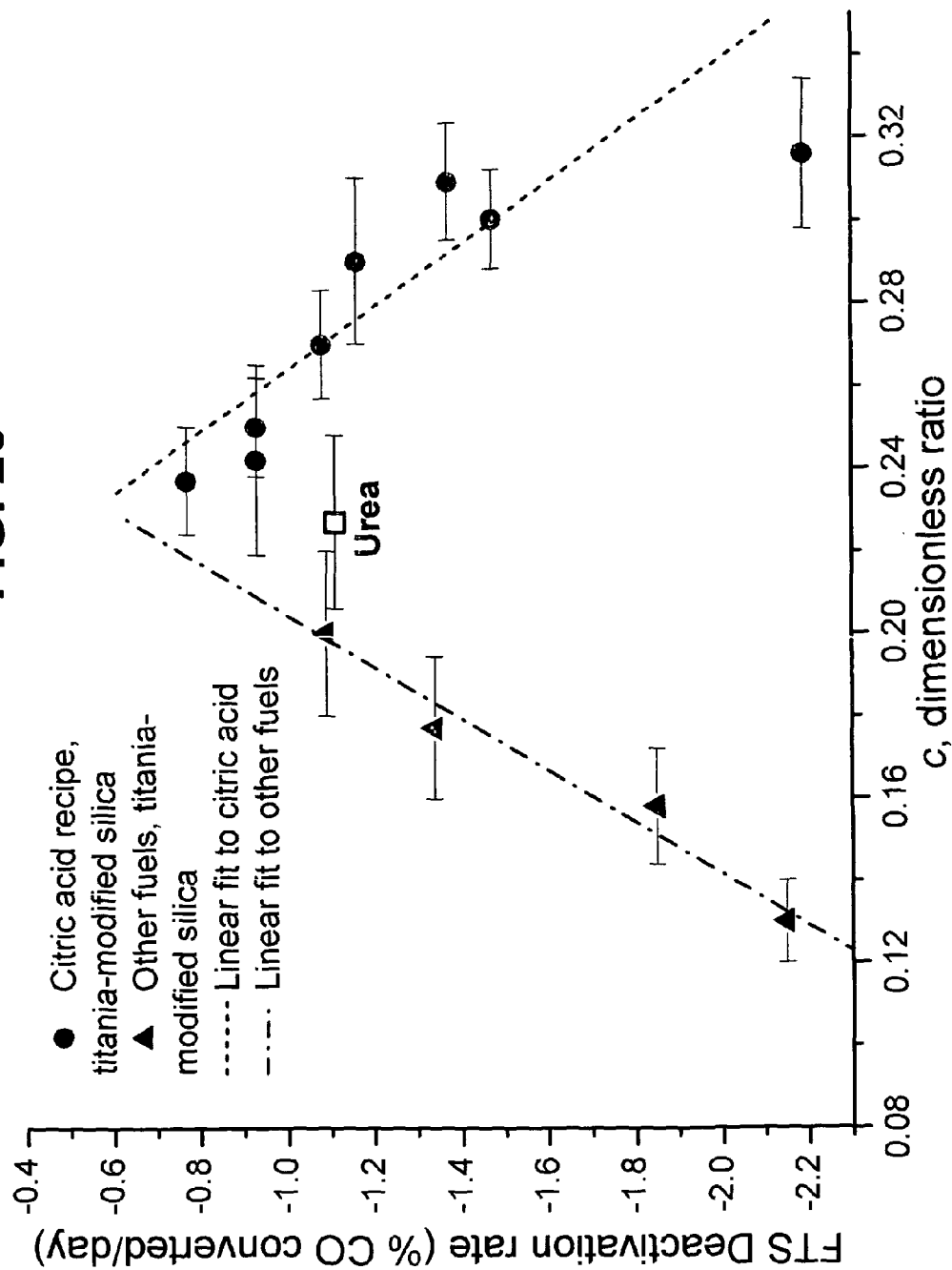
FIG. 25 shows the FTS deactivation rate, expressed as a change in the % CO converted per day from 24 hours to 140 hours, plotted against the dimensionless ratio c of the $Co_3O_4$ size distribution for a series of catalysts prepared from different recipes. A decrease in % CO converted per day is indicative of catalyst deactivation (i.e. loss of activity). The circles are data points for catalysts synthesised using the bimetallic citric acid recipe on a support modified with titania using the alkoxide method. The triangles are data points for catalysts synthesised using fuels other than citric acid on a support modified with titania using the alkoxide method. The dotted black line is a linear fit to these data.

FIG. 25 shows the c-value for an expanded range of catalysts made with a variety of fuels and includes a wide range of $Co_3O_4$ particle diameters and size distributions. FIG. 25 demonstrates that the trend between the c-value and the deactivation rate is broken when the number average particle diameter of the $Co_3O_4$ particles changes substantially.

Figure 26:
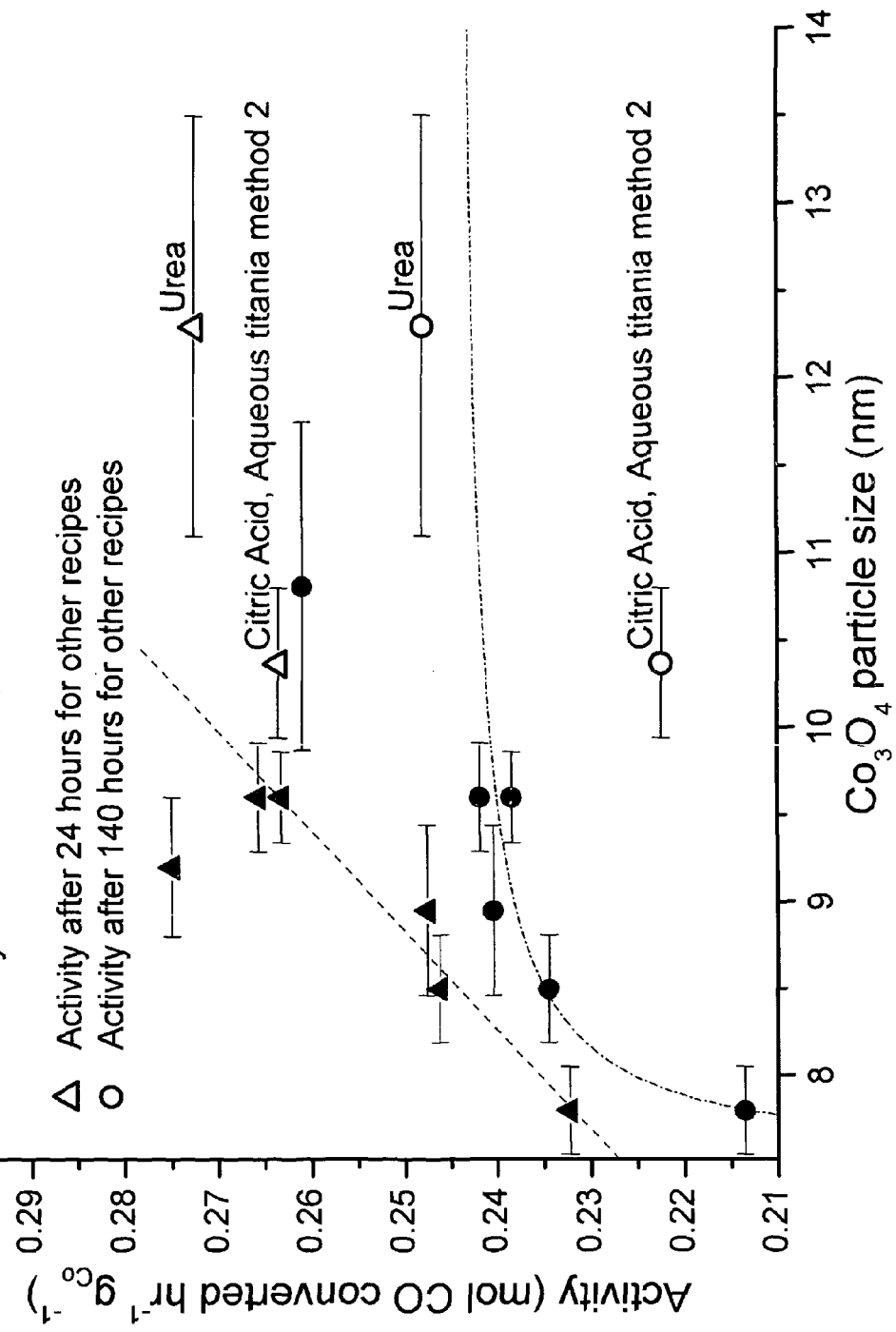
FIG. 26 shows the FTS activity for a series of catalysts prepared from different recipes, plotted against the average crystallite diameter of the $Co_3O_4$ phase in these catalysts. The activity is given both at the start of the reaction (triangles, 24 hours) and at the end (circles, 140 hours). Filled triangle and circles show data for catalyst synthesised using the bimetallic citric acid recipe on a support modified with titania using the alkoxide method. The dotted black line is a linear fit to these data at the start of the FT reaction, whilst the dash-dot black line is an exponential fit to these data at the end of the reaction. The muted data (unfilled triangles and circles) show the activity for catalysts made from other recipes for comparison.

There is also a correlation between the activity of the catalyst during the FT reaction and the average size of the crystallites in the $Co_3O_4$ phase. FIG. 26 plots the trend in FT activity, both at the start (24 hours) and the end (140 hours) of the reaction, against the average $Co_3O_4$ crystallite diameter. For the catalysts synthesised via the bimetallic citric acid recipe on a support modified with titania using the alkoxide method, there is a linear increase in the initial activity as the size of $Co_3O_4$ particles grows. However, this relationship is altered at the end of the FT reaction, with the activity at 140 hours showing an initial sharp increase as the particle size grows and then levelling off at $D_O$>10 nm. The data in FIG. 26 suggest that there may be an optimum average $Co_3O_4$ crystallite diameter for long-term FT activity of a catalyst, which may be in the range of 8 to 10 nm. The average $Co_3O_4$ crystallite size in the catalyst synthesised with urea as fuel, shown here for comparison, is significantly larger than this optimum size range. It should be noted that the catalyst synthesised via the aqueous titania impregnation method 2 has a final activity that is much lower than would be expected based on extrapolation of the data from the catalysts in which titania was deposited using an alkoxide method.

Figure 27:
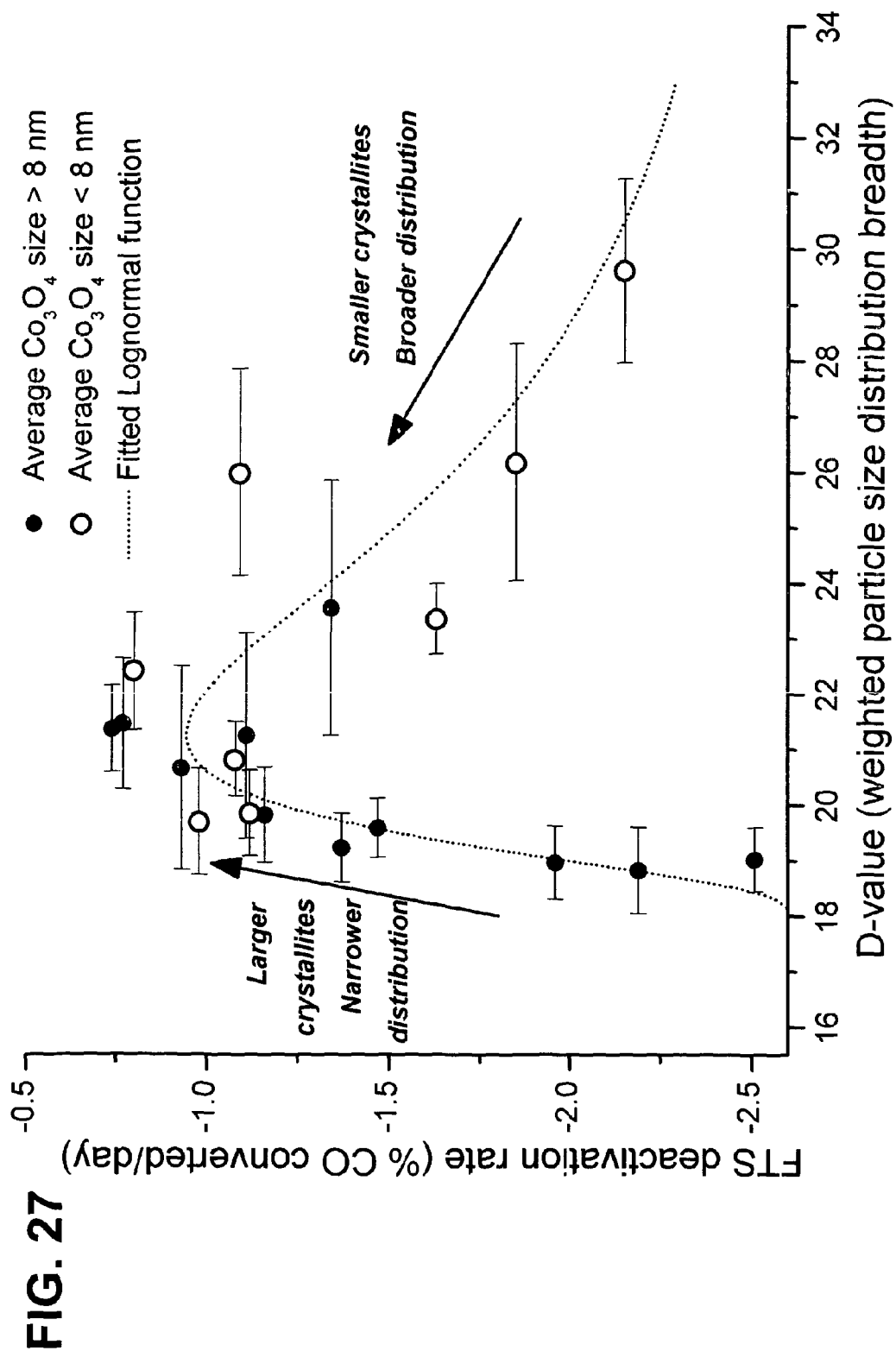
FIG. 27 shows the FTS deactivation rate (via Test Method 1), expressed as a change in the % CO converted per day from 24 hours to 140 hours, plotted against the D-value for a series of catalysts prepared from different recipes. A decrease in % CO converted per day is indicative of catalyst deactivation (i.e. loss of activity). The darker circles are data points for catalysts having a number average particle diameter of greater than 8 nm. The lighter circles are data points for catalysts having a number average particle diameter of less than 8 nm. The dotted line is the fitted lognormal function.

FIG. 27 shows the trend between the D-value and the Fischer-Tropsch catalyst stability as measured by Test Method 1. The data in FIG. 27 has been fitted with a lognormal distribution which shows two different trends in D vs. deactivation rate. The observation of two different trends can be rationalised if the catalysts are divided based on number average particle diameter. For catalysts with a number average particle diameter of greater than 8 nm, the stability increases as D becomes larger. Without wishing to be bound by theory, the inventors believe that this may be due to a decrease in the number of "small" $Co_3O_4$ particles as the size distribution narrows and D increases. In contrast, for catalysts with a number average particle diameter of less than 8 nm, the stability increases as D becomes smaller. Without wishing to be bound by theory, the inventors believe that this may be due to the presence of a greater proportion of "larger", more stable, $Co_3O_4$ particles.

Figure 28:
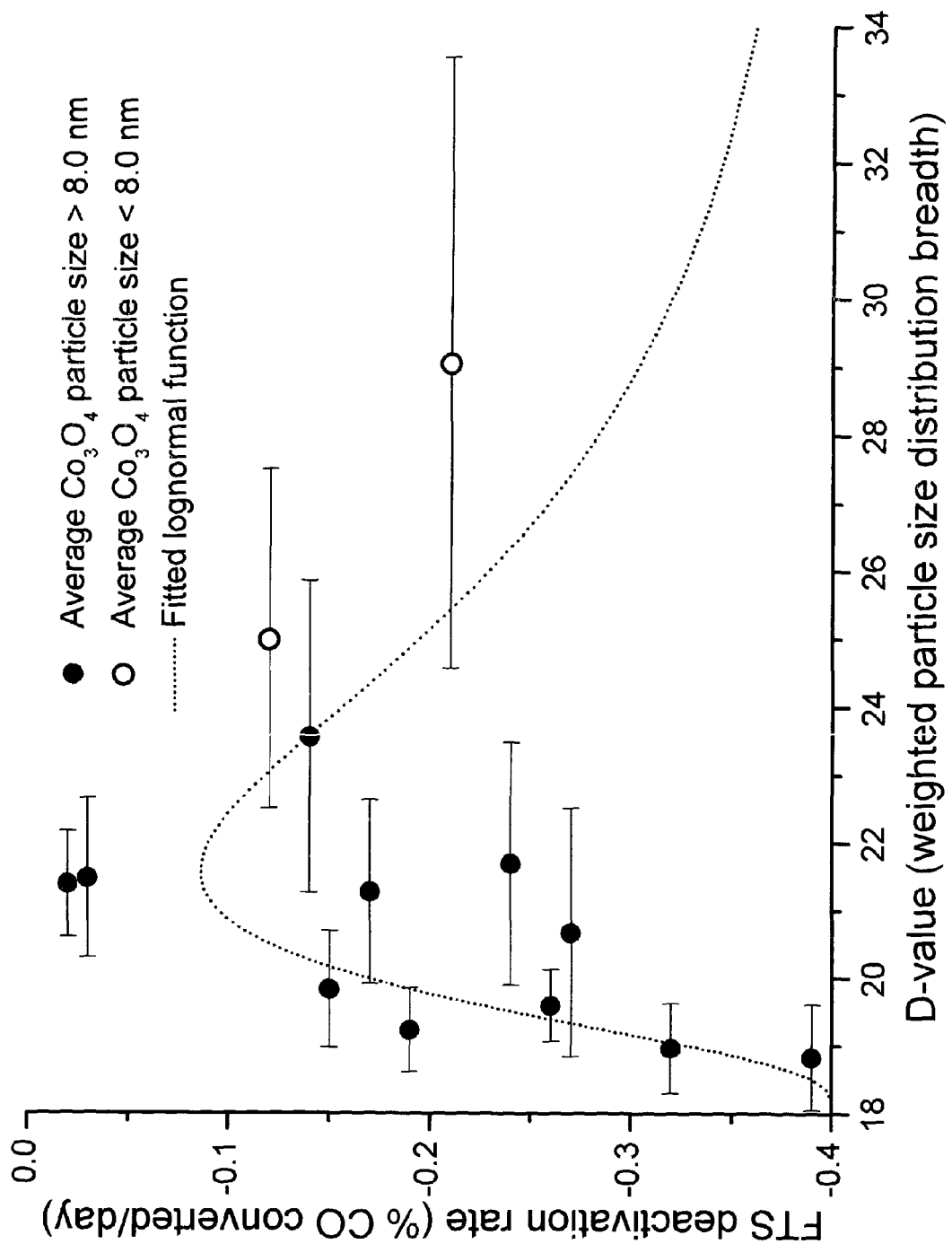
FIG. 28 shows the FTS deactivation rate (via Test Method 2), expressed as a change in the % CO converted per day, plotted against the D-value for a series of catalysts prepared from different recipes. The filled circles are data points for catalysts having an average particle size of greater than 8 nm. The unfilled circles are data points for catalysts having an average particle size of less than 8 nm. The dotted line is the fitted lognormal function
Figure 29:
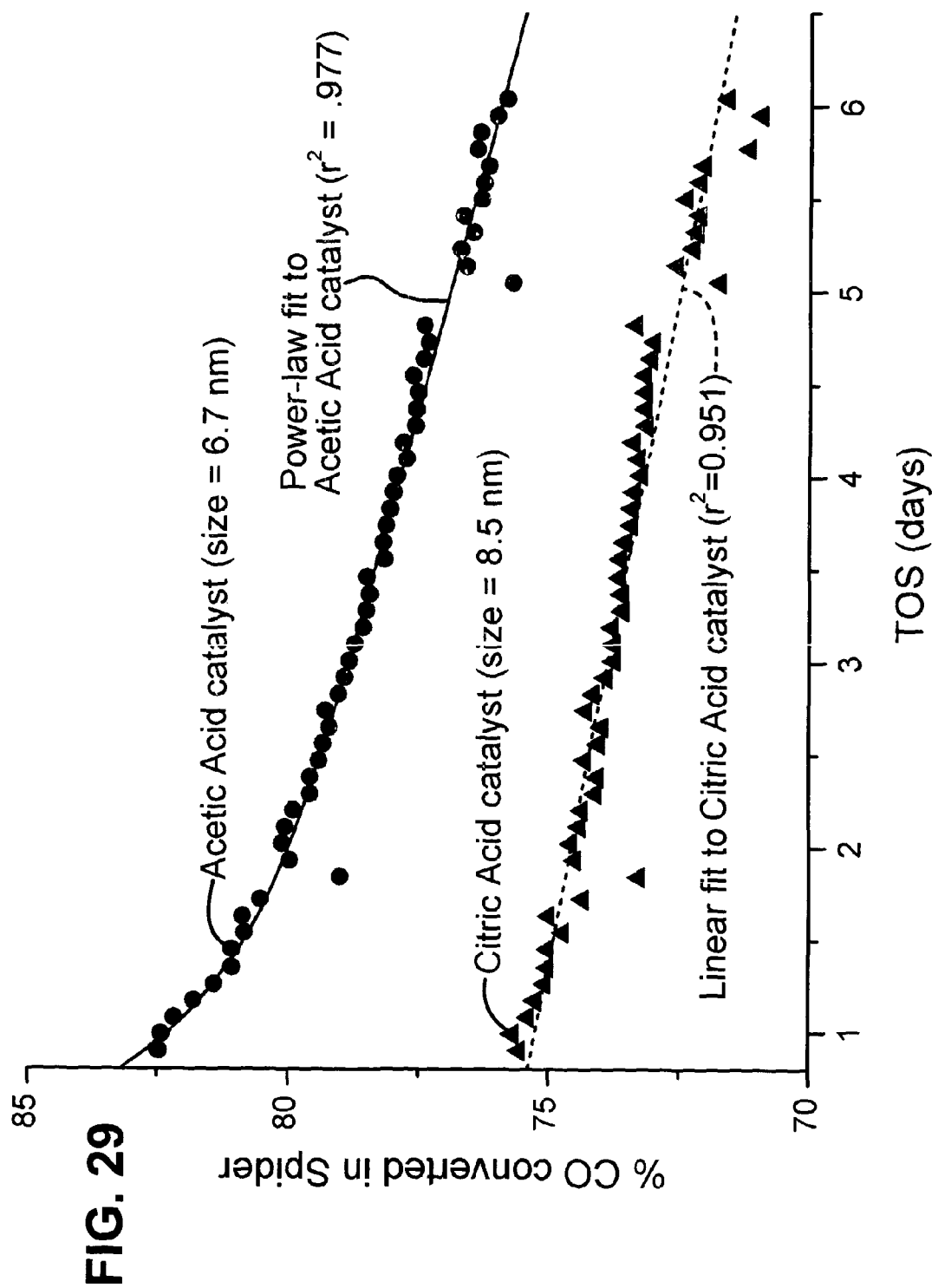
FIG. 29 shows the kinetic data from FTS testing in a fixed bed reactor for a catalyst with small number average particle diameter and large number average particle diameter.

The observed two-size regime is supported by FTS performance data of % CO converted versus time on stream (TOS), as shown in FIG. 29 for a catalyst with a "small" (i.e. less than 8 nm) number average particle diameter (6.7 nm) and a catalyst with a "large" (i.e. more than 8 nm) number average particle diameter (8.5 nm). It can be observed from FIG. 28 that the deactivation in the catalyst with large particles is readily described by a linear trend. However, the deactivation in the catalyst with smaller particles is clearly not linear and is better described by a power-law expression.

Without wishing to be bound by theory, the inventors believe that this variation in deactivation functions for small and large $Co_3O_4$ particle diameters may represent a difference in deactivation mechanism for these two size regimes.

FIG. 28 shows the trend between the D-value and the Fischer-Tropsch catalyst stability as measured by Test Method 2. The data in FIG. 28 has been fitted with the same lognormal function as FIG. 27 and can also be divided into two particle size regimes. Although the trend in the data is the same, the correlation is improved when Test Method 2 is used to measure FTS stability as there is less run-to-run variation using this Method.

The data in FIG. 23 to FIG. 28 suggest that the FTS performance of a catalyst may be directly related to both the average $Co_3O_4$ crystallite size in the calcined material, as well as the distribution of crystallites around this average. Analysis of the trend in FTS activity against average particle size suggests that long term activity may be optimised for catalysts with $Co_3O_4$ particles in the size range of approximately 8 to 10 nm. The stability of the catalyst may also depend on the width of the $Co_3O_4$ particle size distribution: FIG. 24 suggests that a narrower particle size distribution will result in a more stable catalyst. Therefore, optimum FTS activity and stability may be observed for catalysts with an average $Co_3O_4$ particle size in the range 8-10 nm with a size distribution ideally as narrow as possible but with a c value at least below 0.31 (i.e. size range obtained when using citric acid-based catalyst with titania modification via the alkoxide method).

Alternatively, FIG. 27 and FIG. 28 suggests that the optimum FTS stability may be observed for catalysts with a D-value of 19 or greater—this holds true for all $Co_3O_4$ particle sizes tested to date via Test Method 2 and thus the correlation of D-value with stability need not be restricted to a particular size regime. However, additional increases in stability are also observed when a catalyst with a D-value in this size range was made from a catalyst support with surface acidity such that neutralisation requires 0.2 μmol $NH_3/m^2$ or more It has been shown that the average crystallite size and the size distribution of the $Co_3O_4$ phase depend on the parameters of the catalyst synthesis methodology. When the combustion fuel is changed from citric acid to urea, an increase in the average $Co_3O_4$ crystallite size is observed, along with a significant broadening of crystallite size distribution. When no fuel at all is used, the same trend is observed. These structural changes may be correlated to increased FTS performance when citric acid is used as fuel.

Altering the method of titania impregnation from an alkoxide to an aqueous formulation affects the cobalt oxide particle size and size distribution. The use of an aqueous titania precursor with citric acid included in the titania modification step (i.e aqueous titania method 1) causes a decrease $Co_3O_4$ particle size as compared to when the alkoxide method is used. In contrast, the use of an aqueous titania precursor without citric acid included in the titania modification step (i.e. aqueous titania method 2) causes an increase in the $Co_3O_4$ particle size as well as a broadening of the particle size distribution. Crystalline titania phases are also observed in the calcined catalyst when the aqueous method 2 is used. The catalyst synthesised from method 1 has a D-value that falls within the range of D≥19, whilst the catalyst synthesised by method 2 falls outside this range. The catalyst synthesised via the aqueous titania impregnation method 2 is significantly less stable during the FTS than the catalyst synthesised via the alkoxide route, which may be related to the increase in the average size and size distribution of the $Co_3O_4$ phase (eg. D-value outside preferred range of ≥19) and the formation of crystalline $TiO_2$. The catalyst synthesised by aqueous method 1 has comparable FTS stability and activity to the catalyst synthesised from a support modified with titania via the alkoxide method.

FTS Testing in Microchannel Reactor—"Test Method 2"

Apparatus:

The Fischer-Tropsch reaction is conducted in a stainless-steel microchannel reactor with a process gap of 1 mm, a width of 0.6 cm and a sufficient length for including a 1.9 cm long SiC bed placed upstream of the catalyst bed of length 61.6 cm. Two coolant channels of dimensions 0.2 cm×1.27 cm run along the entire length on either side of the process channel. A hot oil (Marlotherm SH) is flowed in both the coolant channels, co-current to the direction of flow of syngas, using a Julabo pump at a minimum flow rate of 8 LPM. The reactor temperature is measured by a set of Omega K-type thermocouples installed in the metal web between the process and coolant channels.

Catalyst Loading:

The catalyst is ground and sieved to obtain a target size fraction of 106×212 microns. The SiC used as an inert is washed, ground and sieved to the same particle size range. The packed apparent bed density (PABD) of both these materials is measured ex-situ using automated tap density analyzers (e.g. Autotap—Quantachrome Instruments, GeoPyc—Micromeritics Instrument Corporation) or standard densification protocol of using a vibrating table. After installing the retention assembly at the reactor outlet, the catalyst is first loaded to a bed length of 61.6 cm followed by SiC to top off the process channel, using appropriate bed densification techniques. The packing density of the catalyst and SiC in the microchannel should be within ±5% of the ex-situ measured PABD. This is followed by the installation of the catalyst retention assembly at the reactor inlet.

Experimental Details:

The reactor is installed in the test stand and appropriate connections for feeding the syngas, hot oil, etc., are made.

Catalyst Activation:

1) The reactor, as installed, is under ambient conditions of temperature and pressure
2) Set nitrogen (>99.99%) flow to a gas hourly space velocity (GHSV) of 1300 $hr^{-1}$ based on the loaded volume of catalyst in the reactor (~3.353 ml)
3) Purge the reactor with nitrogen for a period of 1 hr
4) Replace nitrogen feed with hydrogen (>99.9%) at the same GHSV of 1300 $hr^{-1}$
5) Purge the reactor with hydrogen for a period of 1 hr
6) Starting at ambient temperature, heat the reactor to a target temperature of 400° C. at a rate of 60° C./hr (using ceramic heater and/or heat tapes as necessary)
7) The maximum temperature spread across the reactor of the reactor should be within ±5° C. as measured by the difference between the maximum and the minimum reading of the thermocouples
8) The reactor is held under these reducing conditions for period of 2 hrs
9) Upon completion of this hold, the reactor is cooled to a temperature of 170° C. at a rate of 60° C./hr
10) Calculate the time elapsed from the start of the heat-up (step 6). If this time is less than 14 hrs, continue to hold the reactor under flowing hydrogen.

Start-Up:

11) Turn ON the Julabo pump to start the circulation of hot oil at 170° C.
12) Switch the reactor feed to syngas with a composition of ($H_2$:CO=2.0, $N_2$ dilution=16.5%) at the target GHSV of 12,400 $hr^{-1}$
13) Purge the reactor with syngas for a period of 1 hr
14) Pressurize the reactor from close to ambient pressure to an inlet pressure of 350 psig at a rate of 150 psig/hr
15) Heat the reactor to a target reaction temperature of 210° C. at a rate of 1.5° C./hr using the hot oil
16) Hold the reactor at this condition for a period of minimum 400 hrs
17) During this period, monitor the CO conversion in the reactor by measuring the tail gas flow and composition from the reactor outlet Deactivation Rate Calculation:

18) The CO conversion can be calculated as:

$$X_{CO} = 1 - \frac{\text{Flow Out} \times CO \text{ conc}}{CO \text{ Flow In}}$$

19) Plot the CO conversion as a function of time on stream for a period from 100 hours-on-stream (since the start of step 15) to 400 hours-on-stream
20) Use linear regression to obtain the slope of curve in terms of a (linear) deactivation rate of % CO conversion per day Long-Life Testing of FTS Catalyst A sample of catalyst material was taken from the 150 kg batch corresponding to catalyst 7 in Table 6 and subjected to a long term FTS operation study. The sample was reduced and then started on syngas under Condition A (16.5 feed inerts, 2.0 feed $H_2$/CO, 290 millisecond contact time (CT), 24.13 bar(g) inlet pressure) from day 1 to day 236. The starting operating temperature was about 205° C. and increased gradually to about 220° C. by day 236. At day 236, the reactor conditions were switched to Condition B (21.7 feed inerts, 2.03 feed $H_2$/CO, 314 millisecond CT, 23.45 bar(g) inlet pressure). The operating temperature continued at 220° C. until about day 285. At day 285 the reactor conditions were switched to Condition C (56.0 feed inerts, 1.78 feed $H_2$/CO, 314 to 435 millisecond CT, 290 psig inlet pressure). The operating temperature continued at 220° C. At day 336 the reactor conditions were switched back to Condition A. At about day 345, the temperature was increased to 224° C. A summary of the operating conditions and FTS performance is shown in Table 7 and in FIG. 30. Each column shows conditions and yields for a particular period of time on stream during the long-life test. The yields are time-averaged over each period of time on stream.

The contact time (CT) is the volume of a reaction zone within a microchannel divided by the volumetric feed flow rate of the reactants at a temperature of 0° C. and a pressure of one atmosphere.

Figure 30:
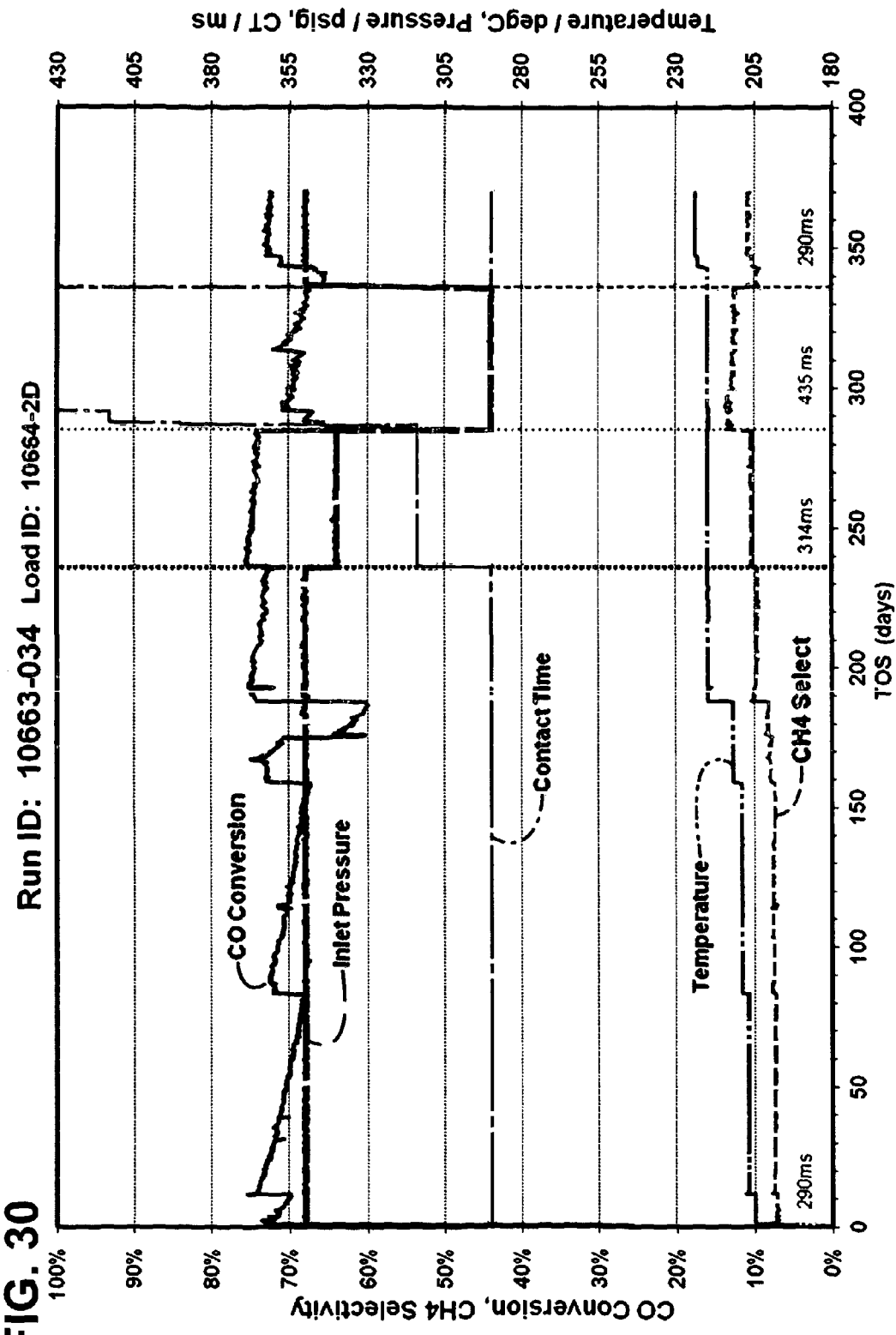
FIG. 30 shows the change in % CO conversion, % $CH_4$ selectivity and operation parameters with time on stream (TOS) during a long-life test of a catalyst of the present invention in a Fischer Tropsch reaction.

It is evident from Table 7 and FIG. 30 that the catalyst of the present invention is able to be used in a Fischer Tropsch process over a period of more than 8000 hours while maintaining excellent performance. During the long-life test, a contact time (CT) of less than 500 milliseconds, a conversion of CO of greater than 50% and methane selectivity of less than 15% was maintained throughout without any regeneration of the catalyst. Furthermore, the average deactivation rate of the catalyst during each test period (expressed as the absolute loss in CO conversion per day) was 0.082% or less throughout the long-life test.

There was one period during the long-life test (around day 175) where there was a discontinuity. As shown in FIG. 30, at this time there was a short transient spike upward in CO conversion followed by several days of accelerated deactivation

TABLE 7

Long-term FTS performance of catalyst synthesised using a bimetallic citric acid recipe and using an alkoxide method of titania impregnation.

| Reactor conditions | A | A | A | A | A | B | C | C | C | C | A | A | A |
|---|---|---|---|---|---|---|---|---|---|---|---|---|---|
| Time on stream range (hrs) | 35.0 to 284.0 | 305.0 to 1975.9 | 2008.9 to 3794.4 | 3823.9 to 3981.9 | 4685.5 to 5590.0 | 5698.0 to 6798.0 | 6834.0 to 6859.0 | 6871.0 to 6906.0 | 6912.0 to 7008.0 | 7014.0 to 8059.0 | 8071.0 to 8227.0 | 8239.0 to 8323.0 | 8330.8 to 8875.0 |
| Duration (days) | 10.4 | 69.6 | 74.4 | 6.6 | 37.7 | 45.8 | 1.0 | 1.5 | 4.0 | 43.5 | 6.5 | 3.5 | 22.7 |
| Temp (° C.) | 205.0 | 207.0 | 209.0 | 212.0 | 220.0 | 220.0 | 219.8 | 279.9 | 219.9 | 220.0 | 220.0 | 223.0 | 224.0 |
| Feed $H_2$/CO | 2.00 | 2.00 | 2.00 | 2.00 | 2.00 | 2.03 | 1.78 | 1.78 | 1.78 | 1.78 | 2.00 | 2.00 | 2.00 |
| Inlet pressure (bar) | 24.13 | 24.13 | 24.13 | 24.13 | 24.13 | 23.45 | 20 | 20 | 20 | 20 | 24.13 | 24.13 | 24.13 |
| CT (millisecond) | 290 | 290 | 290 | 290 | 290 | 314 | 314 | 390 | 414 | 435 | 290 | 290 | 290 |
| % CO converted | 71.19 | 70.82 | 70.55 | 72.94 | 73.69 | 74.67 | 54.47 | 65.40 | 67.73 | 69.23 | 66.05 | 77.10 | 72.63 |
| % $CH_4$ selectivity | 7.19 | 7.38 | 7.53 | 7.93 | 9.70 | 10.37 | 13.39 | 13.20 | 13.40 | 12.95 | 9.69 | 10.35 | 10.83 |
| % $C_5+$ selectivity | 87.92 | 87.69 | 87.48 | 86.74 | 84.01 | 83.18 | 77.83 | 79.04 | 79.83 | 79.13 | 83.94 | 83.03 | 82.31 |
| Deactivation Rate (% CO converted/day) | | −0.082 | −0.067 | | −0.052 | −0.035 | | | | −0.051 | | | −0.027 |

The invention claimed is:

1. A method of conducting a Fischer Tropsch reaction comprising using a catalyst in a microchannel reactor, the catalyst being an activated catalyst precursor comprising:
   (i) a catalyst support comprising silica and at least 11 wt % $TiO_2$; and
   (ii) cobalt on the catalyst support,
   wherein the performance of the catalyst is substantially maintained over a reaction period of about 5000 hours or more without regeneration of the catalyst, such that the contact time is less than 500 milliseconds, the CO conversion is greater than 50% and the methane selectivity is less than 15%.

2. The method of claim 1, wherein the reaction period is about 8000 hours or more.

3. A method of conducting a Fischer Tropsch reaction comprising using a catalyst which is an activated catalyst precursor comprising:
   (i) a catalyst support comprising silica and at least 11 wt % $TiO_2$; and
   (ii) cobalt on the catalyst support,
   Wherein the deactivation rate of the catalyst measured as percent loss of CO conversion per day is 0.09% or less over a reaction period of about 5000 hours or more.

4. The method of claim 3, wherein the reaction period is about 8000 hours or more.

5. The method of claim 3, wherein the reaction is carried out in a microchannel reactor.

6. A method of conducting a Fischer Tropsch reaction comprising using a catalyst derived from a catalyst precursor comprising:
   (i) a catalyst support comprising silica and at least 11 wt % $TiO_2$; and
   (ii) cobalt on the catalyst support,
   the Fischer Tropsch reaction conducted in a microchannel reactor, wherein the performance of the catalyst is substantially maintained over a reaction period of about 5000 hours or more without regeneration of the catalyst, such that the contact time is less than 500 milliseconds, the CO conversion is greater than 50% and the methane selectivity is less than 15%.

7. The method of claim 6, wherein the reaction period is about 8000 hours or more.

8. A method of conducting a Fischer Tropsch reaction comprising using a catalyst derived from a catalyst precursor comprising:
   (i) a catalyst support comprising silica and at least 11 wt % $TiO_2$; and
   (ii) cobalt on the catalyst support,
   wherein the deactivation rate of the catalyst measured as percent loss of CO conversion per day is 0.09% or less over a reaction period of about 5000 hours or more.

9. The method of claim 8, wherein the reaction period is about 8000 hours or more.

10. The method of claim 8, wherein the reaction is carried out in a microchannel reactor.

* * * * *